(12) United States Patent
Sung et al.

(10) Patent No.: US 10,178,744 B2
(45) Date of Patent: Jan. 8, 2019

(54) STREET LIGHT MANAGEMENT METHOD AND APPARATUS

(71) Applicant: KMW INC., Hwaseong-si (KR)

(72) Inventors: Seok Sung, Gunpo-si (KR); Jae-Woo Choi, Incheon (KR); Young-Jun Kim, Suwon-si (KR)

(73) Assignee: GIGATERA INC., Hwaseong-si (KR)

( * ) Notice: Subject to any disclaimer, the term of this patent is extended or adjusted under 35 U.S.C. 154(b) by 0 days.

(21) Appl. No.: 15/476,994

(22) Filed: Apr. 1, 2017

(65) Prior Publication Data

US 2017/0273165 A1 Sep. 21, 2017

Related U.S. Application Data

(63) Continuation of application No. PCT/KR2015/010406, filed on Oct. 1, 2015.

(30) Foreign Application Priority Data

Oct. 1, 2014 (KR) .................. 10-2014-0132712

(51) Int. Cl.
*H05B 37/02* (2006.01)
*H05B 37/03* (2006.01)
(Continued)

(52) U.S. Cl.
CPC ......... *H05B 37/0272* (2013.01); *G06Q 50/10* (2013.01); *G06Q 50/26* (2013.01);
(Continued)

(58) Field of Classification Search
CPC ... H05B 37/0272; H05B 37/03; G08B 21/185
See application file for complete search history.

(56) References Cited

U.S. PATENT DOCUMENTS

| 2012/0059622 A1* | 3/2012 | Cacace | H05B 37/0272 |
| | | | 702/150 |
| 2012/0146518 A1* | 6/2012 | Keating | H05B 37/0218 |
| | | | 315/153 |

(Continued)

FOREIGN PATENT DOCUMENTS

| KR | 10-2005-0003165 A | 1/2005 |
| KR | 10-0509158 B1 | 8/2005 |

(Continued)

OTHER PUBLICATIONS

Benjamin Martin, EIC 2800 Search Report, dated Jun. 11, 2018, Scientific and Technical Information Center.*

(Continued)

*Primary Examiner* — Dedei K Hammond
*Assistant Examiner* — Raymond R Chai

(57) ABSTRACT

A street light management method includes: receiving from a server at predetermined intervals and updating at least one of information about a node that is at least one street light, information about a gateway that communicates with the node and the server, and information about a communication channel between the node and the gateway; displaying the node in a corresponding position on a digital map displayed on a screen using position information included in the information about the node and displaying the gateway in a corresponding position on the digital map using position information included in the information about the gateway; and displaying corresponding information in at least one of information display windows on the screen according to the received information or a user operation.

25 Claims, 70 Drawing Sheets

(51) Int. Cl.
*G06Q 50/10* (2012.01)
*G06Q 50/26* (2012.01)
*G08B 21/18* (2006.01)
*G06F 17/30* (2006.01)

(52) U.S. Cl.
CPC ........... *G08B 21/185* (2013.01); *H05B 37/03* (2013.01); *G06F 17/30241* (2013.01)

(56) References Cited

U.S. PATENT DOCUMENTS

| | | | |
|---|---|---|---|
| 2013/0140992 A1* | 6/2013 | Lee | H05B 37/03 315/132 |
| 2014/0197745 A1* | 7/2014 | Agrawal | H05B 37/03 315/151 |

FOREIGN PATENT DOCUMENTS

| | | |
|---|---|---|
| KR | 10-2008-0092057 A | 10/2008 |
| KR | 10-0962043 B1 | 6/2010 |
| KR | 10-1175996 B1 | 8/2012 |

OTHER PUBLICATIONS

Cleber Costa Da Fonseca, Rodrigo Palucci Pantoni, Dennis Brandao, Public Street Lighting Remote Operation and Supervision System, Aug. 23, 2014 (Year: 2014).*

Written Opinion of the International Searching Authority for PCT/KR2015/010406, dated Jan. 22, 2016, and English Translation thereof.

International Search Report for PCT/KR2015/010406, dated Jan. 22, 2016, and English Translation thereof.

* cited by examiner

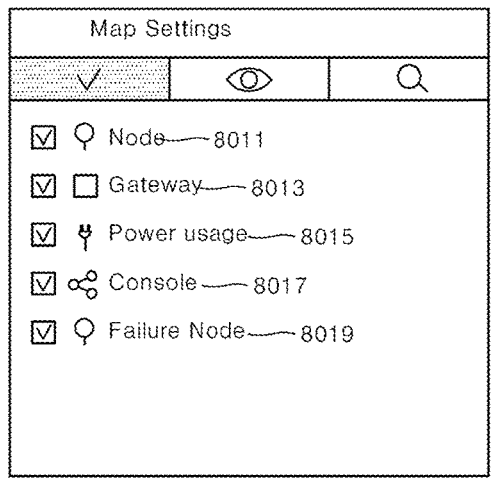
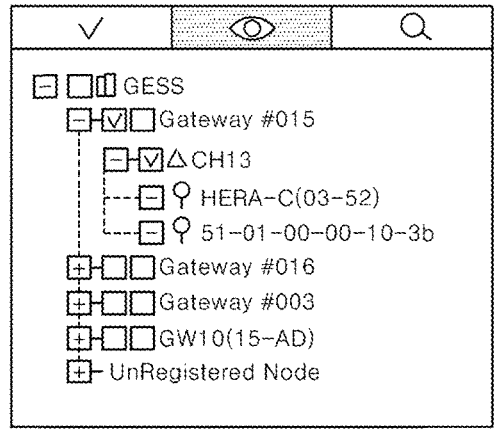
FIG. 8A        FIG. 8B
FIG. 8C

| Alarm &Failure List | | | |
|---|---|---|---|
| Alarm ( 3 ) | | | Failure ( 21 ) |
| Register | Type | Name | Message |
| 14/7/15 15:01:03 | Gateway | GW10(15-AD) | Voltage High Limit Alarm |
| 14/7/15 14:06:01 | Gateway | Gateway #015 | Ampere High Limit Alarm |
| 14/7/15 14:06:00 | Gateway | Gateway #015 | Voltage High Limit Alarm |

FIG. 11A

| Alarm &Failure List | | | | |
|---|---|---|---|---|
| Alarm ( 3 ) | | | Failure ( 21 ) | |
| Register | Type | Name | Message | |
| 14/7/15 20:05:45 | Node | HR1500346 | Response Timeout |  |
| 14/7/15 20:05:11 | Node | HR1500347 | Response Timeout |  |
| 14/7/15 20:04:28 | Node | HR1500348 | Response Timeout |  |
| 14/7/15 20:03:45 | Node | HR150034D | Response Timeout |  |
| 14/7/15 20:02:25 | Node | HR1500F7B | Response Timeout |  |

FIG. 11B

| Node | | | |
|---|---|---|---|
| Node info | | | |
| Node Name | HP1500346 | Serial No | Nodeseral S0 |
| Node Mac ID | 51-01-00-00-D3-43 | Model | Node Model S0 |
| Shannel | 14 | HW Ver | REV 4001 |
| Gateway Name | Gateway #C03 | SW Ver | REV 4003 |
| Gateway Mac ID | C0-05-f4-01-33-0c | DAte | 190.202.17 |
| | | Lartude | 17217116402351 |
| | | Longihude | 12710117071866 |

| Repair Information | | | |
|---|---|---|---|
| Date | 14/07/13 12.03.16 | | |
| Fature Name | Request Timeout | Fature Code | 4000 |
| Expected Day | | Working Day | |
| Work | | | |
| Worker | Yuna, kim | Repair Status | N |

OK  CANCEL

| Console | 13 | | | | | | | |
|---|---|---|---|---|---|---|---|---|
| Register | Gateway | Channel | Node | Control Command | Control Mode | Type | Request | Response | Message | Action |
| 20140715 195637 | Gateway #103 | 24 | 51-01-00-00-03-b5 | Set Limp Control Mode | | Request | 2014/05/15 105605 | 2014/07/15 195637 | Response Timeout | Cancel |
| 20140715 195637 | Gateway #103 | 24 | 51-01-00-00-03-43 | Set Limp Control Mode | | Request | 2014/05/15 105605 | 2014/07/15 195637 | Response Timeout | Cancel |
| 20140715 195637 | Gateway #103 | 24 | 51-01-00-00-03-7e | Set Limp Control Mode | | Request | 2014/05/15 105605 | 2014/07/15 195637 | Response Timeout | Cancel |
| 20140715 195637 | Gateway #103 | 24 | 51-01-00-00-03-4c | Set Limp Control Mode | | Request | 2014/05/15 105605 | 2014/07/15 195637 | Response Timeout | Cancel |
| 20140715 195637 | Gateway #103 | 24 | 51-01-00-00-03-4a | Set Limp Control Mode | | Request | 2014/05/15 105605 | 2014/07/15 195637 | Response Timeout | Cancel |
| 20140715 195637 | Gateway #103 | 24 | 51-01-00-00-03-4r | Set Limp Control Mode | | Request | 2014/05/15 105605 | 2014/07/15 195637 | Response Timeout | Cancel |
| 20140715 195637 | Gateway #103 | 24 | 51-01-00-00-03-7b | Set Limp Control Mode | | Request | 2014/05/15 105605 | 2014/07/15 195637 | Response Timeout | Cancel |
| 20140715 195637 | Gateway #103 | 24 | 51-01-00-00-03-4b | Set Limp Control Mode | | Request | 2014/05/15 105605 | 2014/07/15 195637 | Response Timeout | Cancel |
| 20140715 195637 | Gateway #103 | 24 | 51-01-00-00-03-4d | Set Limp Control Mode | | Request | 2014/05/15 105605 | 2014/07/15 195637 | Response Timeout | Cancel |
| 20140715 195637 | Gateway #103 | 24 | 51-01-00-00-03-45 | Set Limp Control Mode | | Request | 2014/05/15 105605 | 2014/07/15 195637 | Response Timeout | Cancel |
| 20140715 195637 | Gateway #103 | 24 | 51-01-00-00-03-47 | Set Limp Control Mode | | Request | 2014/05/15 105605 | 2014/07/15 195637 | Response Timeout | Cancel |
| 20140715 195637 | Gateway #103 | 24 | 51-01-00-00-03-46 | Set Limp Control Mode | | Request | 2014/05/15 105605 | 2014/07/15 195637 | Response Timeout | Cancel |
| 20140715 195637 | Gateway #103 | 24 | 51-01-00-00-03-7a | Set Limp Control Mode | | Request | 2014/05/15 105605 | 2014/07/15 195637 | Response Timeout | Cancel |

| | Gateway Name | Gateway Mac ID | Model | Alarm | Nodes | Install Date | Gateway Phone Number |
|---|---|---|---|---|---|---|---|
| ☐ | Gateway #003 | 00-05-f4-01-33-0c | kunctu0010010 | Normal | 15 | 1970-01-01 | 010-9404-2016 |
| ☐ | Gateway #010 | 00-05-f4-01-15-ad | kunctu0010010 | Normal | 203 | 2014-05-06 | 010-4678-1494 |
| ☐ | Gateway #015 | 00-05-f4-01-15-b8 | kunctu0010010 | Normal | 1 | | 010-2122-4311 |
| ☐ | Gateway #016 | 00-05-f4-01-15-a5 | kunctu0010010 | Normal | 0 | | 010-8784-2022 |
| ☐ | Test(com) | 00-05-f4-01-33-ff | kunctu0010010 | Normal | 1 | | 010-7924-7214 |

Registration Information Gateway

Gateway Phone Number

Gateway Name

Save    Cancel

STREET LIGHT MANAGEMENT METHOD AND APPARATUS

CROSS REFERENCE TO RELATED APPLICATIONS

The present application is a continuation of International Application No. PCT/KR2015/010406 filed on Oct. 1, 2015, which claims priority to Korean Application No. 10-2014-0132712 filed on Oct. 1, 2014, the entire disclosures of which are incorporated herein by reference in their entirety.

TECHNICAL FIELD

The present disclosure relates to a street light management method and apparatus for managing street lights distributed over multiple areas.

BACKGROUND ART

Accompanied by technology development, technologies for automatizing management of a street light to efficiently manage the street light have also been developed.

An example of an existing street light management technology includes Korean Patent Laid-Open Publication No. 10-2005-0003165 (Title: "Two-way remote computer comprehensive management method for street light and system thereof", Inventors: Joh Jung Seob et al., Applicant; Joh Jung Seob, published on Jan. 10, 2005). A street light management apparatus disclosed in Korean Patent Laid-open Publication No. 10-2005-0003165 performs an operation of remotely operating street lights, effectively monitoring street lighting conditions by visually checking street lights through an image and checking a state signal, and building a history database to perform fault management and repair management, thereby comprehensively managing repair materials, equipment, and manpower.

As disclosed in Korean Patent Laid-Open Publication No. 10-2005-0003165, various technologies for conveniently managing street lights have been developed. However, a technology for checking, by a administrator managing street lights at a glance, installation positions and state information of the street lights distributed over multiple areas to monitor the street lights in real time and conveniently control the street lights has not yet been developed.

DISCLOSURE

Technical Problem

An object of the present disclosure is to provide a street light management method and apparatus capable of checking installation positions and state information of street lights distributed over multiple areas and monitoring the street lights in real time.

Another object of the present disclosure is to provide a street light management method and apparatus capable of conveniently controlling street lights individually or in group, and accurately and rapidly managing street light facilities.

Still another object of the present disclosure is to provide a street light management method and apparatus capable of sensing and determining power usage of street lights to reduce power consumption.

Still yet another object of the present disclosure is to provide a street light management method and apparatus capable of receiving information about street lights to reduce costs and time for repair and failure response when a failure occurs in the street lights.

Technical Solution

In one general aspect, a street light management method includes: receiving from a server at predetermined intervals and updating at least one of information about a node that is at least one street light, information about a gateway that communicates with the node and the server, and information about a communication channel between the node and the gateway; displaying the node in a corresponding position on a digital map displayed on a screen using position information included in the information about the node and displaying the gateway in a corresponding position on the digital map using position information included in the information about the gateway; and displaying corresponding information in at least one of information display windows on the screen according to the received information or a user operation.

In another general aspect, a street light management apparatus includes: a communication module; a display unit; an input unit receiving a user operation; and a controller performing a control to receive from a server through the communication module at predetermined intervals and update at least one of information about a node that is at least one street light, information about a gateway that communicates with the node and the server, and information about a communication channel between the node and the gateway, display the node in a corresponding position on a digital map displayed on the display unit using position information included in the information about the node and display the gateway in a corresponding position on the digital map using position information included in the information about the gateway, and display corresponding information in at least one of information display windows of the display unit according to the received information or the user operation input through the input unit.

Advantageous Effects

As described above, by using the street light management method and apparatus, it is possible to check by a user at glance installation positions and state information of street lights distributed over multiple areas and monitor the street lights in real time. Further, the user may conveniently control the street lights individually or in group, and accurately and rapidly manage the street light facilities. Further, the user may easily check power usage of the street lights to reduce power consumption of the street lights. Further, the user checks information about the street lights in real time, thereby reducing costs and time for repair and failure response when a failure occurs in the street lights.

BRIEF DESCRIPTION OF DRAWINGS

FIGS. 6, 7, 8A, 8B, 8C, 9, 10A, 10B, 10C, 11A, 11B, 12, 13, 14, 15, and 16 are views showing a window displayed in a street light management application according to an embodiment of the present disclosure.

FIGS. 24A and 24B are views for describing an operation of executing a Set Label menu in a context menu of a gateway according to an embodiment of the present disclosure.

FIGS. 27A and 27B are views for describing an operation of executing a Node Scan menu in a context menu of a gateway according to another embodiment of the present disclosure.

FIGS. 31A and 31B are views for describing an operation of executing a Reset menu in a context menu of a gateway according to an embodiment of the present disclosure.

FIGS. 37A and 37B are views for describing an operation of executing a Set/Get RTC Time menu in a context menu of a node according to an embodiment of the present disclosure.

FIGS. 39A and 39B are views for describing an operation of executing a Reset menu in a context menu of a node according to an embodiment of the present disclosure.

FIGS. 42, 43, 44, 45, 46, 47, 48, 49, 50, 51, 52, 53, 54, 55, 56, 57, 58, 59, 60, 61, 62, 63, 64, 65, 66, 67 and 68 are views showing a screen displayed at the time of executing a Facilities item in a submenu for management and statistics according to various embodiments of the present disclosure.

FIGS. 69, 70, 71, 72, 73, 74, 75, 76, 77, 78, 79, 80 and 81 are views showing a screen displayed at the time of executing an Operation item in a submenu for management and statistics according to various embodiments of the present disclosure.

DETAILED DESCRIPTION

Hereinafter, embodiments of the present disclosure will be described in detail with reference to the accompanying drawings. In the following description, specific matters such as a name like a digital map, a submenu, etc., and constituent elements, and the like are described, but they are merely provided for assisting in overall understanding of the present disclosure. It is apparent for a person having ordinary knowledge in the art that these specific matters may be modified or changed within the scope of the present disclosure.

Figure 1:
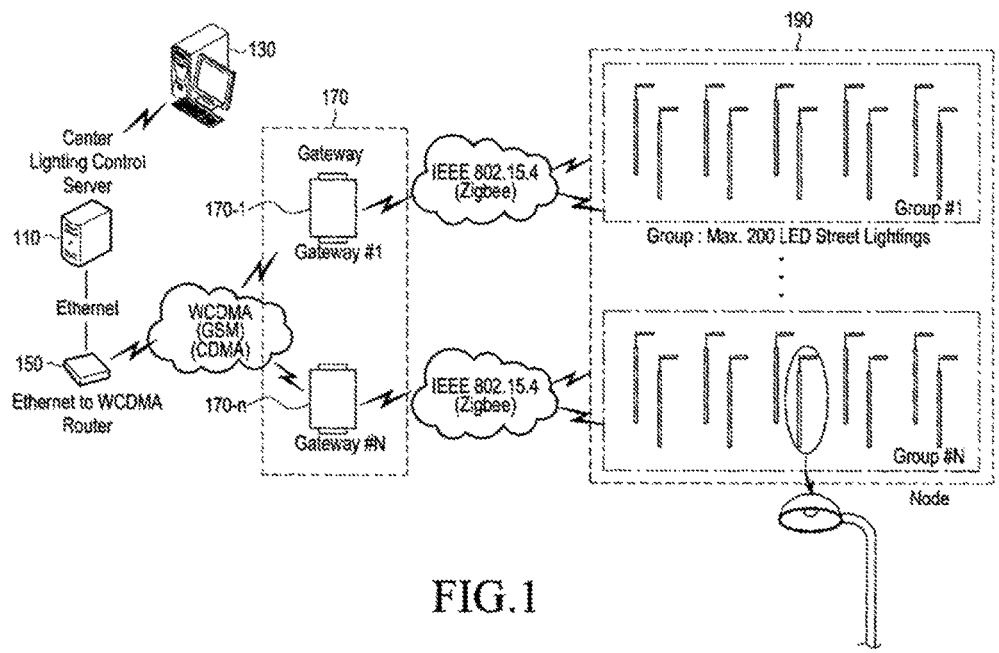
FIG. 1 is an exemplified view of a street light system according to an embodiment of the present disclosure.
Figure 2:
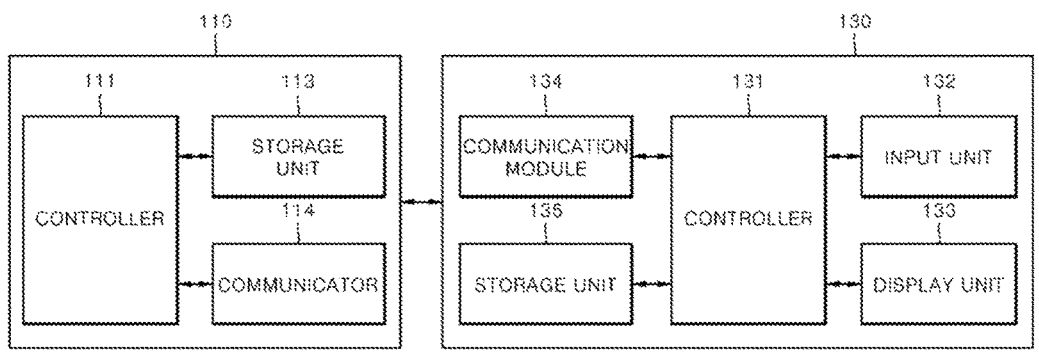
FIG. 2 is a block diagram of a street light system according to an exemplary embodiment of the present disclosure.
Figure 3:
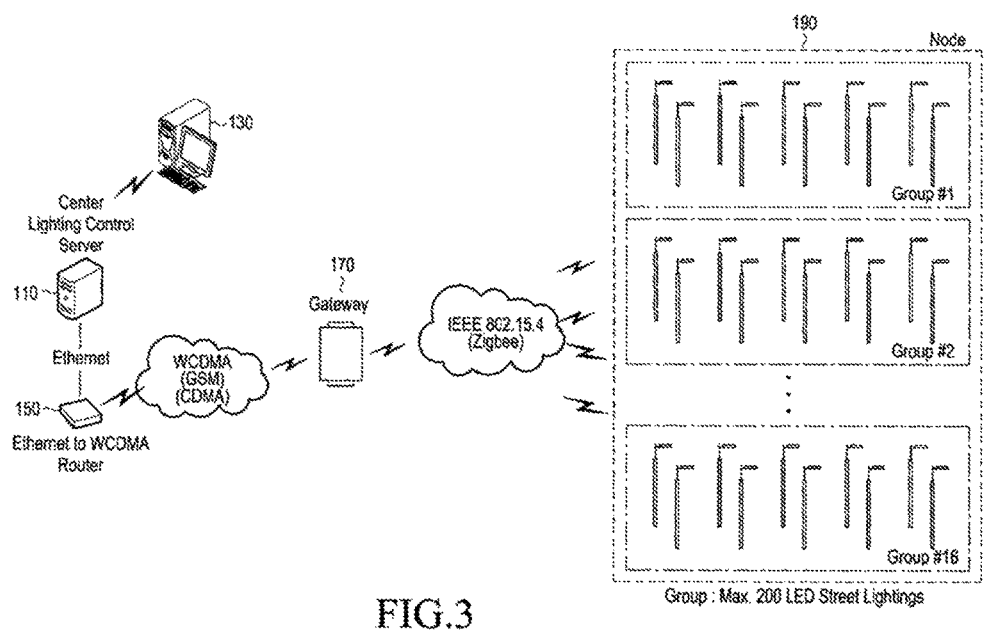
FIG. 3 is an exemplified view of a street light system according to another embodiment of the present disclosure.

FIG. 1 is an exemplified view of a street light system according to an embodiment of the present disclosure, FIG. 2 is a block diagram of a street light system according to an exemplary embodiment of the present disclosure, and FIG. 3 is an exemplified view of a street light system according to another embodiment of the present disclosure. Referring to FIGS. 1 to 3, a street light system may include a server 110, a terminal device 130, a router 150, at least one gateway 170 (170-1, . . . , 170-n), and at least one street light 190.

The street light 190 is generally configured of a street light lamp and a lamp pole which is a pillar supporting the street light lamp, and according to an embodiment of the present disclosure, the street light is further provided with communication equipment to perform a communication operation.

Hereinafter, the street light 190 having the communication equipment is referred to as a node.

As illustrated in FIG. 2, the server 110 may include a controller 111, a storage unit 113, and a communicator 114. Further, the server 110 may be connected to a gateway 170 through a router 150.

The controller 111 may transmit a street light management application stored in the storage unit 113 to the terminal device 130 through the communicator 114. The street light management application may be a software program designed so that the street management may be performed.

Further, the controller 111 may receive at least one of information about the node 190, information about the gateway 170, and information about a communication channel between the node 190 and the gateway 170 from the gateway 170 through the communicator 114 at predetermined intervals, store the received information in the storage unit 113, and transmit the stored at least one information to the terminal device 130 through the communicator 114. Further, the controller may receive information about the node 190 and information about the gateway 170 from the terminal device 130 through the communicator 114 to update information about the street light management application.

As illustrated in FIG. 2, the terminal device 130 may include a controller 131, an input unit 132, a display unit 133, a communication module 134, and a storage unit 135. Further, various terminal devices 130 such as a computer (not illustrated), a tablet PC (not illustrated), a smartphone (not illustrated), etc. may be used.

The input unit 132 receives a user operation, may be configured by a touch screen (not illustrated) and may include a keyboard (not illustrated), a mouse (not illustrated), a microphone (not illustrated), a button (not illustrated), etc.

The display unit 133 may display an execution image, an operation state, a menu state, etc. of various applications, and be implemented integrally with the touch screen.

The communication module 134 performs a wireless signal processing operation for wireless communication with an external device such as a mobile communication terminal, etc., and may include an antennal, an RF unit, and a modem. Further, the communication module 134 may include a wireless local area network (LAN) module, a short-range communication module such as Wi-Fi direct, near field communication (NFC), or Bluetooth, or the like to be connected to wireless Internet at a place in which wireless access point (AP) is installed or perform a short-range communication operation wirelessly with peripheral devices.

The storage unit 135 may store a signal or data input/output in response to an operation of the input unit 132, the display unit 133, and the communication module 134 according to a control of the controller 131. Further, the storage unit 135 may store control programs and applications for a control of the terminal device 130 or the controller 131.

The term "storage" includes the storage unit 135, a ROM (not illustrated) in the controller 131, a RAM (not illustrated), or a memory card (not illustrated) installed in the terminal device 130 (e.g. SD card, memory stick).

The controller may include a CPU (not illustrated), a ROM (not illustrated) in which a control program for a control of the terminal device 130, and a RAM (not illustrated) used as a memory space for memorizing a signal or data input from the outside of the terminal device 130 or for an operation performed in the terminal device 130.

Further, the controller 131 may generally control the respective functional units (the input unit 132, the display unit 133, the communication module 134, and the storage unit 135).

Further, according to an embodiment of the present disclosure, the controller 131 may perform a control to receive from the server 110 through the communication module 134 at predetermined intervals and update at least one of information about the node 190 that is at least one street light, information about the gateway 170 that communicates with the node 190 and the server 110, and information about a communication channel between the node 190 and the gateway 170, display the node 190 in a corresponding position on a digital map displayed on the display unit 133 using position information included in the information about the node 190, display the gateway in a corresponding position on the digital map using position information included in the information about the gateway, and display corresponding information in at least one of information display windows of the display unit 133 according to the received information or a user operation input through the input unit 132.

The gateway 170 may control the nodes 190, that is, street lights by communicating (e.g. Zigbee communication) with, for example, maximum 200 nodes 190 according to the control of the server 110. In addition, when the gateway 170 uses one channel, if the number of nodes 190 to be controlled is increased, a number of gateways 170 may be required as in FIG. 1. Meanwhile, when the gateway 170 uses a number of channels for smooth communication even in a narrow area, it is possible to the number of nodes while using one gateway 170 as in FIG. 3. Further, the gateway 170 and the server 110 may communicate with each other by using a CDMA network (or GSM network, WCDMA network, etc.).

Figure 4:
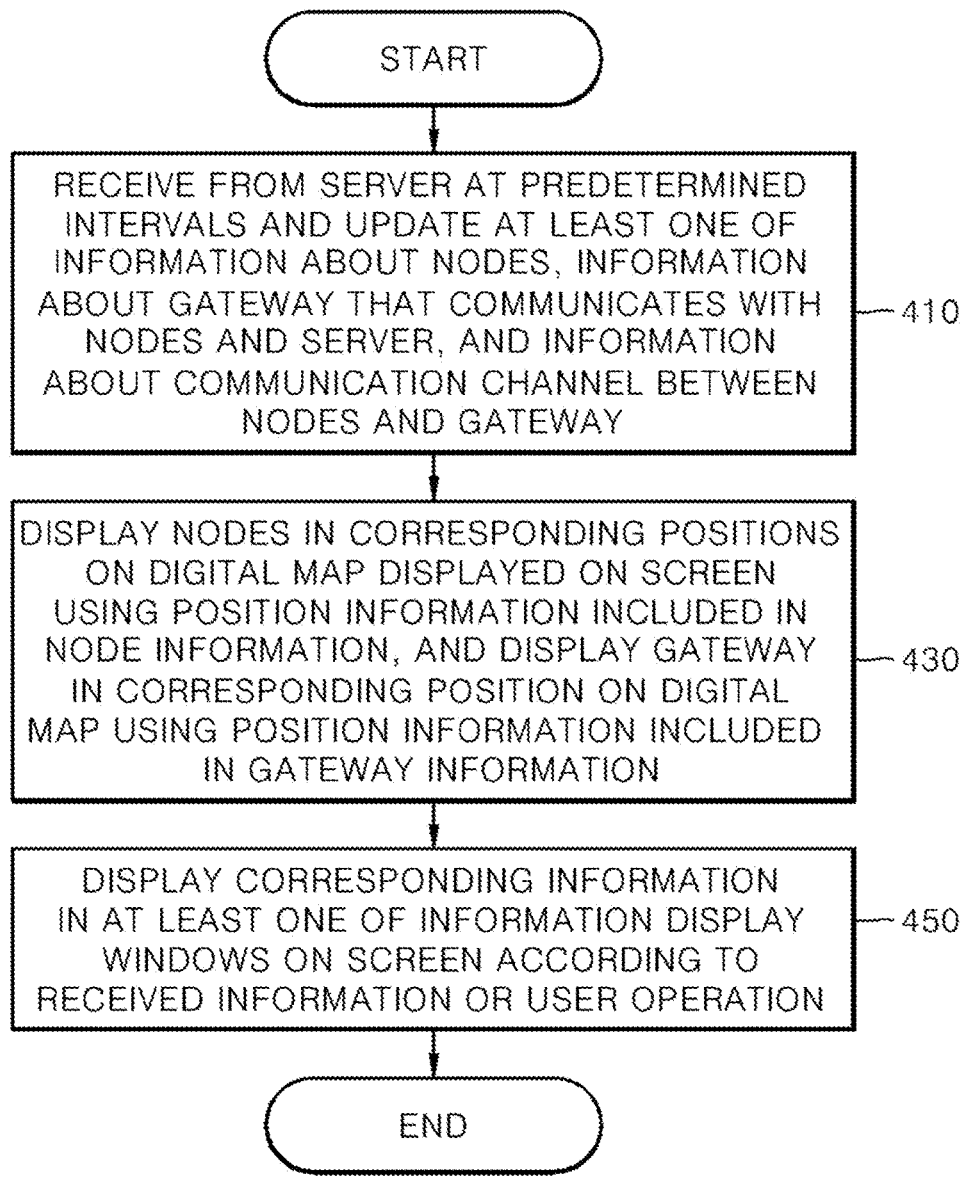
FIG. 4 is a flow chart of a street light management operation according to an embodiment of the present disclosure.

FIG. 4 is a flow chart of a street light management operation according to an embodiment of the present disclosure.

Referring to FIG. 4, in operation 410, the terminal device may receive from the server at predetermined intervals and update at least one of information about at least one node, information about the gateway that communicates with the node and the server, and information about the communication channel between the node and the gateway.

In operation 430, the terminal device may display the node in a corresponding position on the digital map displayed on the screen using position information included in the information about the node, and display the gateway in a corresponding position on the digital map using position information included in the information about the gateway.

In operation 450, the terminal device may display corresponding information in at least one of information display windows on the screen according to the received information or a user operation. The information display window may be, for example, an alarm and failure list window, a power usage window, and a control list window (console window) to be described below. Further, for example, when the information received in operation 410 includes alarm information or failure information, the alarm information or the failure information may be displayed in the alarm and failure list window displayed on the screen. Further, for example, when the information received in operation 410 includes power usage information, the information about power usage of the node may be displayed in the power usage window displayed on the screen. Further, for example, when a control request for controlling the node or the gateway according to a user operation is input and corresponding control is performed, information about the performed control may be displayed in the control list window displayed on the screen.

Figure 5:
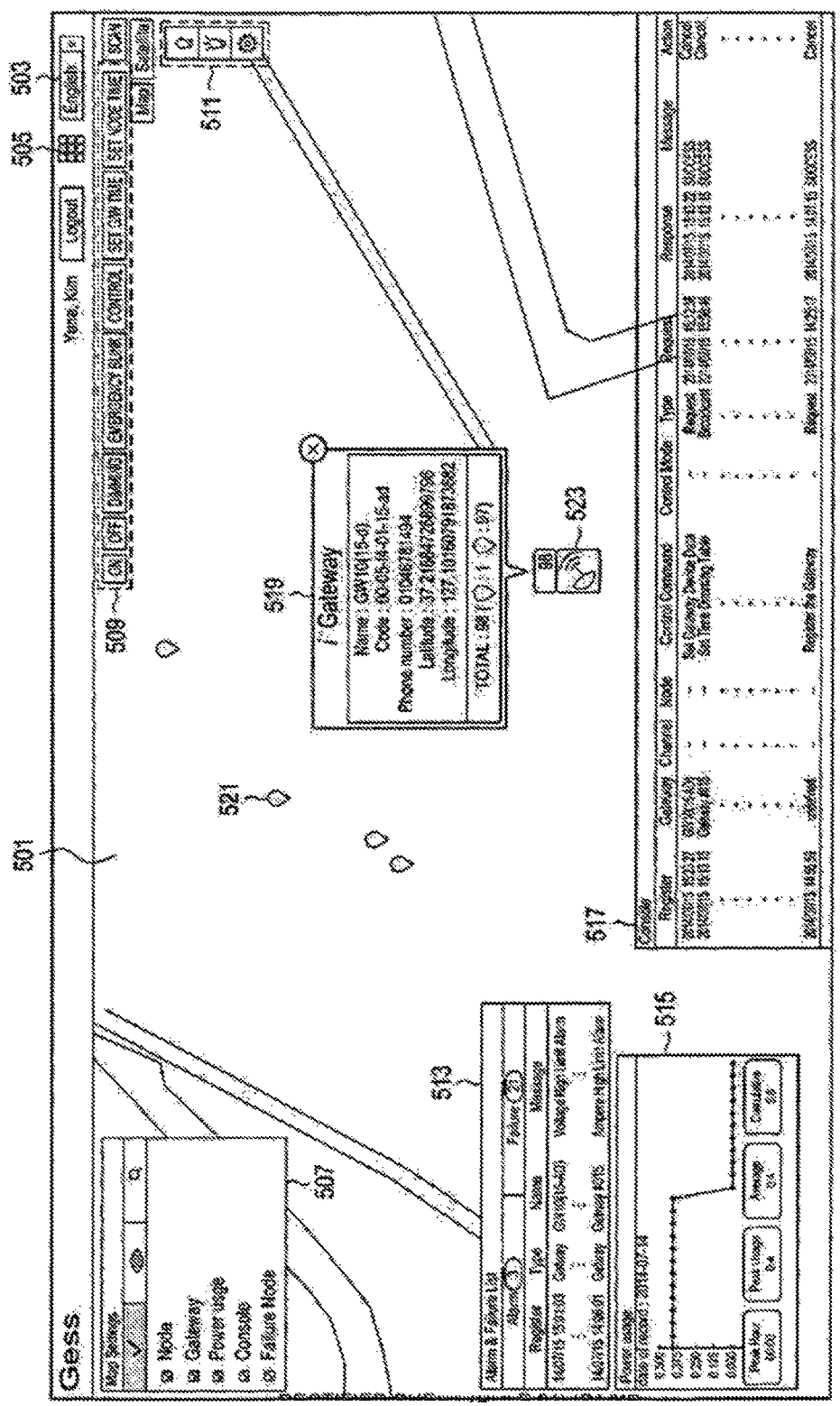
FIG. 5 is an exemplified view of execution of a street light management application according to an embodiment of the present disclosure.

FIG. 5 is an exemplified view of execution of a street light management application according to an embodiment of the present disclosure. When the street light management application is performed in the terminal device according to a user operation, the terminal device may display a digital map 501 corresponding to an area where the node managed by the server is installed on the screen as illustrated in FIG. 5. Further, the terminal device may display on the screen a menu 503 for selecting a language, a submenu 505 for management and statistics, a digital map option window 507, a CONTROL button 509, a filter window 511, an alarm and failure list window 514, a power usage window 515, and a control list window (Console window) 517 to be described below. Further, according to a user operation or predetermined conditions, the terminal may display at least one node 521 among nodes managed by the server in a corresponding position on the digital map 501, and display a gateway 523 communicating with the at least one node 521 and the server in a corresponding position on the digital map 501. Further, according to a user operation, the terminal device may a window 519 including information of a specific gateway (e.g. gateway 523) displayed on the digital map 501 and/or a window including information of the node displayed on the digital map 501 on the screen.

Meanwhile, according to a user operation, the terminal device may set whether to display the alarm and failure list window 513, the power usage window 515, and/or the control list window 517, and according to the setting of whether to display, the terminal device may display at least one of the alarm and failure list window 513, the power usage window 515, and the control list window 517 on the screen.

Figure 6:
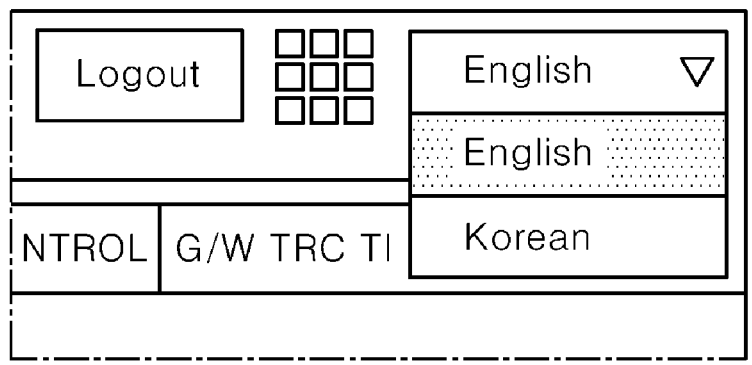

The menu 503 for selecting a language is a menu for, when at least one language of, for example, Korean and English is selected according to a user operation as in FIG. 6, applying the selected language to the street light management application. Various languages in addition to the above language may be included.

Figure 7:
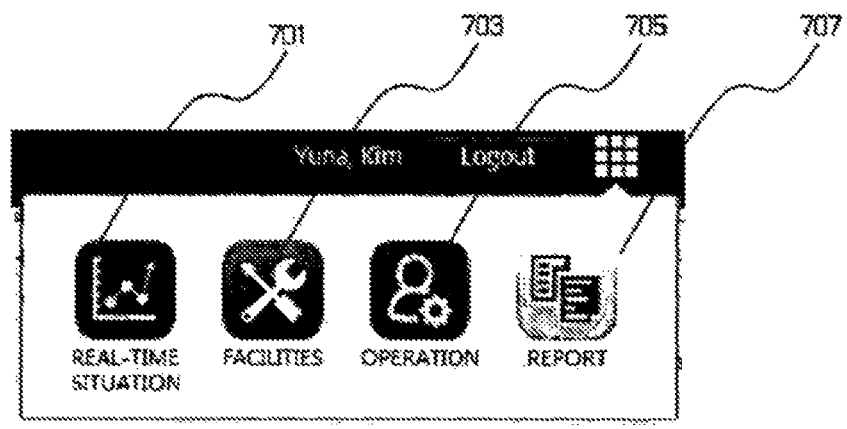

The submenu 505 for management and statistics is a menu that may include a Real-Time Situation item 701, a Facilities item 703, an Operation item 705, and a Report item 707 as in FIG. 7. According to a user operation, when the submenu 505 for management and statistic is selected, the terminal device may display a window including the Real-Time Situation item 701, the Facilities item 703, the Operation item 705, and the Report item 707 to be described below on the screen as in FIG. 7.

The digital map option window 507 may include three option windows, and the terminal device may display one option window that is set as default among three option windows (first option window, second option window, and third option window) on the screen when displaying the digital map option window 507 on the screen. Further, according to a user operation, the terminal device may display one selected option window.

For example, the first option window of the digital map option window 507 may be a window for setting at least one of whether to display the node on the digital map 501 (8011; Node), whether to display the gateway on the digital map 501 (8013; Gateway), whether to display the power usage window 515 (8015; Power usage), whether to display the control list window 571 (8017; Console), and/or whether to display the alarm and failure list window 513 (8019; Failure Node) as in FIG. 8A, according to a user operation. For example, the terminal device may display at least one of the above described items (whether to display the node on the digital map 501 (8011; Node), whether to display the gateway on the digital map 501 (8013; Gateway), whether to display the power usage window 515 (8015; Power usage), whether to display the control list window 571 (8017; Console), and/or whether to display the alarm and failure list window 513 (8019; Failure Node)) according to the setting of whether to display the above described items according to the user operation.

Further, for example, when a connection relationship in which a communication channel connecting between a gateway and the server is set as a sub-component of the gateway, and a node connected to the gateway through the communication channel is set as a sub-component of the communication channel is set, the second option window of the digital map option window 507 may be a window (also referred to as a tree structure window) displaying the gateway, the communication channel, and the node in a tree structure as in FIG. 2B. Referring to FIG. 8B, the terminal device may display a number of gateways managed by the server in the tree structure window, display a communication channel connecting the gateway and nodes as a sub-component of the selected gateway according to a user operation, and the nodes connected to the gateway through the communication channel as a sub-component of the selected communication channel. Further, checkboxes are displayed beside names of the gateway, the communication channel, and the node. The terminal device may check the checkboxes of the selected gateway, communication channel, and node so that the user may confirm that the gateway, the communication channel, and the node are selected. The terminal device may display a name of a gateway establishing a TCP connection with the server with a predetermined color. Further, the terminal device may display a name of a coordinator node with a predetermined color. Further, in a state in which a checkbox is checked, the terminal device may display a context menu which is a menu for controlling a gateway, a communication channel or a node of which the checkbox is checked according to a user operation.

Further, for example, the third option window of the digital map option window may be a window for inquiring a node as in FIG. 8C. Referring to FIG. 8C, in the window for inquiring a node, the user may input predetermined information for node inquiry such as a node name, an MAC address of a node, an address of a node, etc. to inquire a node. Further, when one inquiry operation result is selected from a result list of the inquiry operation according to a user operation, the terminal device may move the screen to the digital map on which the node is positioned. Further, the position including the corresponding node may be enlarged to be displayed on the screen.

Figure 9:
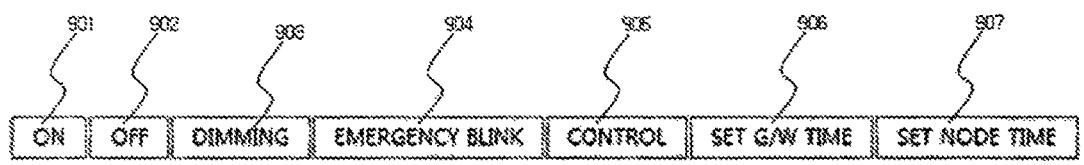

The CONTROL button 509 may include an ON button 901, an OFF button 902, a DIMMING button 903, an EMERGENCY BLINK button 904, a CONTROL button 905, a SET G/W TIME button 906, and a SET NODE TIME button 907 as in FIG. 9.

The ON button 901 may be a button for setting the street light lamp to be turned on, and the OFF button 902 may be a button for setting the street light lamp to be turned off. Further, the DIMMING button 903 may be a button for setting a dimming control of the street light lamp in a gateway unit, a channel unit, or a node unit. Further, the EMERGENCY BLINK button 904 may be a button for setting a blink control of the street light lamp (for example, setting a start and/or an end of blink of the street light lamp) in a gateway unit, a channel unit, or a node unit. The CONTROL button (also referred to as a control mode setting button) 905 may be a button for setting at least one control mode among a mode of turning on or off (on/off) the street light lamp at a predetermined time, a mode of turning on or off the street light lamp at each predetermined time zone, and a mode of adjusting a dimming value of the street light lamp at a predetermined time, in a gateway unit, a channel unit, or a node unit. The SET G/W TIME button 906 may be a button for setting a reference time of the gateway, or receiving the reference time of the gateway to be checked. Further, the SET NODE TIME button 907 may be a button for setting a reference time of the node, or receiving the reference time of the node.

According to a user operation, the terminal device may select the above-described CONTROL button 509 to executing at least one of a dimming control setting of a street light lamp of one or more nodes, a blink control setting of the street light lamp of the node, a control mode setting of the node, a reference time setting of the node, and a reference time setting of the gateway.

Further, according to a user operation, the terminal device may group a plurality of nodes displayed on the digital map and select the above-described CONTROL button 509 to execute at least one of a dimming control setting of street light lamps of the grouped plurality of nodes, a blink control setting of the street light lamps of the nodes, a control mode setting of the nodes, and a reference time setting of the nodes.

Meanwhile, the control mode setting may include executing at least one of on or off of a street light lamp of a node (or street light lamps of nodes) at a predetermined time, on or off of a street light lamp of a node (or street light lamps of nodes) at each predetermined time zone, and adjustment of a dimming value of a street light lamp of a node (or street light lamps of nodes) at a predetermined time.

Figure 10A:
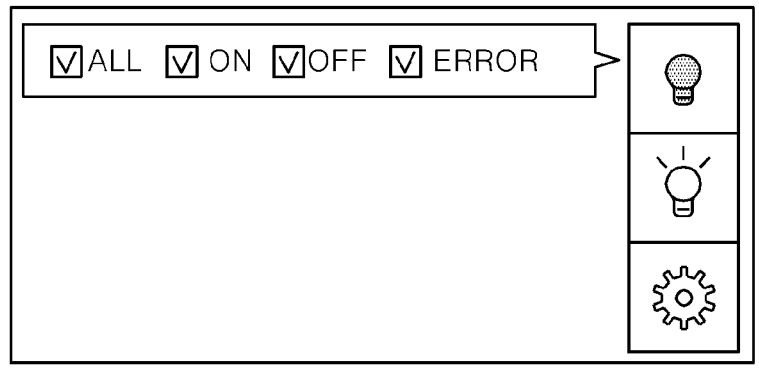
Figure 10B:
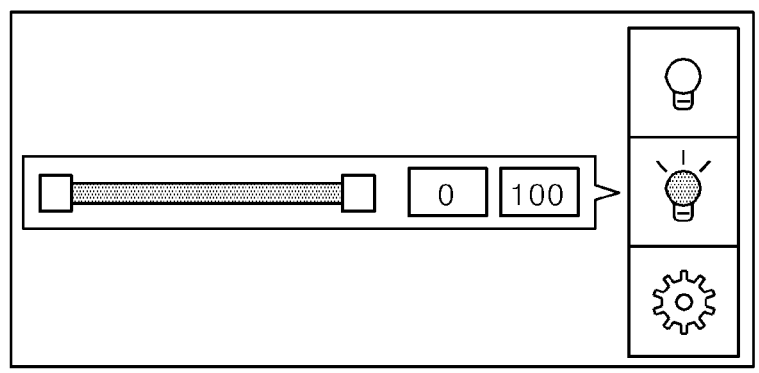
Figure 10C:
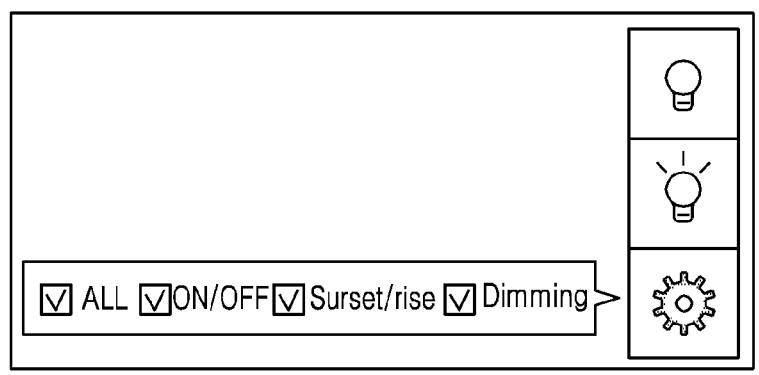

The filter window 511 is a window for setting whether to display a node on the digital map, and may include three items for setting whether to display as in FIGS. 10A, 10B, and 10C. Referring to FIG. 10A, a window for setting whether to display a node on the digital map according to a selection of at one state of ON, OFF, and ERROR of a street light lamp according to a user operation may be included. For example, when an ON item is selected (an on state is selected) in the screen displayed as in FIG. 10A, the terminal device may display only corresponding nodes of turned-on street light lamps among street light lamps of nodes currently managed by the server on the digital map. Further, when an OFF item is selected (an off state is selected) in the screen displayed as in FIG. 10A, the terminal device may display only corresponding nodes of turned-off street light lamps among the street light lamps of the nodes currently managed by the server on the digital map. Further, when an ERROR item is selected (an error state is selected) in the screen displayed as in FIG. 10A, the terminal device may display only corresponding nodes where an error has occurred among the nodes currently managed by the server on the digital map.

Further, referring to FIG. 10B, a window for setting whether to display a node on the digital map according to a setting of a dimming value of a street light lamp according to a user operation may be included. For example, when a dimming value is set to be 100% according to a user operation in the screen displayed as in FIG. 10B, the terminal device may display only corresponding nodes of which a dimming value is set to be 100% among street light lamps of nodes currently managed by the server on the digital map.

Further, referring to FIG. 10C, a window for setting whether to display a street light according to a selection of at least one of a mode of turning on or off a street light lamp at a predetermined time, a mode of turning on or off the street light lamp at each predetermined time zone, and a mode of adjusting a dimming value of the street light lamp at a predetermined time in control mode setting information of a node, according to a user operation, may be included.

The alarm and failure list window 513 is a window that may display received alarm and failure information of a gateway or a node (street light) while dividing into alarm information and failure information. The alarm and failure list window 513 includes an alarm list display window in which the total number of alarms (the number of alarms in the alarm list) is displayed as in FIG. 11A, and a failure list display window in which the total number of failures (the number of failures in the failure list) is displayed, and the terminal device may display the alarm list display window or the failure list display window on the screen according to a predetermined condition (for example, a window set as default). Further, according to a user operation, the terminal device may display the selected alarm list display window or failure list display window.

Referring to FIG. 11A, the alarm list display window includes an alarm list and the number of alarms in the alarm list, and the alarm list may include a Type item to classify a gateway and a node. Further, the alarm list includes checkboxes, and when a checkbox is selected, the terminal device may provide (display) a user interface (UI) for releasing an alarm.

Referring to FIG. 11B, the failure list display window includes a failure list and the number of failures in the failure list, and the failure list may include a Type item to classify a gateway and a node. Further, the failure list includes a failure handling process button, and when the failure handling process button is selected, the terminal device may display a window (also referred to as UI) for recording handling information of a corresponding failure as in FIG. 12. For example, when the failure repair process button of a specific node is selected in the failure list display window according to a user operation, the terminal device may display a window for recoding repair information (failure handling information) and node information at the same time as in FIG. 12.

Figure 13:
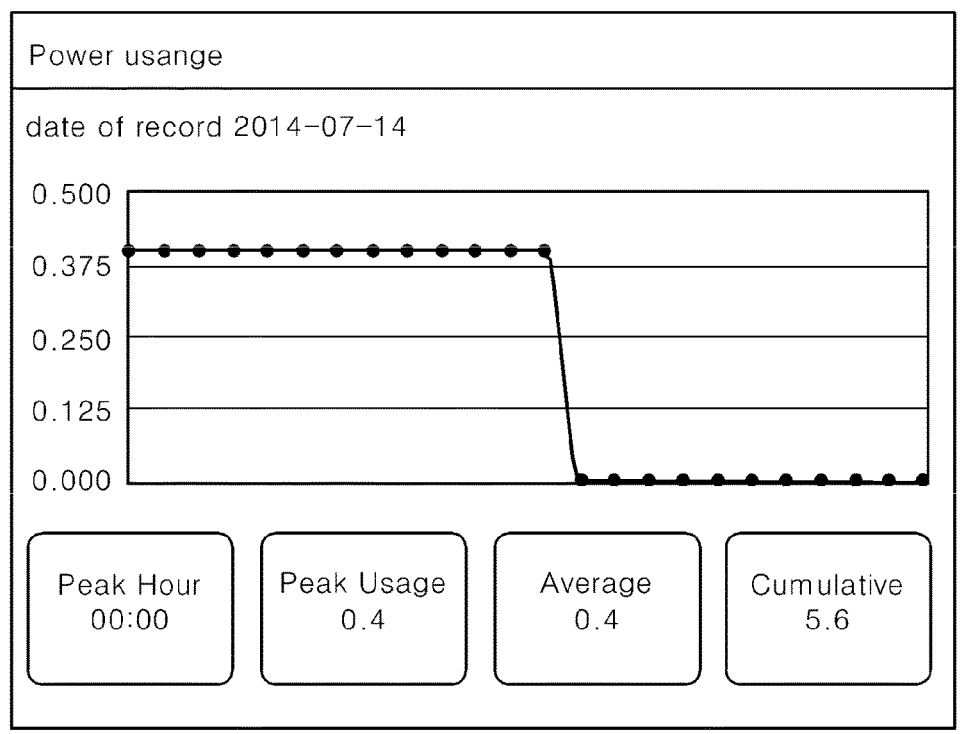

The power usage window 515 is a window that may display daily power usage information. The power usage window 515 may include at least one of, for example, daily power usage, a chart of daily power usage, a peak hour of power usage (Peak Hour), a peak power usage (Peak Usage), an average power usage (Average), and a cumulative power usage (Cumulative), as in FIG. 13.

The control list window 517 is a window for displaying a control list so that when a control request for controlling a node is generated and the corresponding control is performed, a user may confirm that the control is performed. The control list window 517 may have a form as in, for example, FIG. 14, and the control list may be displayed according to a predetermined priority.

The control list window 517 is a window that may display a control performed according to a predetermined schedule of a system, and a control performed according to a user operation. Further, in terms of priorities between a control by the system and a control by the user, the control by the user may be preferentially displayed. Further, every control list may include a button for canceling (terminating) control list display, and may designate the maximum number of control lists that may be displayed.

Figure 15:
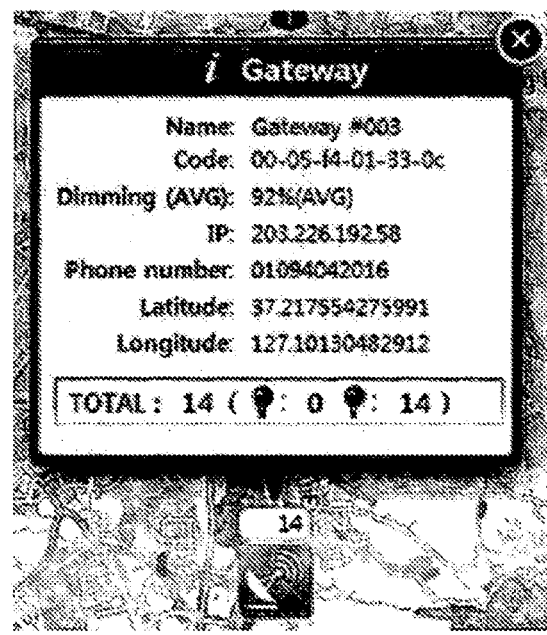

The window 519 including information about a gateway displayed on the digital map 501 may have a form as in, for example, FIG. 15, and the information about the gateway may include at least one information of a name of the gateway (Name), a MAC address of the gateway (Code), an IP address of the gateway (IP), average dimming information (Dimming (AVG)) of entire nodes communicating with the gateway, that is, street light lamps of the nodes, a administrator phone number (Phone number) of the gateway, position information of the gateway (e.g. latitude and longitude) (Latitude, Longitude), the number of entire nodes communicating with the gateway, and the number of nodes of which a street light lamp is turned off among the nodes communicating with the gateway.

Figure 16:
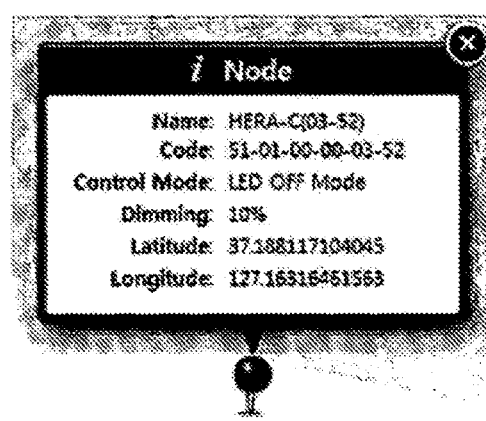

A window including information about a node displayed on the digital map 501 may have a form as in, for example, FIG. 16, and the information about a node may include at least one of a name of the node (Name), a MAC address of the node (Code), a mode indicating an on or off state of a street light lamp of the node (Control Mode), dimming information of a street light lamp of the node (Dimming), and position information of the node (e.g. latitude and longitude).

Figure 17:
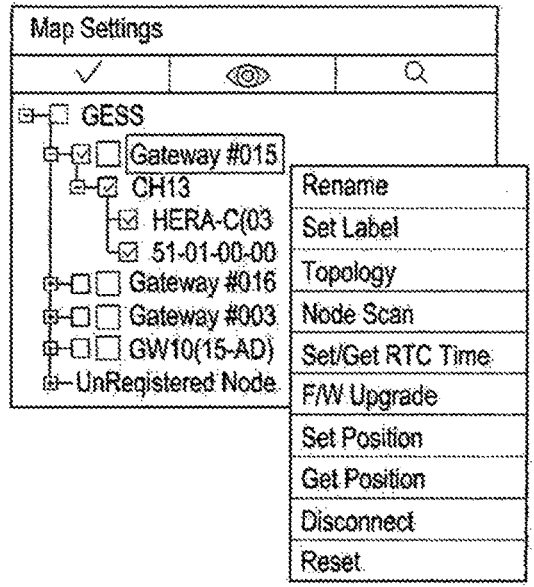
FIG. 17 is a view showing execution of a menu for a control of a gateway in a tree structure window.
Figure 18:
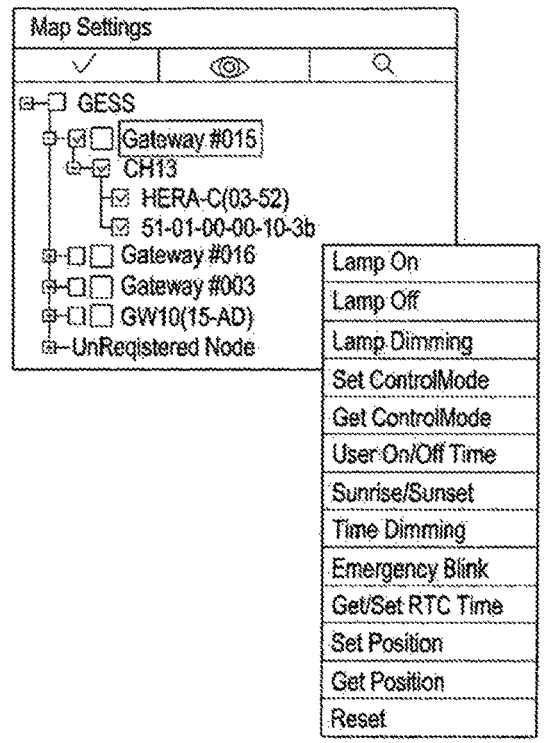
FIG. 18 is a view showing execution of a menu for a control of a node in the tree structure window according to an embodiment of the present disclosure.

FIG. 17 is a view showing execution of a menu for a control of a gateway in a tree structure window, and FIG. 18 is a view showing execution of a menu for a control of a node in the tree structure window according to an embodiment of the present disclosure. The terminal device may execute (activate) and display a context menu of a gateway that is a menu for controlling the gateway as in FIG. 17 in the tree structure window in digital map option window, according to a user operation. Further, the terminal device may execute (activate) and display a context menu of a node that is a menu for controlling the node as in FIG. 18 in the tree structure window in digital map option window, according to a user operation.

The activation of the context menu of the gateway and the context menu of the node may be performed according to a selection of a gateway, a communication channel, and/or a node according to a user operation (according to a check in a checkbox). For example, the context menu of the gateway may be activated when the gateway is selected (a checkbox thereof is checked), and the context menu of the node may be activated only when all of the gateway, the channel and the node are selected (checkboxes thereof are checked). Further, the context menu of the gateway or the context menu of the node may be executed (activated) according to the checked checkbox. For example, when only the checkbox of the gateway is checked, and a user operation for executing a context menu is performed, the terminal device may execute the context menu of the gateway. Further, when all of the checkboxes of the gateway, the channel, and the node are checked, and a user operation for executing a context menu is performed, the terminal device may execute the context menu of the node. Detailed description for menus included in the context menu of the node and menus included in the context menu of the gateway will be provided below.

Figure 19:
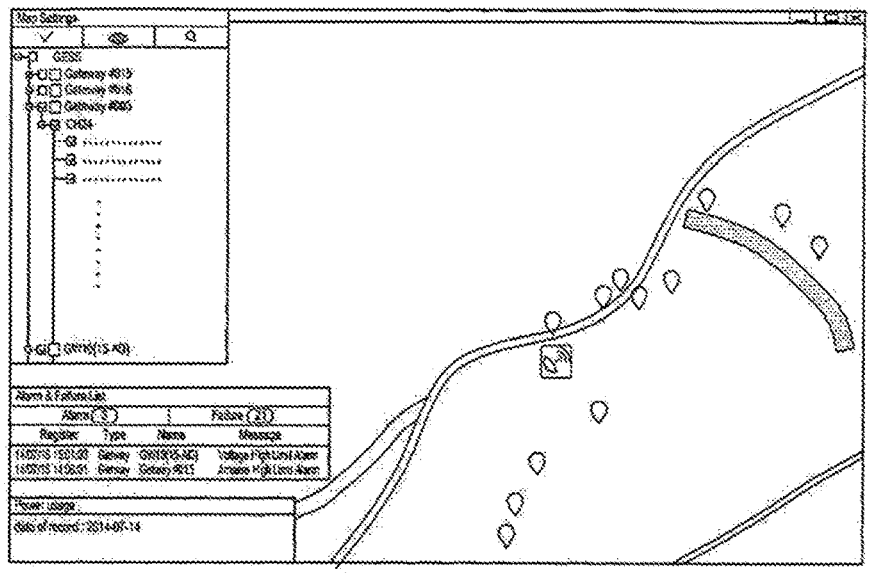
FIG. 19 is a view for describing a method for selecting or deselecting a gateway and a node in a digital map according to an embodiment of the present disclosure.
Figure 20:
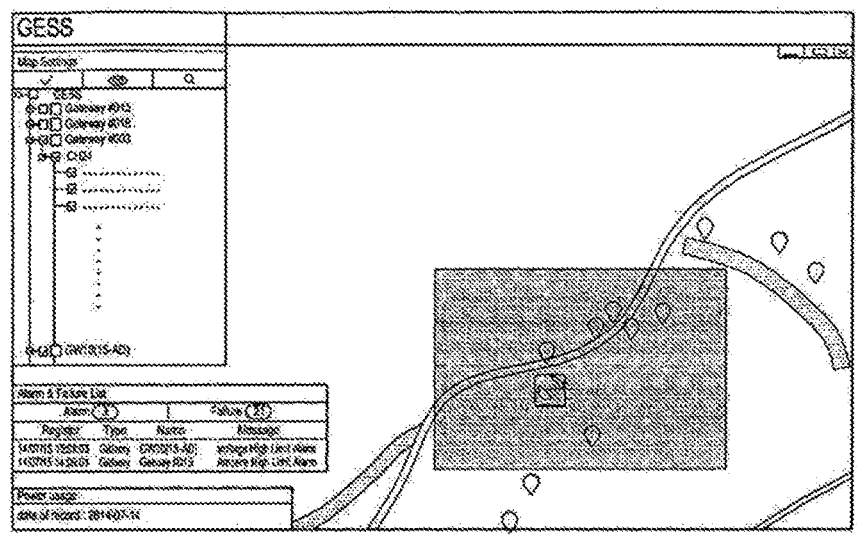
FIG. 20 is a view for describing a method for selecting or deselecting a gateway and a node in a digital map according to another embodiment of the present disclosure.

FIG. 19 is a view for describing a method for selecting or deselecting a gateway and a node in a digital map according to an embodiment of the present disclosure, and FIG. 20 is a view for describing a method for selecting or deselecting a gateway and a node in a digital map according to another embodiment of the present disclosure. According to an embodiment of the present disclosure, whether a gateway or a node is selected in the tree structure window in the digital map option window may be synchronized with whether a gateway or a node displayed on the digital map is selected. For example, when a gateway displayed in the tree structure window is selected according to a user operation, the terminal device may display the gateway in a corresponding position on the digital map. Further, when a communication channel and a node displayed in the tree structure window are selected according to a user operation, the terminal device may display the node in a corresponding position on the digital map. Further, when the gateway selected in the tree structure window is deselected, the terminal device may terminate display of the gateway displayed in the corresponding position on the digital map. Further, when the node selected in the tree structure window is deselected, the terminal device may terminate display of the node displayed in the corresponding position on the digital map. Further, when the node displayed in the corresponding position on the digital map is deselected (the display of the node is released) according to a user operation, the display of the node on the digital map is terminated, and at the same time, it is possible to display in the tree structure window that the node is deselected. Further, when the gateway displayed in the corresponding position on the digital map is deselected (the display of the gateway is released), the display of the gateway and the node on the digital map is terminated, and it is possible to display in the tree structure window that the gateway and the node are deselected.

Referring to FIG. 19, in a method for individually selecting or deselecting each of a gateway, a channel, and a node, the user may select or deselect each of a gateway, a channel, and a node on the digital map through mouse click, touch input, or the like. For example, when the user uses a keyboard and a mouse, the method for individually selecting or deselecting each of a gateway, a channel, and a node may be putting a mouse cursor on a gateway or a node to be selected or deselected and clicking a left button of the mouse while pressing a shift key of the keyboard (shift+mouse left click). Meanwhile, when a specific gateway or node selected according to a user operation is displayed on the digital map, the specific gateway or node may be in a selected state (a state in which selection of the gateway or node is displayed) in the tree structure window, and when a display of a gateway or node deselected according to a user operation is terminated on the digital map, the deselected gateway or node may be in a deselected state (a state in which a deselection of the gateway or node is displayed) in the tree structure window.

Referring to FIG. 20, in a method for selecting or deselecting a gateway, a channel, and a node in group, the user may select an area in which a gateway and a node are displayed on the digital map through mouse click, touch input, or the like to select or deselect all of a gateway, a channel, and a node included in the selected area. For example, when the user uses a keyboard and a mouse, a method of selecting an area in which a gateway and a node are displayed on the digital map may be dragging the mouse while pressing a shift key of the keyboard (shift+mouse drag) to select the area in which a gateway and a node are displayed on the digital map.

Figure 21:
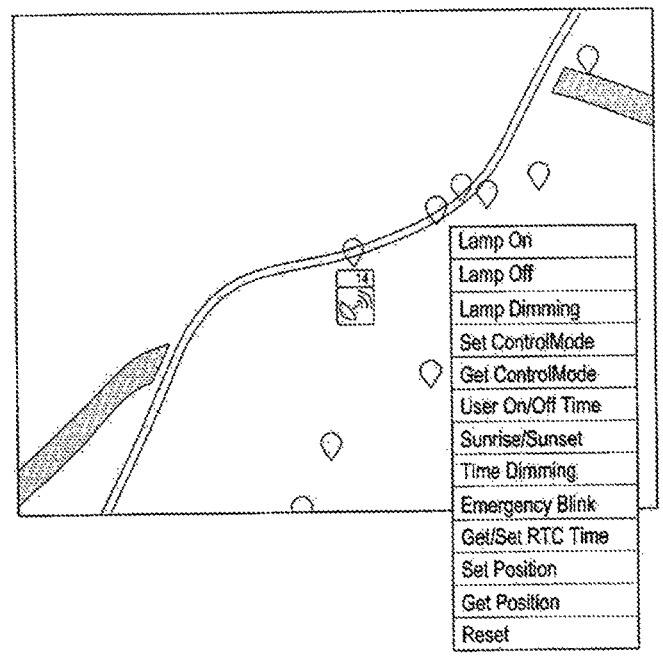
FIG. 21 is a view showing execution of a menu for a control of a node on the digital map according to an embodiment of the present disclosure.
Figure 22:
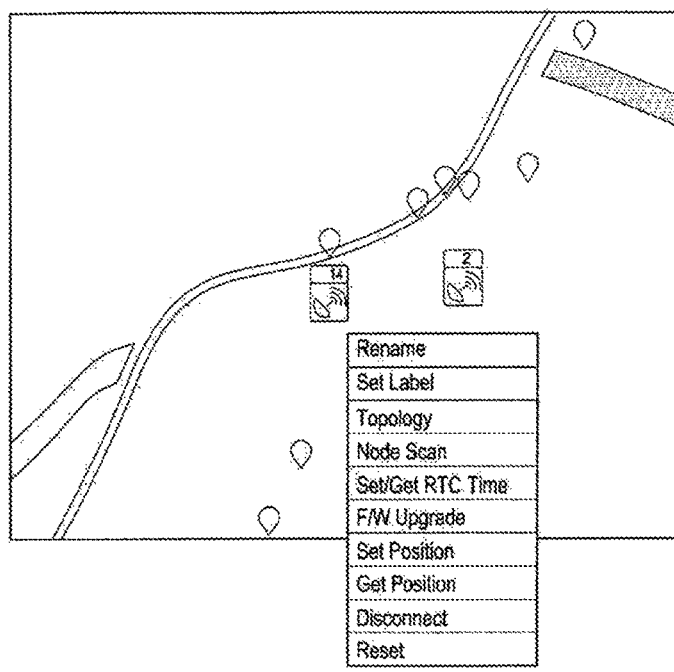
FIG. 22 is a view showing execution of a menu for a control of a gateway on the digital map according to an embodiment of the present disclosure.

FIG. 21 is a view showing execution of a menu for a control of a node on the digital map, and FIG. 22 is a view showing execution of a menu for a control of a gateway on the digital map according to an embodiment of the present disclosure. A context menu of a node that is a menu for controlling a selected node (or nodes) or entire nodes may be executed and displayed on the digital map according to a user operation as in FIG. 21. Further, a context menu of a gateway that is a menu for controlling a selected gateway (or gateways) or entire gateways may be executed and displayed on the digital map according to a user operation as in FIG. 22.

Figure 23A:
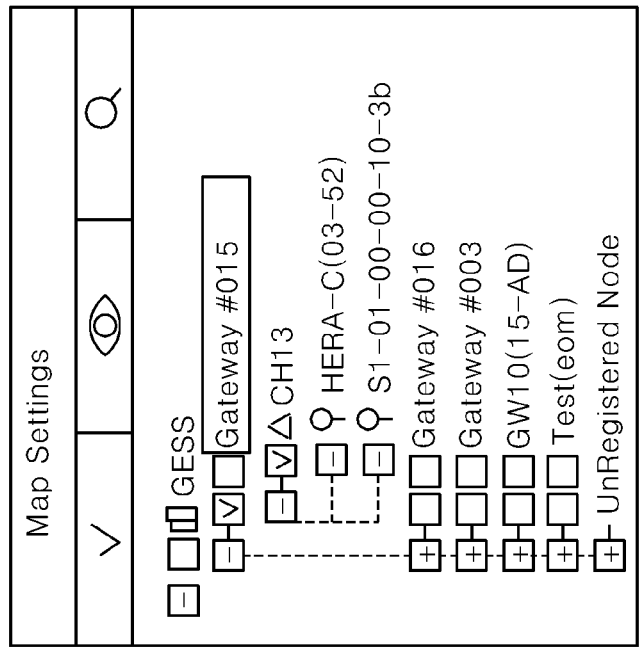
FIGS. 23A and 23B are views for describing an operation of executing a Rename menu in a context menu of a gateway according to an embodiment of the present disclosure.
Figure 23B:
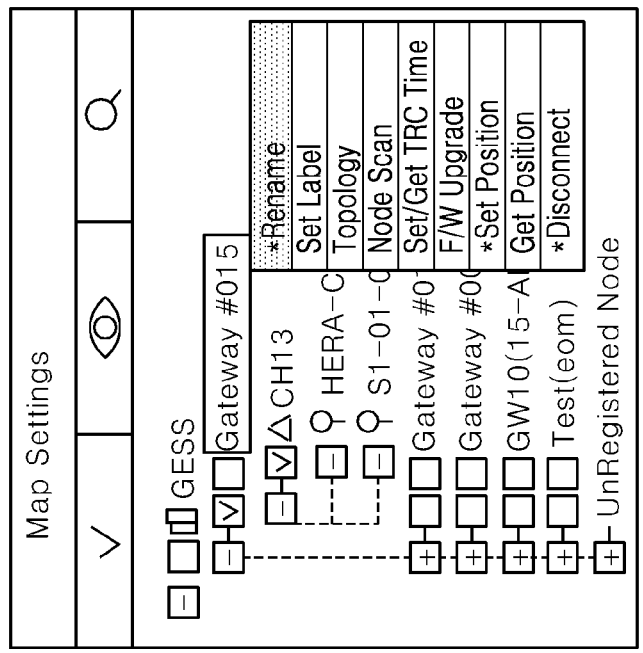

FIGS. 23A and 23B are views for describing an operation of executing a Rename menu in a context menu of a gateway according to an embodiment of the present disclosure. For example, in a case in which the user uses a mouse, when a gateway is selected by mouse click in the tree structure window, the terminal device checks corresponding check box, and then when the user clicks a right button of the mouse, the terminal device may activate a context menu window as in FIG. 23A. As in FIG. 23A, when a Rename menu is selected in the context menu according to a user operation, the terminal device displays a position where a new name may be input as in FIG. 23B, and the new name may be input in the displayed position according to a user operation.

Figures 24A, 24B:
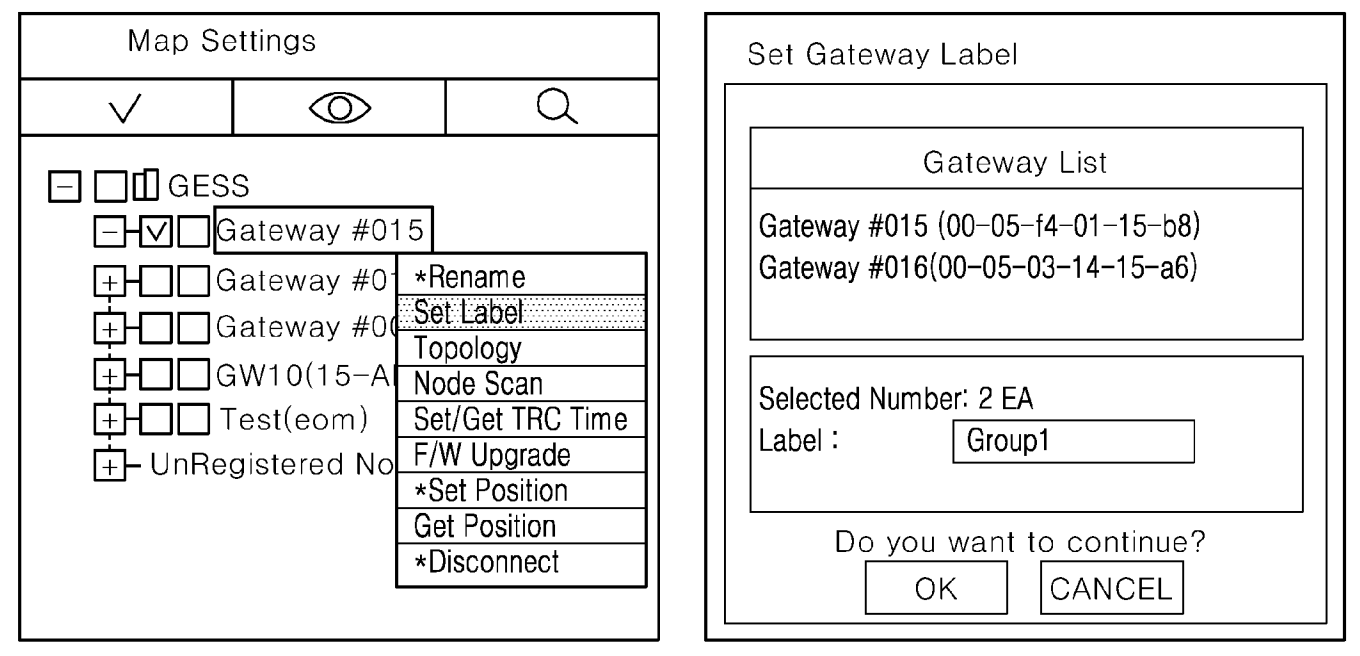

FIGS. 24A and 24B are views for describing an operation of executing a Set Label menu in a context menu of a gateway according to an embodiment of the present disclosure. A label setting is a setting for generating one logical group of some of gateways, and according to the setting, one group or multiple groups may be generated.

For example, in a case in which the user uses a mouse, when the Set Label menu in a context menu is selected in a context menu window of one or more gateways selected according to a user operation as in FIG. 24A, the terminal device displays a window for setting a group of the one or more gateways as in FIG. 24B, and may set (set label) or change (change label) the group of the one or more gateways when a set group name is input in a label portion (Label) according to a user operation.

Figures 25A, 25B:
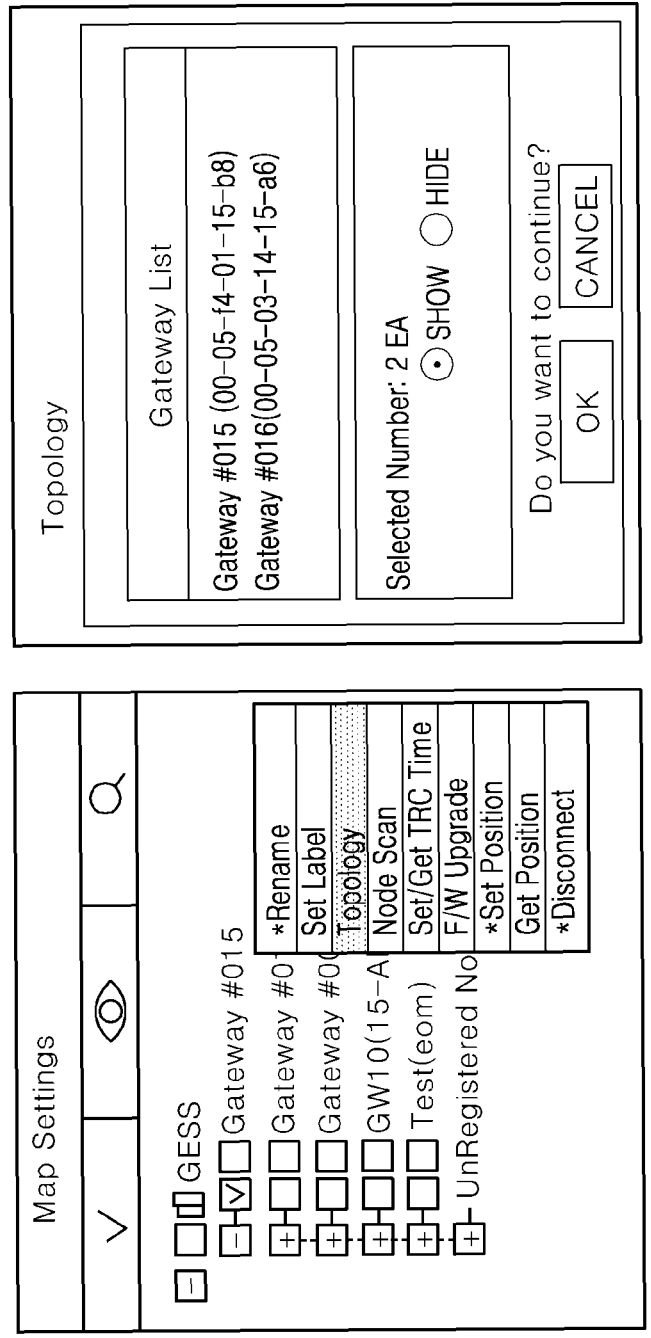
FIGS. 25A and 25B are views for describing an operation of executing a Topology menu in a context menu of a gateway according to an embodiment of the present disclosure.

FIGS. 25A and 25B are views for describing an operation of executing a Topology menu in a context menu of a gateway according to an embodiment of the present disclosure. The Topology menu is a setting menu for showing or hiding a relationship of a subnode of a selected gateway. Referring to FIGS. 25A and 25B, when the Topology menu in a context menu is selected in a context menu window of one or more gateways selected according to a user operation as in FIG. 25A, the terminal device displays a setting window for showing or hiding a subnode of the one or more gateways as in FIG. 25B, and may show or hide the subnode of the corresponding gateway when the setting for showing or hiding is performed according to a user operation.

Figure 26B:
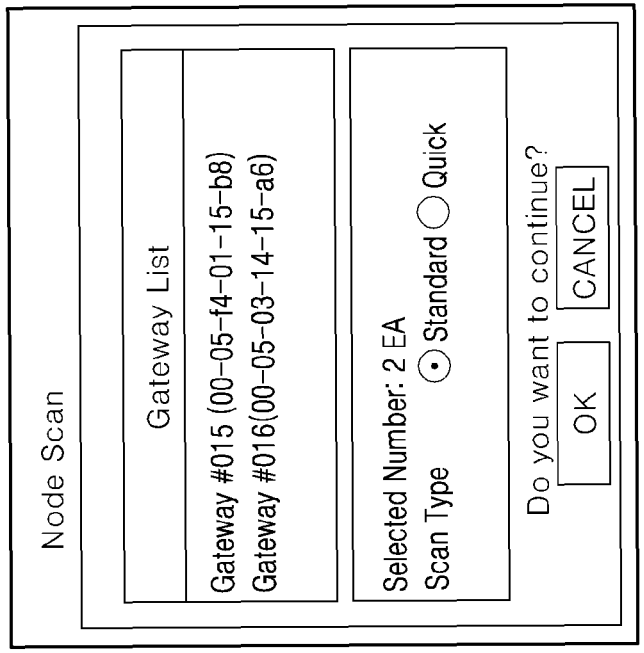
FIGS. 26A and 26B are views for describing an operation of executing a Node Scan menu in a context menu of a gateway according to an embodiment of the present disclosure.
Figure 26A:
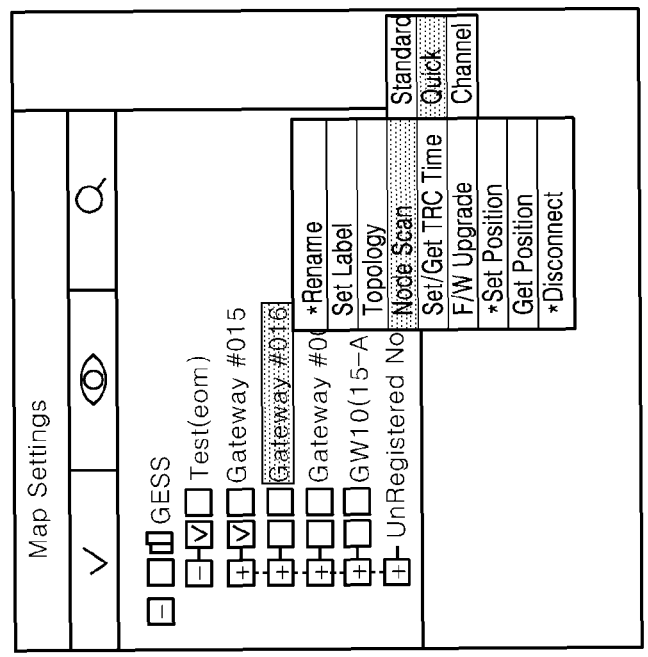

FIGS. 26A and 26B are views for describing an operation of executing a Node Scan menu in a context menu of a gateway according to an embodiment of the present disclosure. The Node Scan menu is a setting menu for obtaining information of subnodes of a corresponding gateway. Referring to FIGS. 26A and 26B, when the Node Scan menu in a context menu is selected in a context menu window of one or more gateways selected according to a user operation as in FIG. 26A, the terminal device displays a window for setting or changing a scan type of the one or more gateways as in FIG. 26B, and the scan type may include a Standard type and a Quick type. When the scan type is set or changed according to a user operation, the terminal device may reflect the corresponding scan type to obtain information about subnodes of each of the one or more gateways from the one or more gateways. At this point, the Standard type is unconditionally performing a scan for entire channels, and the Quick type is performing a scan only for nodes receiving ACK through the standard scan.

Figures 27A, 27B:
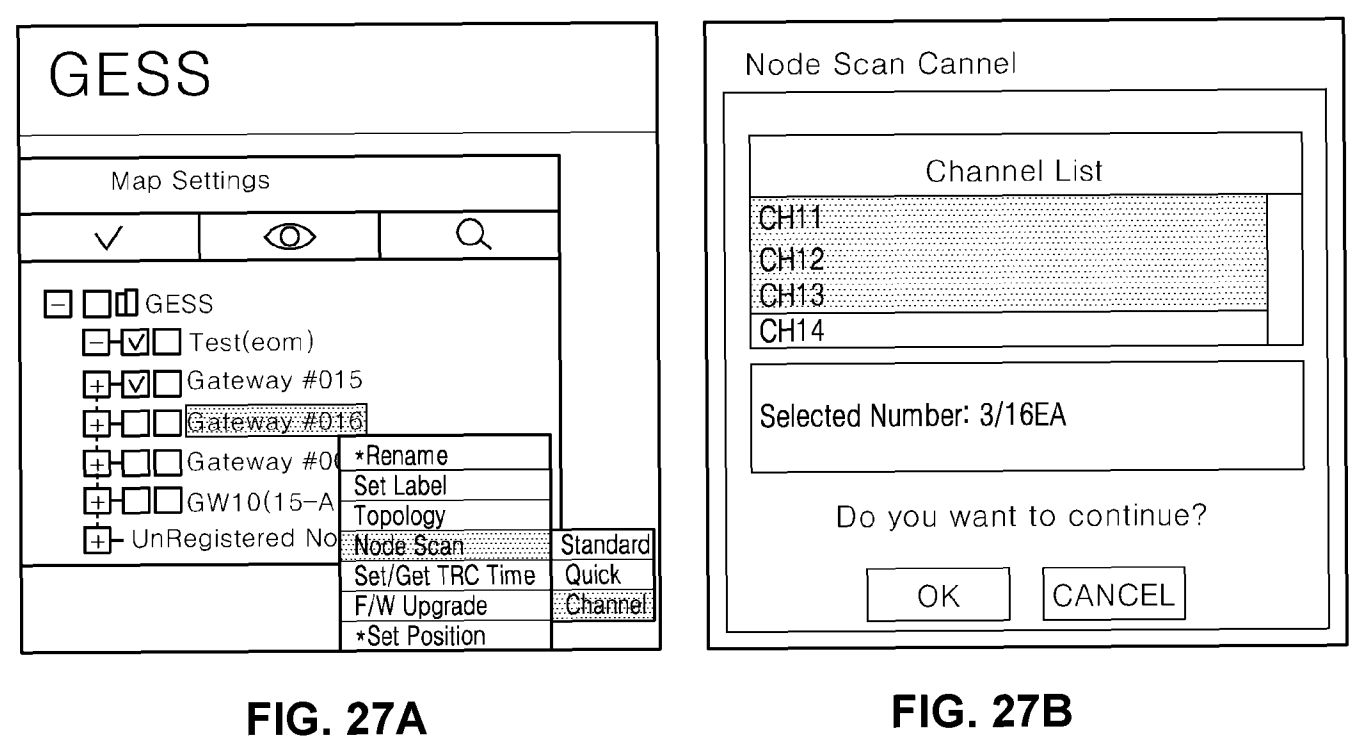

FIGS. 27A and 27B are views for describing an operation of executing a Node Scan menu in a context menu of a gateway according to another embodiment of the present disclosure. Referring to FIGS. 27A and 27B, a Standard menu, a Quick menu, and a Channel menu may be included as a sub-menu of a context menu of one or more gateways selected according to a user operation as in FIG. 27A. When the Channel menu is selected according to a user operation, the terminal device may display a window for selecting channels to be subject to node scan as in FIG. 27B, and when one or more channels are selected according to a user operation, the terminal device may perform node scan of the selected channel. For example, the terminal device may obtain information about nodes connected to the selected channel from a gateway connected to the selected channel.

Figure 28:
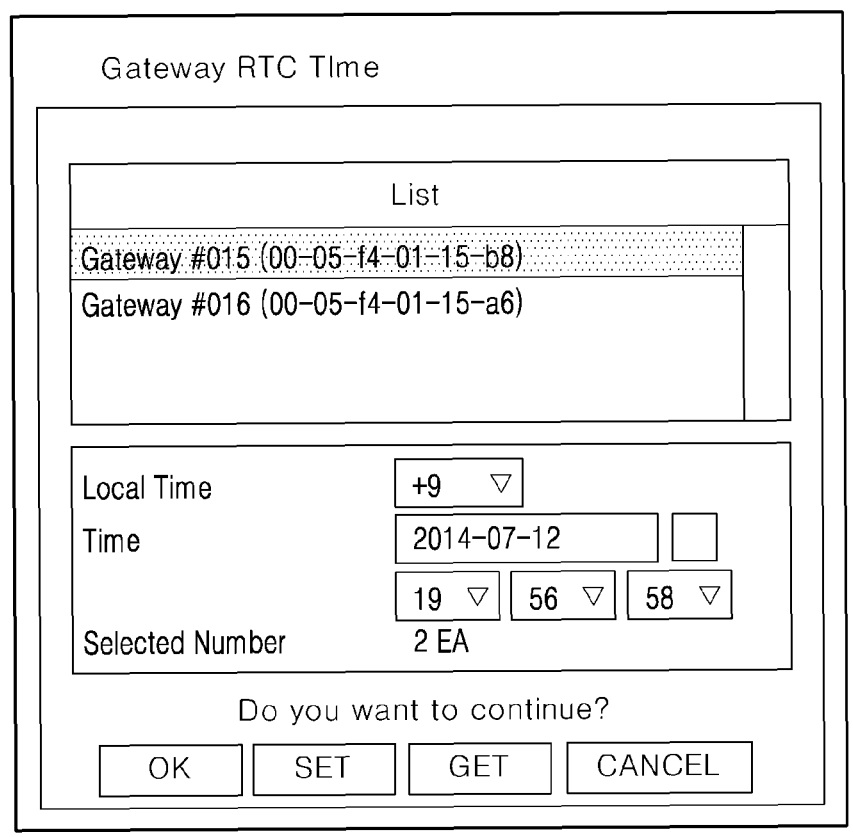
FIG. 28 is a view for describing an operation of executing a Set/Get RTC Time menu in a context menu of a gateway according to an embodiment of the present disclosure.

FIG. 28 is a view for describing an operation of executing a Set/Get RTC (real time clock) Time menu in a context menu of a gateway according to an embodiment of the present disclosure. When the Set/Get RTC Time menu is selected according to a user operation, a screen for setting calculation of a local time and setting a time may be displayed as in FIG. 28. Further, the RTC time may be received from a gateway according to a user operation and may be set to be displayed on the display unit of the terminal device. When a control type, post processing, a local time, and a time are set according to a user operation, the terminal device may perform various settings such as a user time mode, sunrise/sunset scheduling, etc.

Figure 29A:
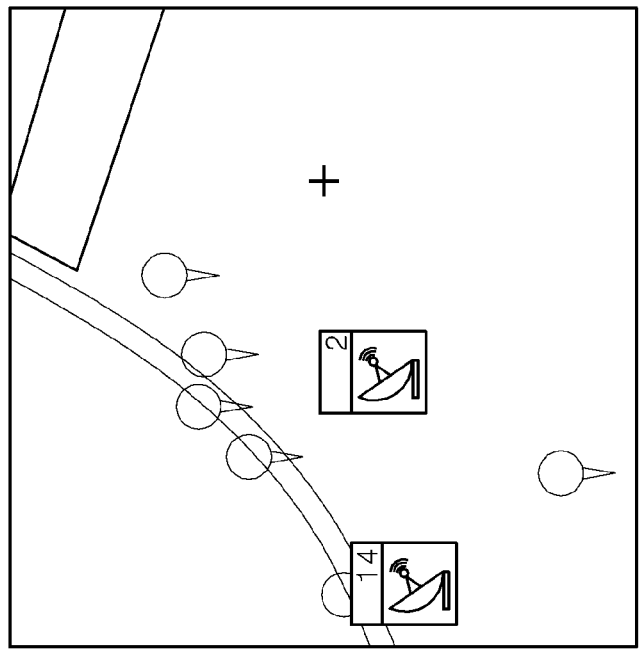
FIGS. 29A and 29B are views for describing an operation of executing a Set Position menu in a context menu of a gateway according to an embodiment of the present disclosure.
Figure 29B:
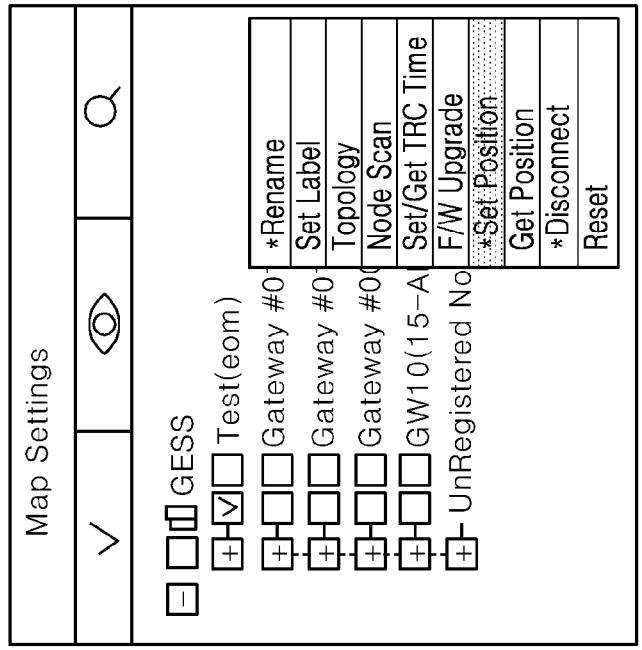

FIGS. 29A and 29B are views for describing an operation of executing a Set Position menu in a context menu of a gateway according to an embodiment of the present disclosure. For example, in a case in which the user uses a mouse, when a Set Position menu in a context menu of a specific gateway is selected as in FIG. 29A according to a user operation, a shape of a mouse pointer is changed into a "+" shape as in FIG. 29B, and when the user clicks a left button of the mouse at a desired position on the digital map, the terminal device may set the clicked position as a position of the specific gateway, and obtain position information (e.g. latitude and longitude information) of the corresponding position.

Meanwhile, the context menu of the gateway may include a Get Position menu, in which the Get Position menu may be executed according to a user operation to obtain position information pre-stored in the selected gateway.

Figure 30:
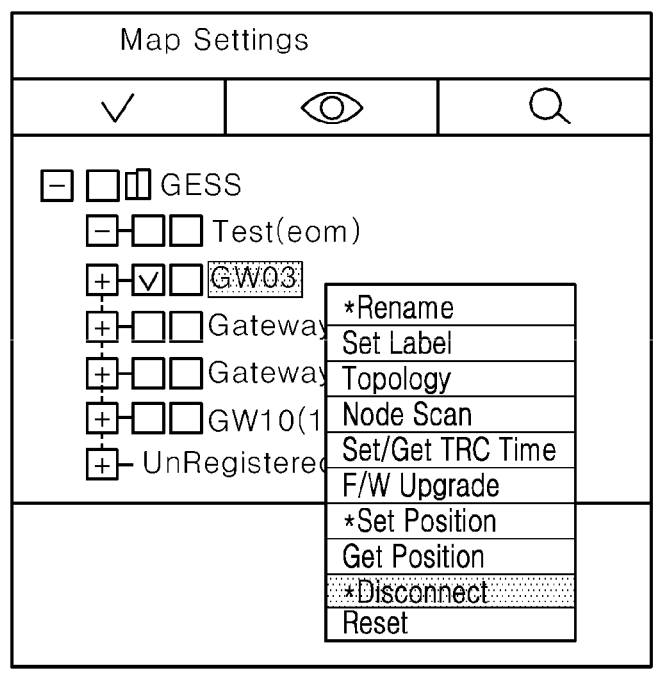
FIG. 30 is a view for describing an operation of executing a Disconnect menu in a context menu of a gateway according to an embodiment of the present disclosure.

FIG. 30 is a view for describing an operation of executing a Disconnect menu in a context menu of a gateway according to an embodiment of the present disclosure. When a Disconnect menu in a context menu of a specific gateway is selected as in FIG. 30 according to a user operation, the terminal device may forcibly terminate TCP connection between the server and the specific gateway. Meanwhile, the Disconnect menu may be activated only in a state in which the server and the gateway establish TCP connection.

Figures 31A, 31B:
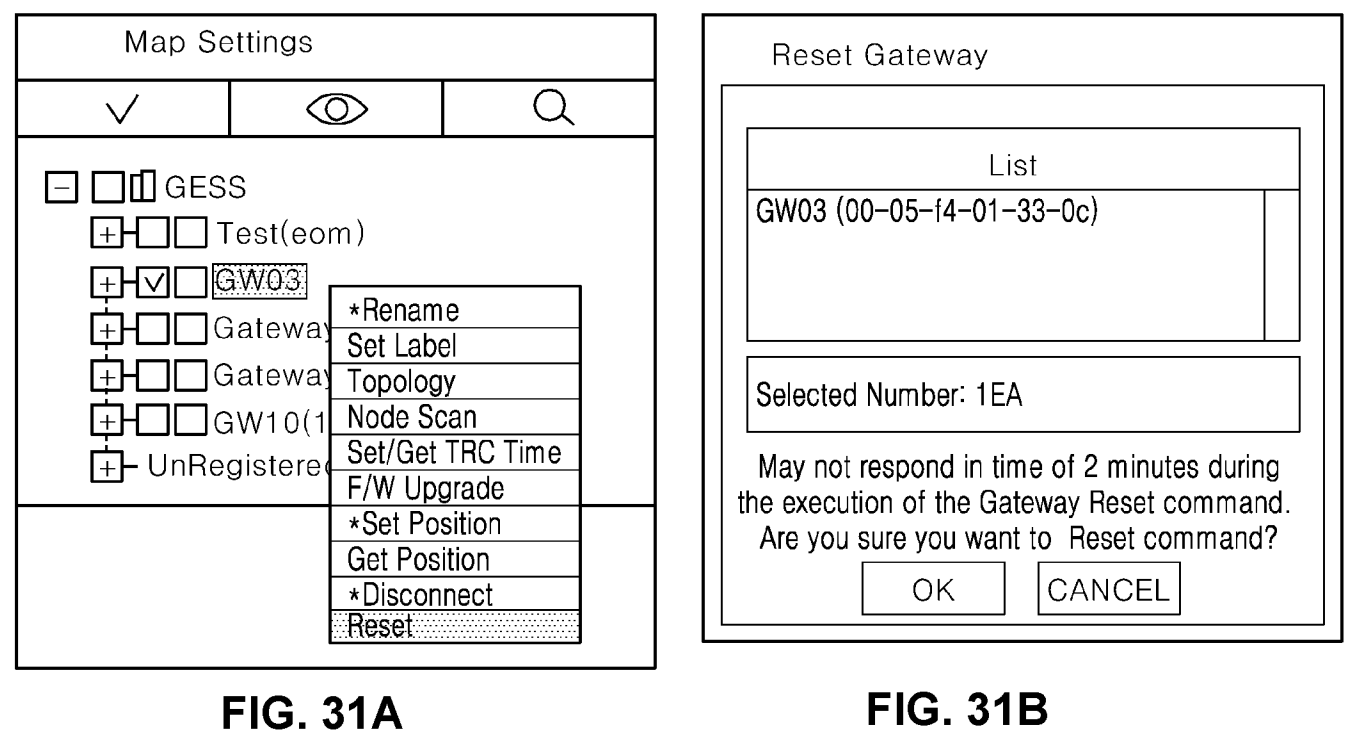

FIGS. 31A and 31B are views for describing an operation of executing a Reset menu in a context menu of a gateway according to an embodiment of the present disclosure. When a Reset menu in a context menu of a specific gateway is selected as in FIG. 31A according to a user operation, the terminal device may display information about the specific gateway selected as a target to be reset, and a warning as in FIG. 31B. When execution of the Reset menu is selected according to a user operation, the terminal device may reset the specific gateway.

Figures 32A, 32B:
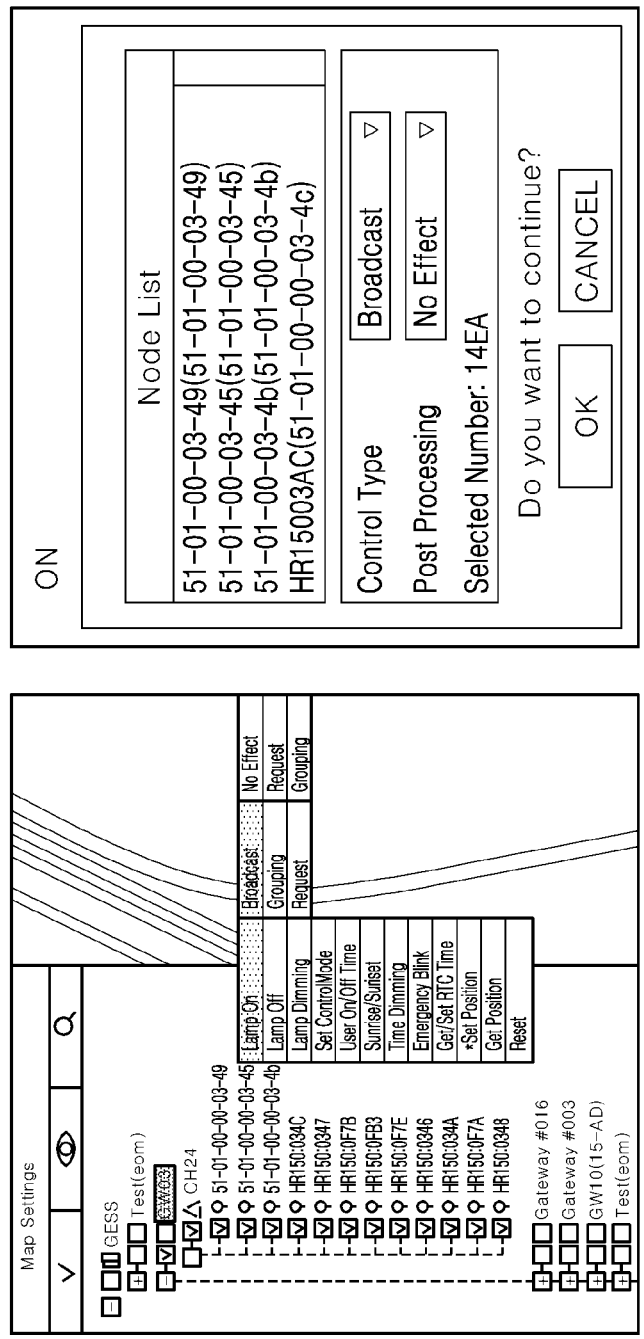
FIGS. 32A and 32B are views for describing an operation of executing a Lamp On menu in a context menu of a node according to an embodiment of the present disclosure.

FIGS. 32A and 32B are views for describing an operation of executing a Lamp On menu in a context menu of a node according to an embodiment of the present disclosure. When a Lamp On menu in a context menu of one or more nodes is selected according to a user operation, the terminal device may display a Broadcast menu, a Request menu, and a Grouping menu as a menu for a control type that is a sub-menu of the Lamp On menu as in FIGS. 32A and 32B. Further, the Broadcast menu may include a No Effect menu, a Request menu, and a Grouping menu that are menus for post processing as sub-menus for the broadcast, as illustrated in FIG. 32A. The No Effect menu means that An ACK signal is not requested to a target node for a control command for controlling the one or more nodes, the Request menu is requesting an ACK signal to the target node for the control command for controlling the one or more nodes, and the Grouping menu is checking whether to control corresponding plurality of nodes at once when a plurality of nodes are selected according to a user operation. When the Broadcast menu that is a sub-menu of the Lamp On menu is selected as in FIG. 32A according to a user operation, the terminal device may display a screen for selecting a control type (Control Type) and post processing (Post Processing) as in FIG. 32B. When a processing option (the control type or the post processing) is selected according to a user operation, the terminal device may apply corresponding option to a corresponding node.

Meanwhile, the broadcast that is one of control types may be performed when a request for broadcast in a gateway unit or a channel unit is possible. Further, even when a control for the broadcast is performed, if a requirement is not satisfied, a control according to a default setting value (request or grouping) may be performed, and then an additional control may be performed according to the processing menu.

Further, the request that is one of control types may be performed in a request form in a gateway unit.

Further, the grouping that is one of control types may be performed in a grouping form in a gateway unit.

Further, the post processing depends on the control type. When the requested control type is the broadcasting, the post processing may be the request or the grouping.

Meanwhile, an operation of executing a lamp off menu in a context menu is the same as the operation of executing the Lamp On menu described above.

Figures 33A, 33B:
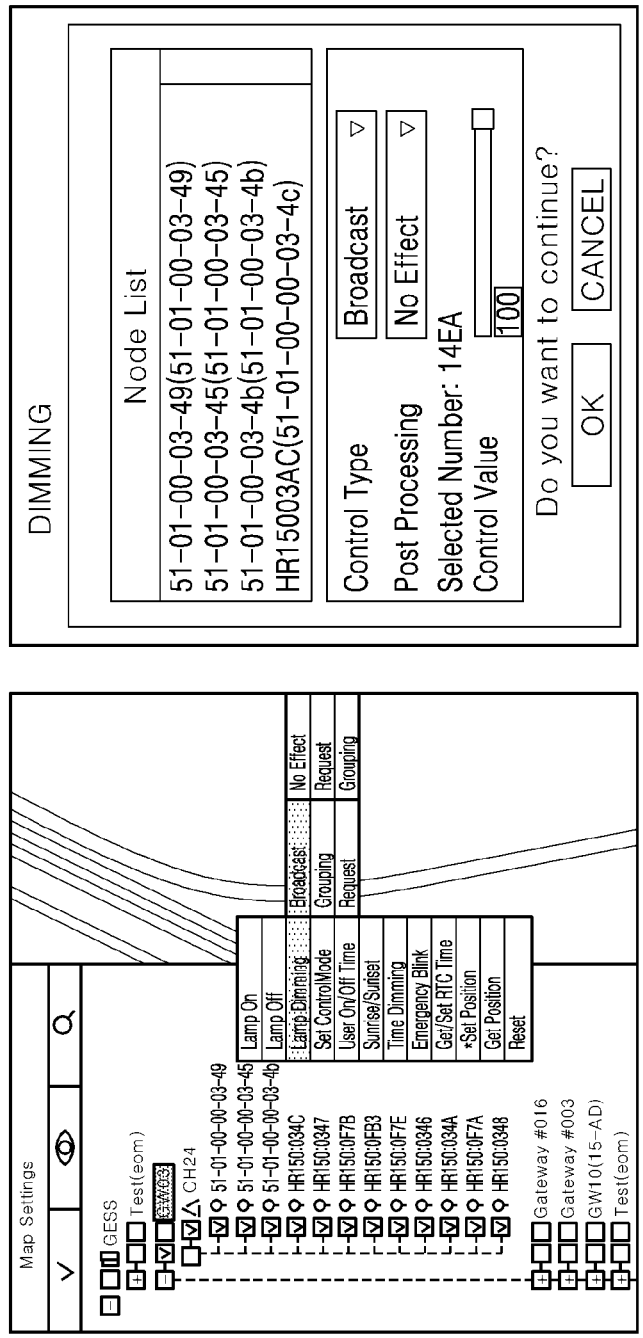
FIGS. 33A and 33B are views for describing an operation of executing a Lamp Dimming menu in a context menu of a node according to an embodiment of the present disclosure.

FIGS. 33A and 33B are views for describing an operation of executing a Lamp Dimming menu in a context menu of a node according to an embodiment of the present disclosure. When a Lamp Dimming menu in a context menu of one or more nodes is selected as in FIG. 33A according to a user operation, the terminal device may display a Broadcast menu, a Grouping menu, and a Request menu that are sub-menus of the Lamp Dimming menu. Further, the Broadcast menu may include a No Effect menu, a Request menu, and a Grouping menu that are menus for post processing as sub-menus of the Broadcast menu, as illustrated in FIG. 33A. When the Broadcast menu that is a sub-menu of the Lamp Dimming menu is selected as in FIG. 33A according to a user operation, the terminal device may display a screen for selecting a control type (Control Type; also referred to as control form) and post processing (Post Processing), and setting a dimming value (Control Value) as in FIG. 33B. When a processing option (the control type or the post processing) is selected according to a user operation, the terminal device may apply corresponding option to a corresponding node.

Figures 34A, 34B:
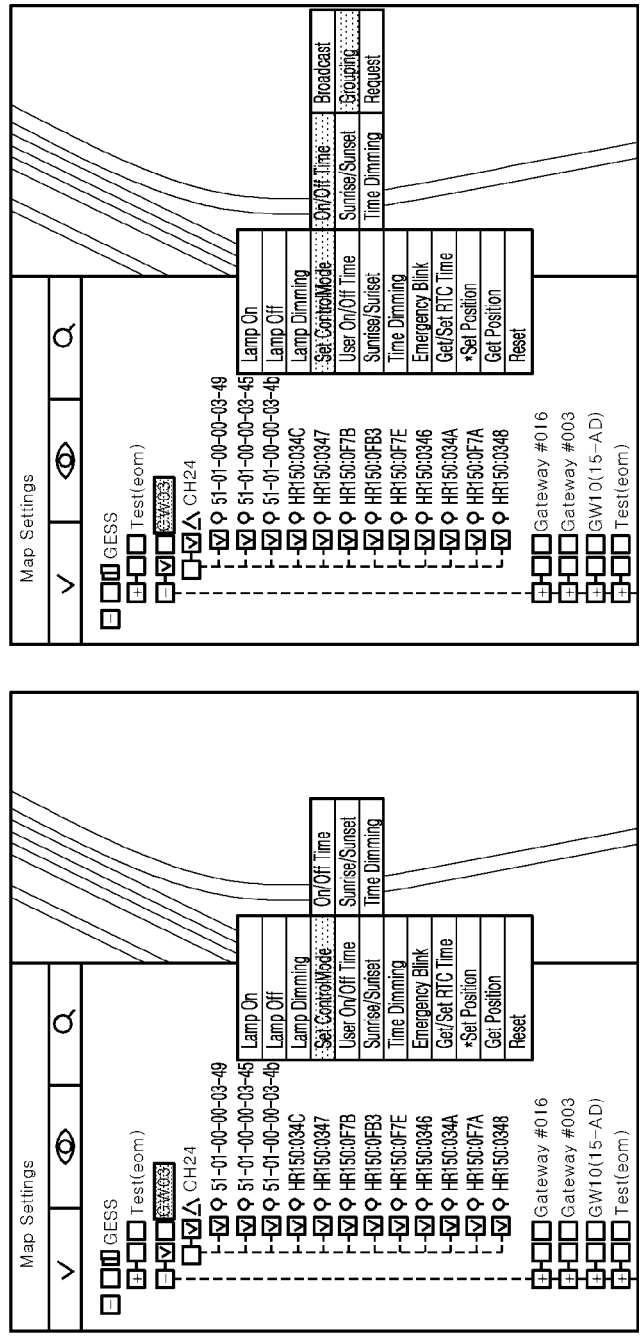
FIGS. 34A and 34B are views for describing an operation of executing a Set Control Mode menu in a context menu of a node according to an embodiment of the present disclosure.

FIGS. 34A and 34B are views for describing an operation of executing a Set Control Mode menu in a context menu of a node according to an embodiment of the present disclosure. When a Set Control Mode menu in a context menu of one or more nodes is selected as in FIG. 34A according to a user operation, the terminal device may display an ON/OFF time menu, a Sunrise/Sunset menu, and a Time Dimming menu that are sub-menus of the Set Control Mode menu. When the ON/OFF TIME menu is selected according to a user operation, the terminal device may display a Broadcast menu, a Grouping menu, and a Request menu as sub-menus of the ON/OFF TIME menu as in FIG. 34B. When the Grouping menu is selected as in FIG. 34B according to a user operation, the terminal device may simultaneously turn on/off street light lamps of the one or more nodes at a predetermined time.

Meanwhile, the ON/OFF TIME menu is to turn on/off the street light lamps of the one or more nodes at a predetermined time, the Sunrise/Sunset menu is to turn on/off the street light lamps of the one or more nodes at each predetermined time zone, and the Time Dimming menu is to perform dimming of the street light lamps of the one or more nodes at a predetermined time.

Figure 35:
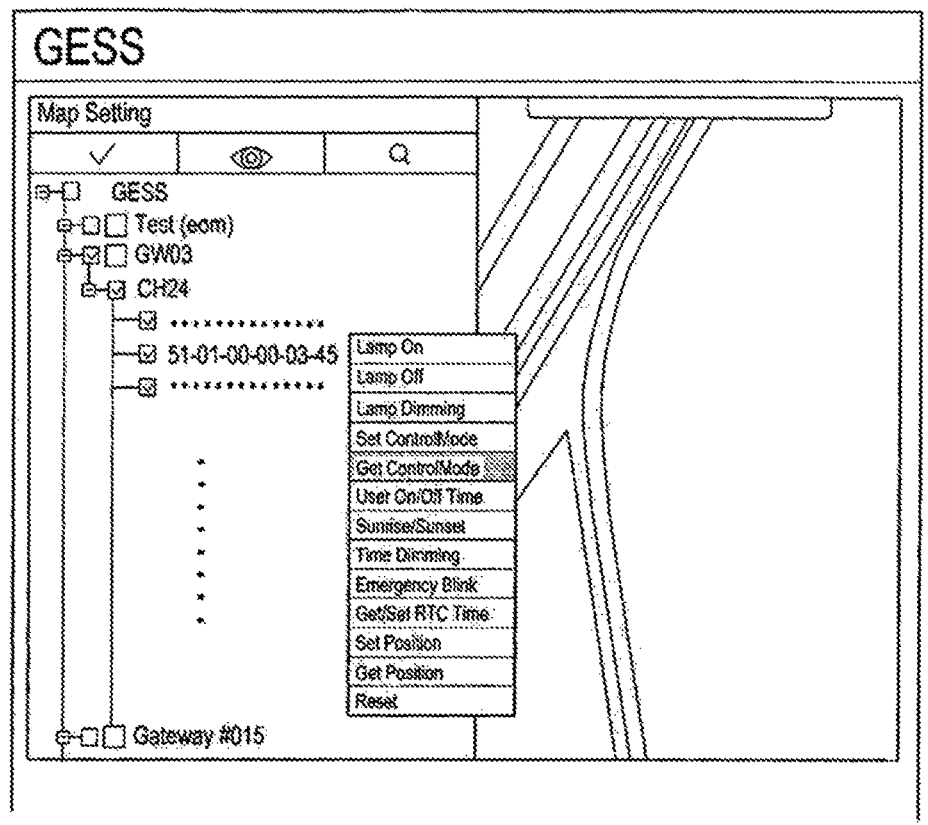
FIG. 35 is a view for describing an operation of executing a Get Control Mode menu in a context menu of a node according to an embodiment of the present disclosure.

FIG. 35 is a view for describing an operation of executing a Get Control Mode menu in a context menu of a node according to an embodiment of the present disclosure. When the Get Control Mode menu in FIG. 35 is selected according to a user operation, the terminal device may check whether a control mode is a Broadcast or a Request, and in the case of the Broadcast, check whether it is No Effect or a Request.

Figure 36A:
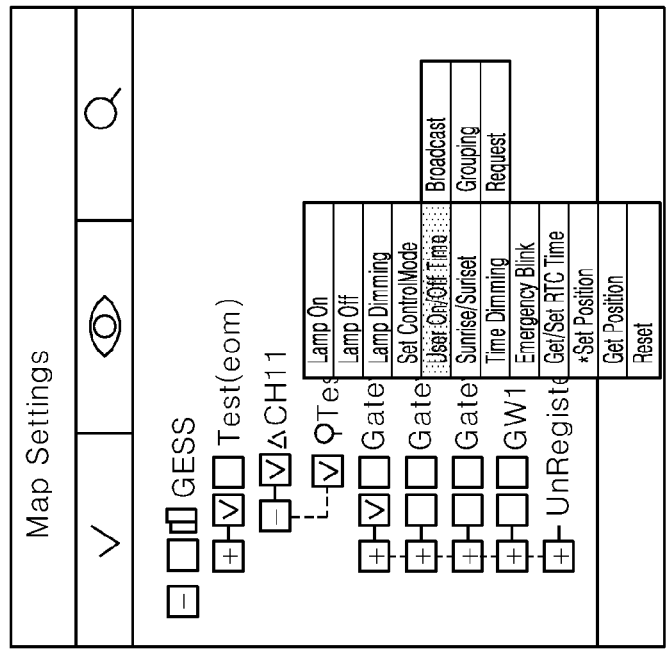
FIGS. 36A and 36B are views for describing an operation of executing a User On/Off Time menu in a context menu of a node according to an embodiment of the present disclosure.
Figure 36B:
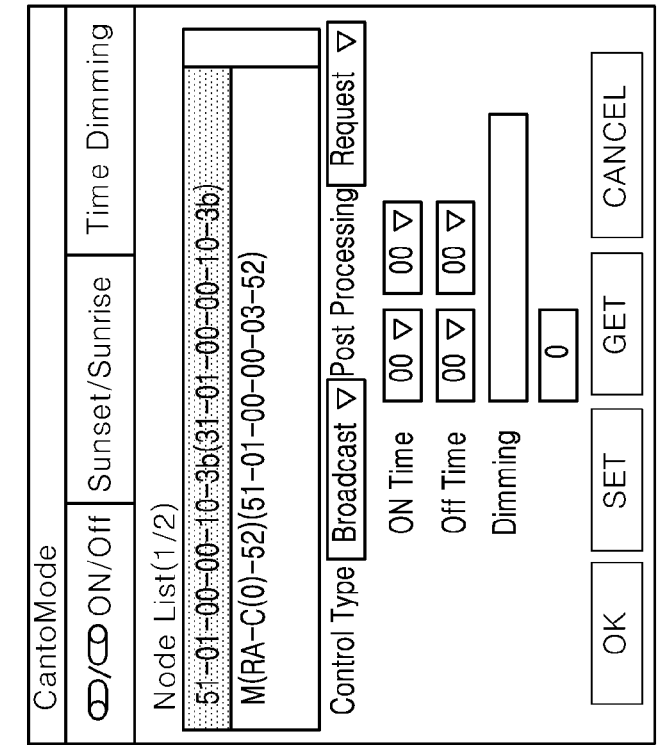

FIGS. 36A and 36B are views for describing an operation of executing a User On/Off Time menu in a context menu of a node according to an embodiment of the present disclosure. When a User On/Off Time menu of street light lamps of one or more nodes is selected according to a user operation, the terminal device may display a Broadcast menu, a Grouping menu, and a Request menu as sub-menus of the User On/Off Time menu as in FIG. 36A. When the User On/Off Time menu is selected as in FIG. 36A according to a user operation, the terminal device may display a screen for selecting a control type, post processing, an on time of the street light lamp, and an off time of the street light lamp, and dimming of the street light lamp for the one or more nodes as in FIG. 36B. When the control type, the post processing, the on time of the street light lamp, and the off time of the street light lamp, and the dimming of the street light lamp for the one or more nodes are set according to a user operation, the terminal device may reflect the set matters to turn on the street light lamps of the one or more nodes by applying the set dimming value at a predetermined time and turn off the street light lamps of the one or more nodes.

Meanwhile, when using a keyboard and a mouse, the user may select the one or more nodes on the digital map by clicking a left button of the mouse or dragging the mouse in a state of pressing a Ctrl key of the keyboard.

Meanwhile, a context menu of a node may include a Sunrise/Sunset menu and a Time Dimming menu, in which the Sunrise/Sunset menu is to set on or off of a street light lamp of a selected node for each predetermined time zone, and the Time Dimming menu is to set a dimming value of a predetermined time to change a dimming value of a street light lamp of a selected node at the predetermined time.

Figures 37A, 37B:
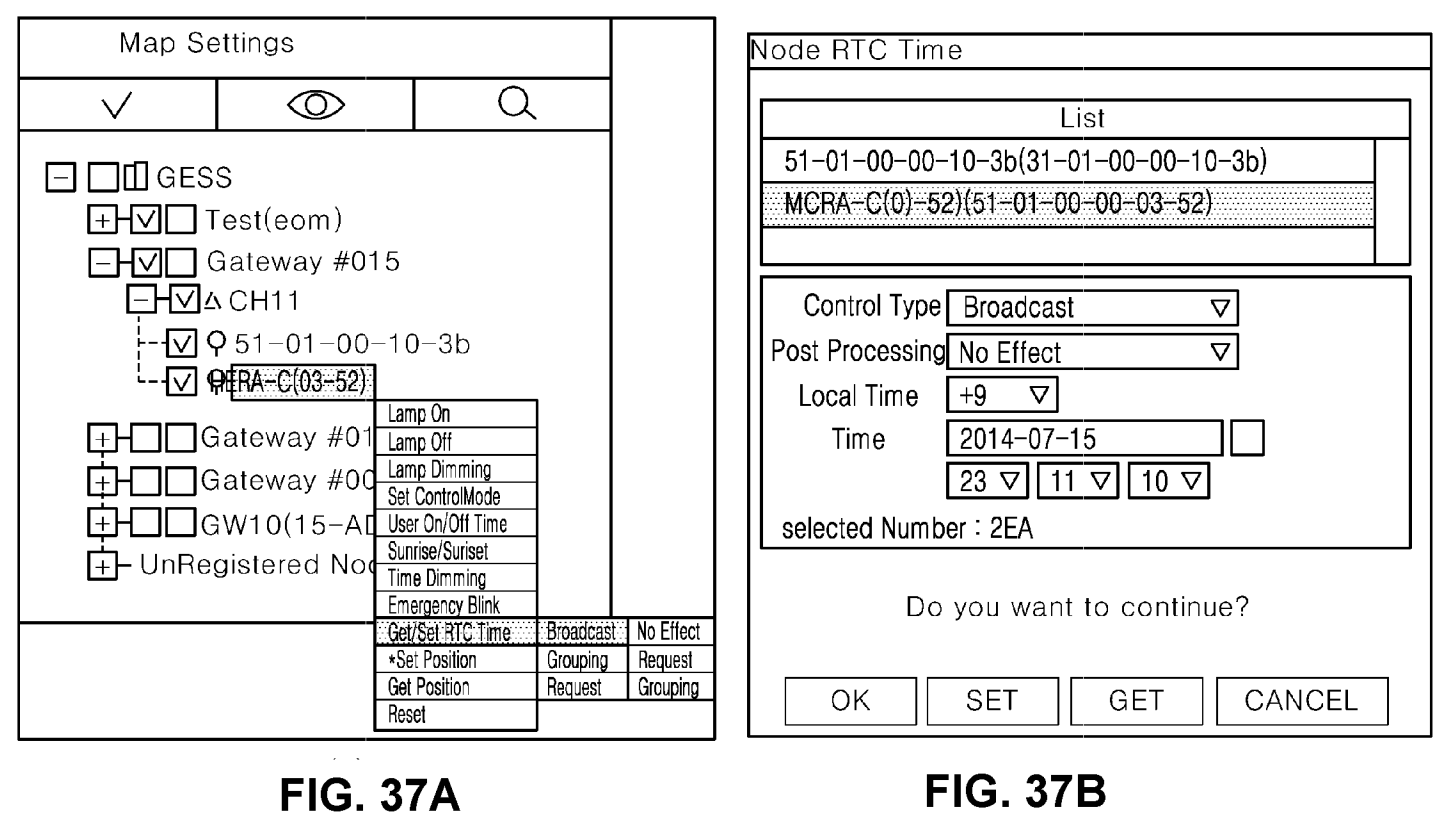

FIGS. 37A and 37B are views for describing an operation of executing a Set/Get RTC Time menu in a context menu of a node according to an embodiment of the present disclosure. When the Set/Get RTC Time menu is selected as in FIG. 37A according to a user operation, a Broadcast menu, a Grouping menu, and a Request menu that are sub-menus may be displayed, and when the Broadcast menu is selected, a No Effect menu, a Request menu, and a Grouping menu may be described as sub-menus of the Broadcast menu. When the Broadcast menu is selected as in FIG. 37A according to a user operation, the terminal device may display a screen for selecting a control type, post processing, a local time, a time as in FIG. 37B. Further, the RTC time may be received from a gateway according to a user operation and may be set to be displayed on the display unit of the terminal device.

Figure 38A:
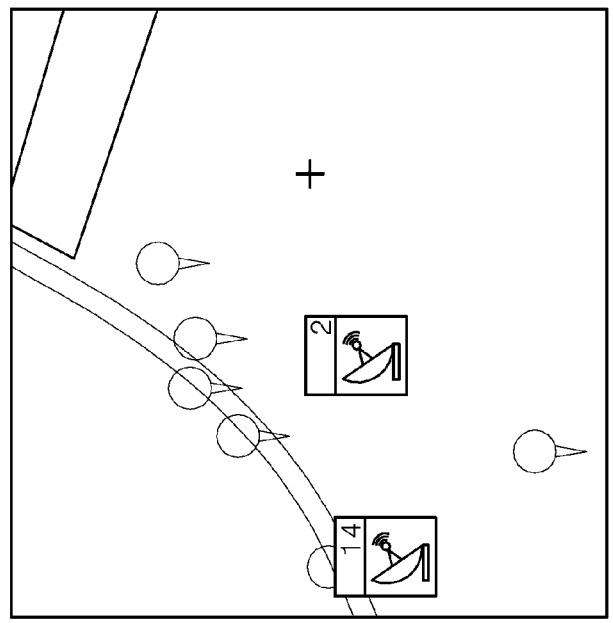
FIGS. 38A and 38B are views for describing an operation of executing a Set Position menu in a context menu of a node according to an embodiment of the present disclosure.
Figure 38B:
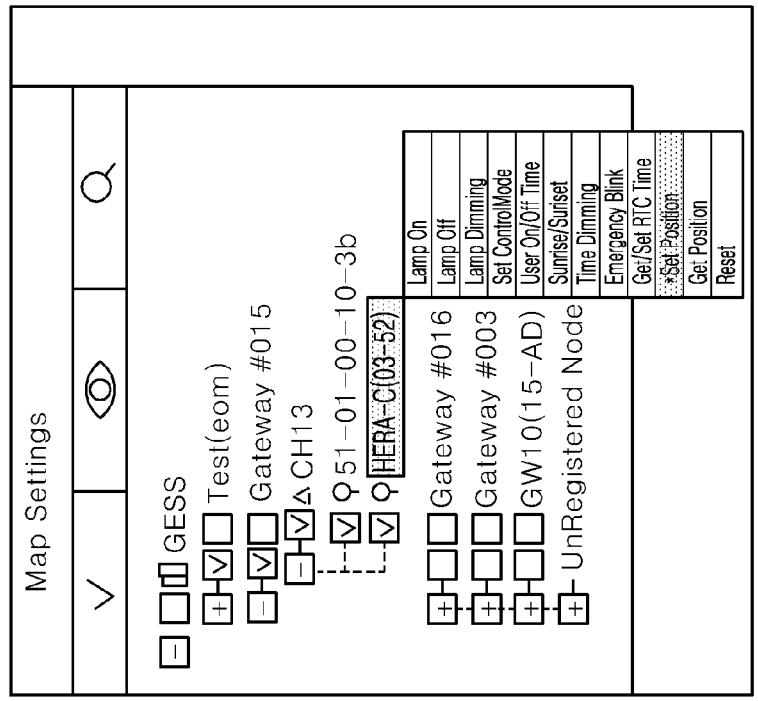

FIGS. 38A and 38B are views for describing an operation of executing a Set Position menu in a context menu of a node according to an embodiment of the present disclosure. An operation of the Set Position menu in FIGS. 38A and 38B is the same as the operation of executing the Set Position menu in the context menu of the gateway in FIGS. 29A and 29B as described above, and as the operation is executed, the terminal device may set a position of a node on the digital map, and obtain position information of the corresponding position.

Meanwhile, the context menu of the node may include a Get Position menu, and the Get Position menu may be executed according to a user operation to obtain position information of the selected node.

Figures 39A, 39B:
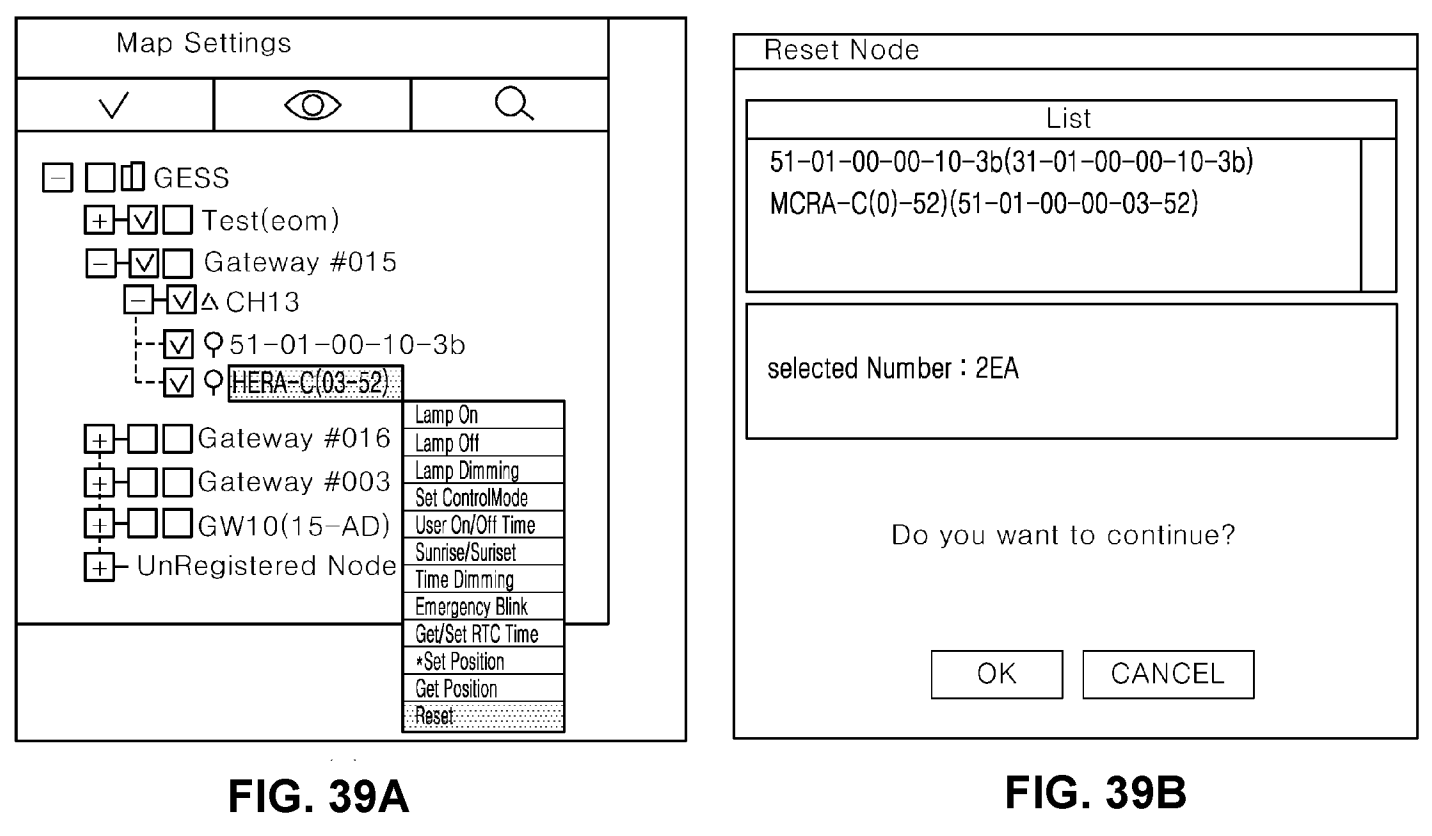

FIGS. 39A and 39B are views for describing an operation of executing a Reset menu in a context menu of a node according to an embodiment of the present disclosure. A reset operation according to execution of the Reset menu in FIGS. 39A and 39B is the same as the operation of executing the Reset menu in the context menu of the gateway in FIGS. 31A and 31B as described above, and the terminal device may reset a selected node according to the execution of the operation.

Figure 40:
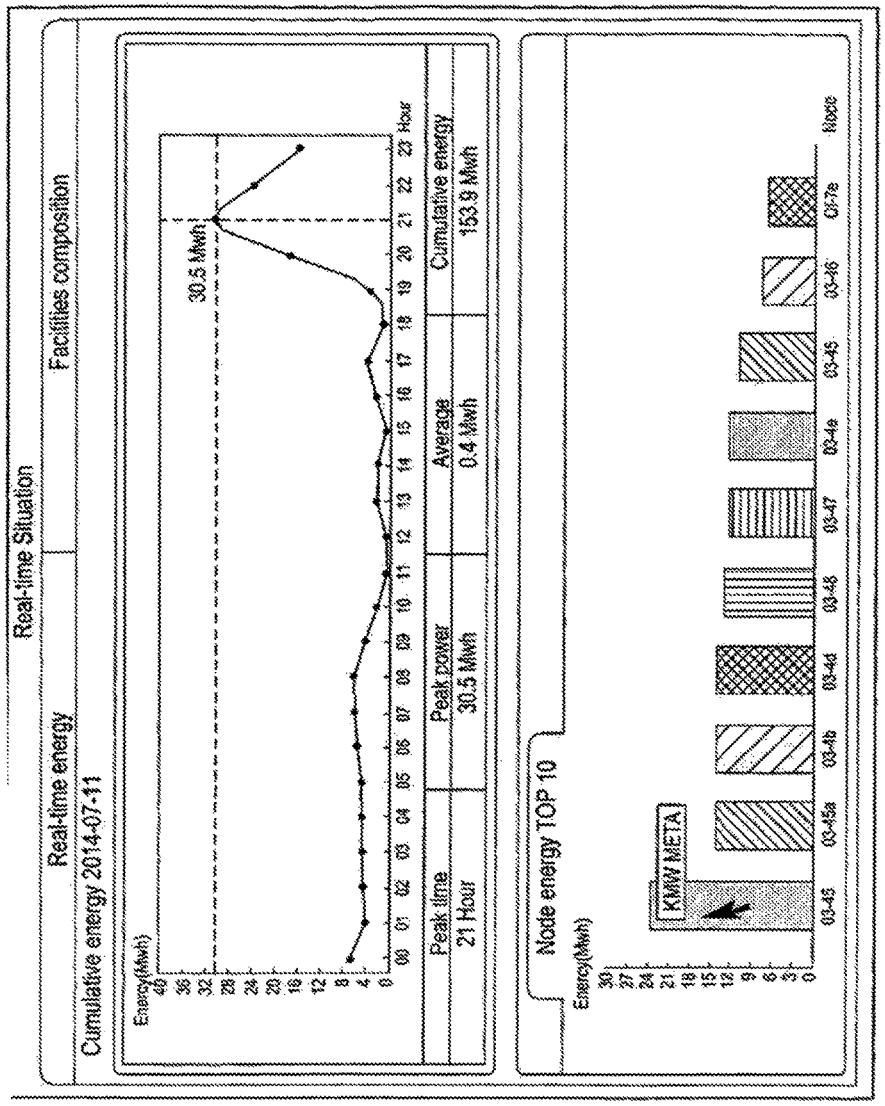
FIGS. 40 and 41 are views showing a screen displayed at the time of executing a Real-Time Situation item in a submenu for management and statistics according to various embodiments of the present disclosure.
Figure 41:
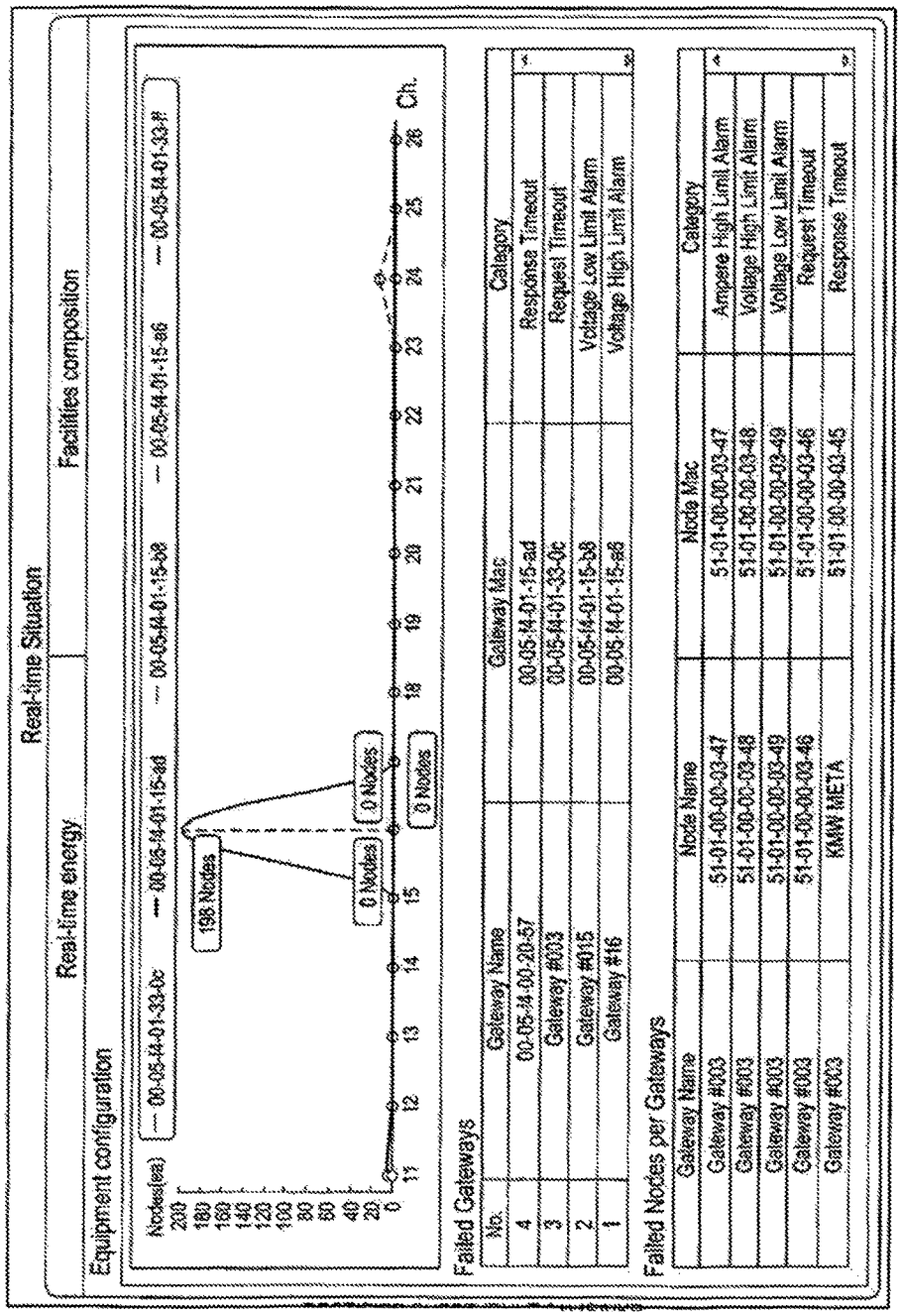

FIGS. 40 and 41 are views showing a screen displayed at the time of executing a Real-Time Situation item in a submenu for management and statistics according to various embodiments of the present disclosure.

Referring to FIG. 40, when the Real-Time Situation item is executed according to a user operation, information about real time power usage of a node may be displayed. Referring to FIG. 40, at the time of execution of the Real-Time Situation item, the Real-Time Situation item may be displayed while being divided into a Cumulative energy item and a Node energy TOP 10 item. The Cumulative energy item is a chart displaying power usage for 24 hours in a day, and the Node energy TOP 10 item is a chart displaying 10 nodes having peak power usage within 24 hours in a day and corresponding power usages For example, by using a mouse, when a cursor of the mouse is put on a line in the chart of the Cumulative energy item, the terminal device may display power usage of corresponding time. Further, in the Cumulative energy item, Peak time means a peak power usage time in a day, Peak power means a peak power usage in a day, Average means an average power usage in a day, and Cumulative energy means total cumulative power usage in a day. Further, for example, by using a mouse, when a cursor of the mouse is put on a bar portion in the Node energy TOP 10 item, the terminal device may display a corresponding node name.

Referring to FIG. 41, when the Real-Time Situation item is executed according to a user operation, a configuration of facilities (node, gateway, and communication channel) stored in the server may be displayed. Referring FIG. 41, the configuration of the facilities may be displayed while being divided into an Equipment configuration item, a Failed Gateway item, a Failed Nodes per Gateways item. In the Equipment configuration item, lines as many as gateways are displayed in a chart, an x-axis indicates a channel, and a y-axis indicates the number of nodes. Further, the failed gateways item, and the Failed Nodes per Gateways item may display lists of gateways and nodes currently in an alarm state.

FIGS. 42 to 68 are views showing a screen displayed at the time of executing a Facilities item 703 in a submenu 505 for management and statistics according to various embodiments of the present disclosure.

Referring to FIGS. 42 to 68, when the Facilities item 703 is executed according to a user operation, information about a gateway, information about a node, information about repair (After Service), information about a control (Control Log), information about an alarm (Alarm Log), and information about a failure (Failure Log) may be confirmed, set, and changed.

When the Facilities item 703 is executed according to a user operation, a gateway list window may be displayed as in FIG. 42.

The gateway list window may display gateway lists while being divided into items shown in the following Table 1.

TABLE 1

| Item | Description |
| --- | --- |
| Gateway Name | Gateway name |
| Gateway Mac ID | Gateway Mac ID |
| Model | Gateway model |
| Alarm | Gateway state |
| Nodes | Number of subnodes connected to corresponding gateway |
| Install Date | Gateway installation date |
| Gateway Phone Number | Gateway phone number |

Further, the gateway list window may allow the user to inquire a gateway list, and inquire only a desired gateway with a name of gateway or a gateway Mac ID. Further, the gateway list may include an Add menu, a Delete menu, a Repair Details menu, a Connection Info menu, and a Set Label menu. Further, when the user clicks a name of gateway displayed in bold blue color in gateway lists by using a mouse, details of the corresponding gateway may be confirmed, and when clicking the nodes (Nodes), it is possible to move to a list of nodes connected to the corresponding gateway.

Further, the gateway list window may include the Add menu for registering a gateway, and when the Add menu is selected according to a user operation, the terminal device may display a screen for registering a gateway as in FIG. 43. In the screen for registering a gateway in FIG. 43, a phone number of an administrator managing the gateway is input, and an item for inputting a name of gateway may be included.

Figure 44:
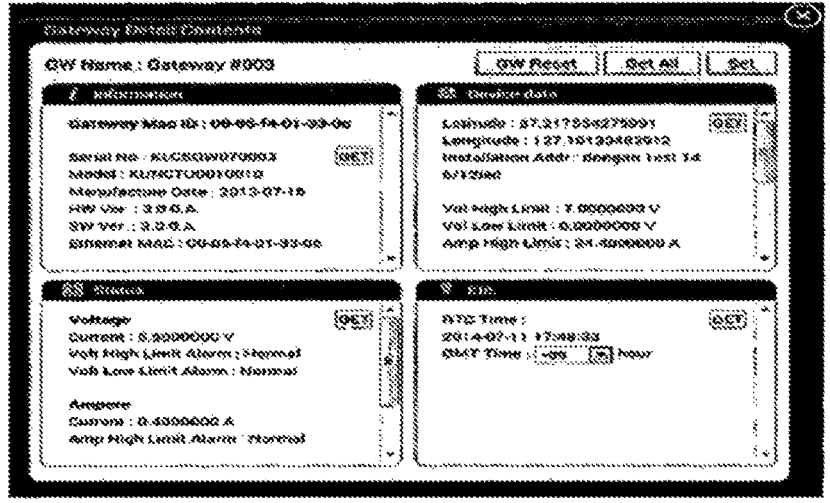

Further, according to the user operation for confirming details of a gateway described above, the terminal device may display a window for confirming details of a gateway as in FIG. 44.

The window for confirming details of a gateway may display the details of the gateway while being divided into items shown in the following Table 2.

TABLE 2

| Item | Description |
| --- | --- |
| Gateway Mac ID | Gateway Mac ID |
| Serial No | Gateway serial number |
| Model | Gateway model |
| Manufacture Date | Gateway manufacture date |
| HW Ver | Gateway hardware version |
| SW Ver | Gateway software version |
| Ethernet MAC | Gateway ethernet MAC |
| Latitude | Latitude |
| Longitude | Longitude |

TABLE 2-continued

| Item | Description |
| --- | --- |
| Installation Addr | Gateway installation date |
| Vol High Limit | Voltage upper limit threshold value |
| Vol Low Limit | Voltage lower limit threshold value |
| Amp High Limit | Current upper limit threshold value |
| GUI Main MinNo | GUI main number |
| GUI Diver MinNo | GUI DIVER number |
| GUI Alarm MinNo | GUI alarm number |
| Gateway Phone Number | Gateway phone number |
| Gateway DB Phone Number | Gateway phone number managed in DB |
| Node polling interval | Node polling interval |
| Voltage Current | Current voltage value |
| Volt High Limit Alarm | Voltage upper limit is exceeded |
| Volt Low Limit Alarm | Voltage lower limit is not reached |
| Ampere Current | Current current value |
| Amp High Limit Alarm | Voltage upper limit is exceeded |
| RTC Time | Gateway RTC time |

Further, the window for confirming details of a gateway may display a screen for getting (Get) various information of a gateway. Further, the window for confirming details of a gateway may include a Gateway Reset menu (GW Reset), a Get Gateway Information menu, a Get Gateway Device Data menu, a Get Gateway Status menu, and a Get Gateway RTC Time menu.

Figure 45:
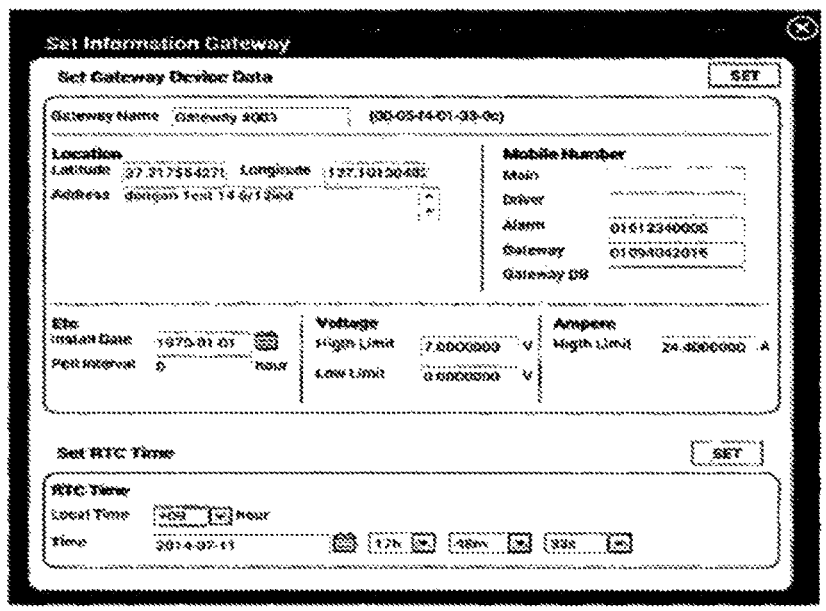

When a Set menu in FIG. 44 is selected according to a user operation, the terminal device may display a screen for setting details of a gateway as in FIG. 45. The screen for setting details of a gateway may be displayed while being divided into items as in the following Table 3.

TABLE 3

| Item | Description |
| --- | --- |
| Gateway Name | Gateway name |
| Latitude | Latitude |
| Longitude | Longitude |
| Address | Gateway address |
| GUI Main MinNo | GUI main number |
| GUI Diver MinNo | GUI DIVER number |
| GUI Alarm MinNo | GUI alarm number |
| Gateway Phone Number | Gateway phone number |
| Gateway DB Phone Number | Gateway phone number managed in DB |
| Installation Addr | Gateway installation date |
| Node polling interval | Node polling interval |
| Vol High Limit | Voltage upper limit threshold value |
| Vol Low Limit | Voltage lower limit threshold value |
| Amp High Limit | Current upper limit threshold value |
| Local Time | GMT + time |
| Time | Input date, hour, minute, and second |

Further, the screen for setting details of a gateway may be displayed while being divided into a set gateway device date (Set Gateway Device Data), and a set gateway RTC time (Set RTC Time).

Figure 46:
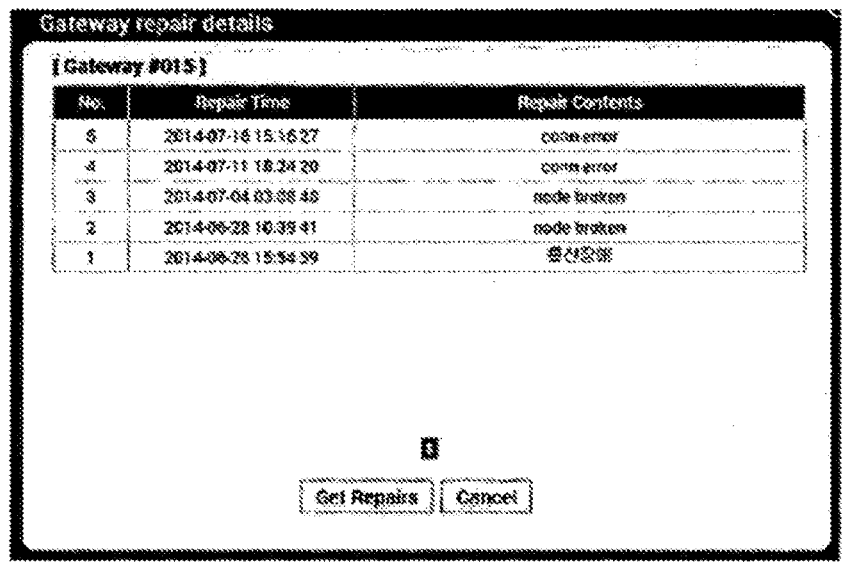

When a Repair Details menu in the gateway list window in FIG. 42 is selected according to a user operation, the terminal device may display a repair details window as in FIG. 46.

The repair details window may display repair details lists while being divided into items shown in the following Table 4.

TABLE 4

| Item | Description |
| --- | --- |
| Repair Time | Repair time |
| Repair Contents | Repair details |

Further, the repair details window may include a menu for transmitting a Get Repairs command.

Figure 47:
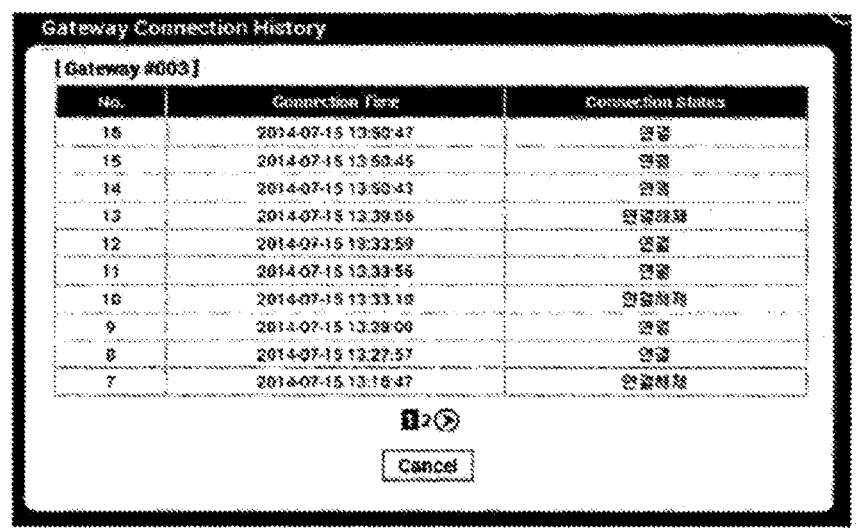

When the Connection Info menu in the gateway list window in FIG. 42 is selected according to a user operation, the terminal device may display a gateway connection info window displaying connection information as in FIG. 47. The gateway connection info window may display a connection time of a gateway and a connection status (connection or disconnection).

Figure 48:
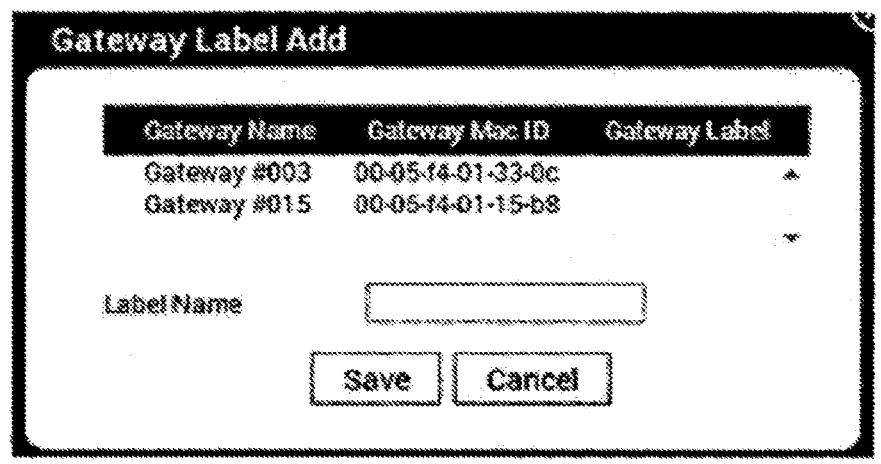

When a Set Label menu (SET Label) in the gateway list window in FIG. 42 is selected according to a user operation, the terminal device may display a set gateway label window as in FIG. 48.

Figure 49:
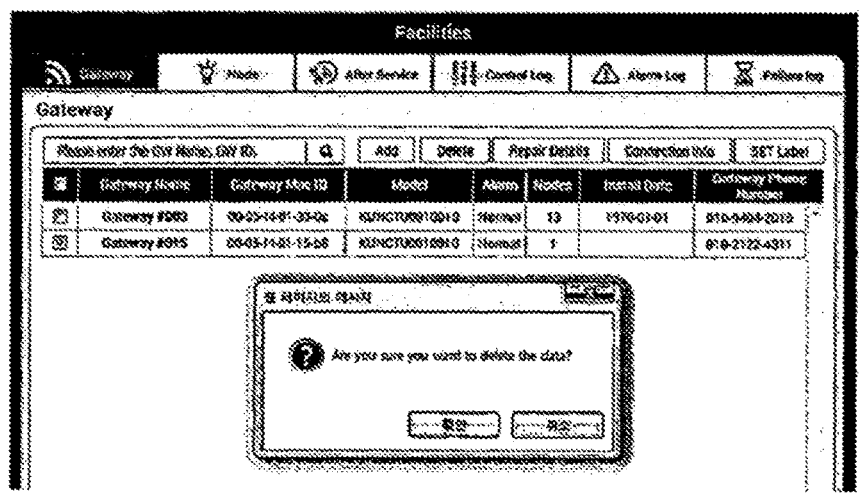

When one of list items is selected in the gateway list window in FIG. 42, and then the Delete menu is selected according to a user operation, the terminal device may display a message for confirming that the user wants to delete the gateway as in FIG. 49. When a menu for confirming deletion of the message is selected according to a user operation, the terminal device may delete the specific gateway.

Figure 50:
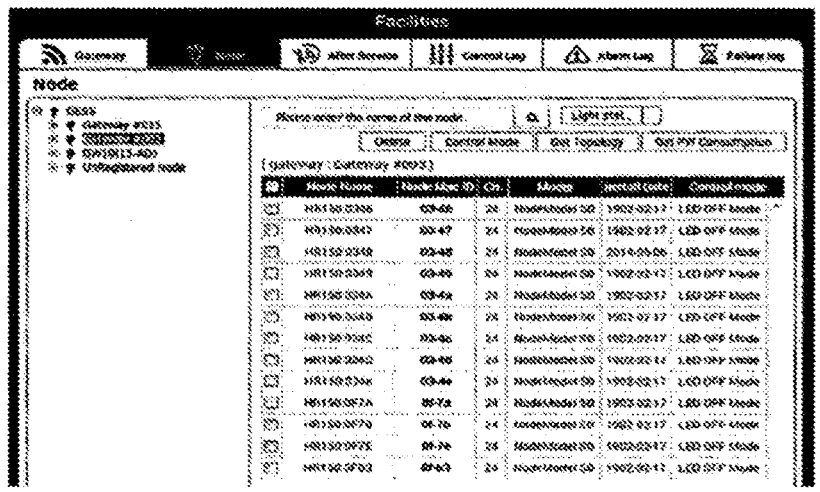

When the Facilities item is executed according to a user operation, a node list window may be displayed as in FIG. 50. The node list window may display node lists while being divided into items shown in the following Table 5.

TABLE 5

| Item | Description |
| --- | --- |
| Node Name | Node name |
| Node Mac ID | Node Mac ID |
| Ch | Channel ID |
| Model | Node model |
| Install Date | Node installation date |
| Control mode | Control mode |

The node list window may display a tree structure window at the left side, and when any one gateway is selected in the tree structure window, a list of subnodes of the selected gateway may be displayed. Further, the user may search a desired node name through a search, and nodes may be displayed based on on/off mode. Further, the node list window may include a Delete Node menu (Delete), a Get Topology menu (or a Get Node Status menu), and a Get Power Consumption menu (Get PW Consumption) at an upper end portion, and select the above-described menus to transmit a corresponding command to the server. Further, the node list window may include a Control Mode menu and display a window for setting a control mode by selecting the Control Mode menu.

Figure 51:
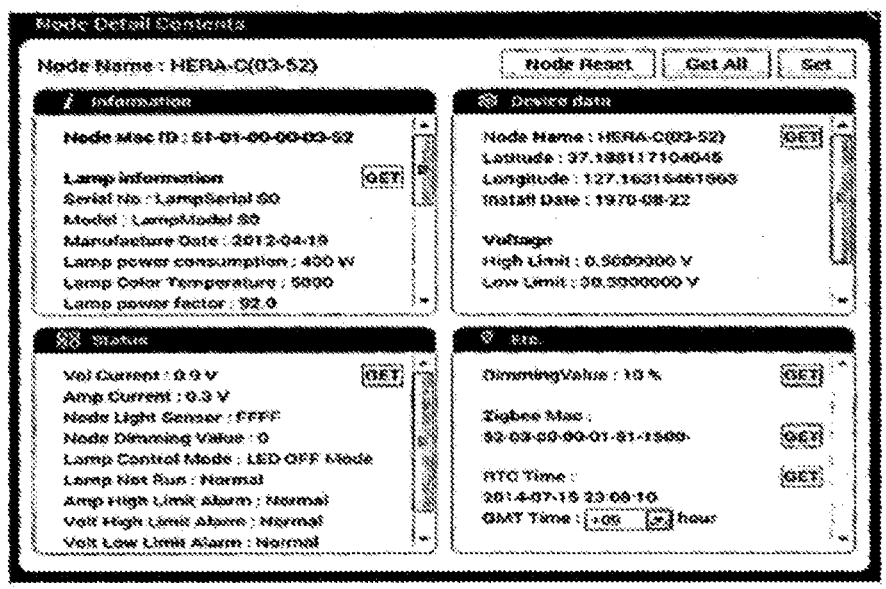

According to a user operation for displaying details of the node list in the node list window in FIG. 50, the terminal device may display a node details window for displaying details of a node as in FIG. 51. The node details window may display details of a node while being divided into items shown in the following Table 6.

TABLE 6

| Item | Description |
| --- | --- |
| Lamp Serial No | Lamp ID |
| Lamp Mode | Lamp model |
| Lamp Manufacture Date | Lamp manufacture date |
| Lamp Power Consumption | Lamp power consumption |
| Lamp Color Temperature | Lamp color temperature |
| Lamp Power Factor | Lamp power factor |
| Lamp Efficiency | Lamp efficiency |

TABLE 6-continued

| Item | Description |
| --- | --- |
| Lamp Output Voltage | SMPS Output Volt |
| Lamp Output Type | SMPS Output Type |
| Node Serial No | Serial number |
| Node Model | Node model |
| Node Manufacture Date | Manufacture date |
| HW Ver | HW_version |
| SW Ver | SW_version |
| Connection Channel | Connection channel_ID |
| Node Name | Node name |
| Latitude | Latitude |
| Longitude | Longitude |
| Install Date | Installation date |
| Voltage High Limit | Voltage upper limit threshold value |
| Voltage Low Limit | Voltage lower limit threshold value |
| Ampere High Limit | Current upper limit threshold value |
| Vol Current | Current voltage |
| Amp Current | Current current |
| Node Light Sensor | Level of illumination measured by photo sensor |
| Node Dimming Value | Dimming value got finally in time dimming |
| Lamp Control Mode | User control type |
| Lamp Not Run | Lamp failure |
| Amp High Limit Alarm | Alarm occurs when set SMPS output current upper limit threshold value is exceeded |
| Volt High Limit Alarm | Alarm occurs when set SMPS output voltage upper limit threshold value is exceeded |
| Volt Low Limit Alarm | Alarm occurs when set SMPS output voltage lower limit threshold value is not reached |
| Lamp Status | Lamp status |
| Dimming Value | Dimming value |
| Zigbee Mac | Zigbee address |
| RTC Time | Node RTC time |

The node details window may be configured as a screen for obtaining various information of a node. Further, according to a user operation in the node details window, a Node Reset operation, a Get All operation, a Get Node Information operations (Get Lamp Information), a Get Node Device Data operation, a Get Node Status operation, a Get Dimming operation, a Get Zigbee Mac operation, and a Get Node RTC Time operation may be requested.

Figure 52:
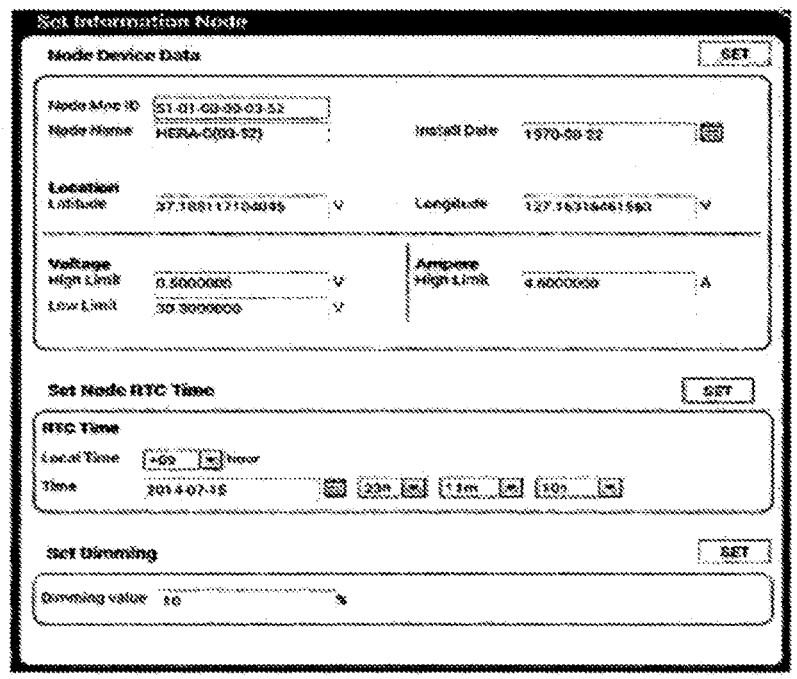

When a Set menu in the node details window in FIG. 51 is selected according to a user operation, the terminal device may display a window for setting details of a node as in FIG. 52. The window for setting details of a node may display details of a node while being divided into items shown in the following Table 7.

TABLE 7

| Item | Description |
| --- | --- |
| Node Mac ID | Node Mac ID |
| Node Name | Node name |
| Install Date | Installation date |
| Latitude | Latitude |
| Longitude | Longitude |
| Vol High Limit | Voltage upper limit threshold value |
| Vol Low Limit | Voltage lower limit threshold value |
| Amp High Limit | Current upper limit threshold value |
| Local Time | GMT + time |
| Time | Input date, hour, minute, and second |
| Dimming Value | Dimming value |

According to a user operation in the window for setting details of a node, the terminal device may perform a Set Node Device Data operation, a Set Node RTC Time operation, and a Set Dimming operation.

Figure 53:
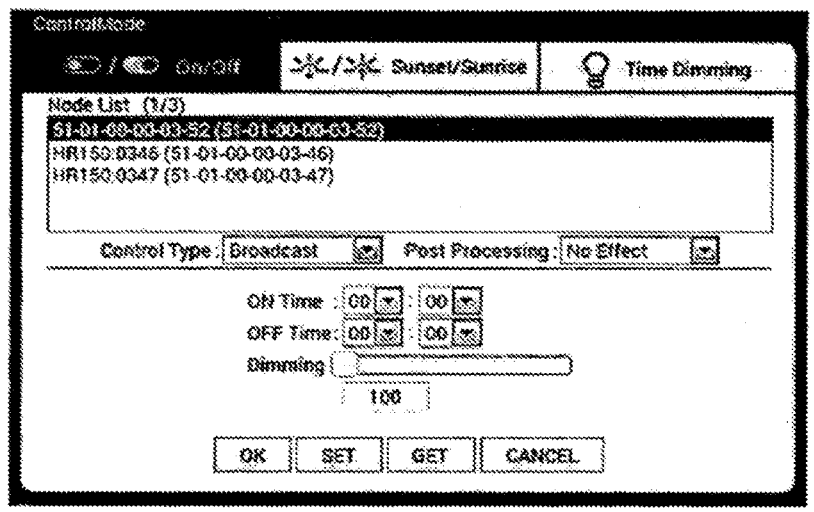
Figure 54:
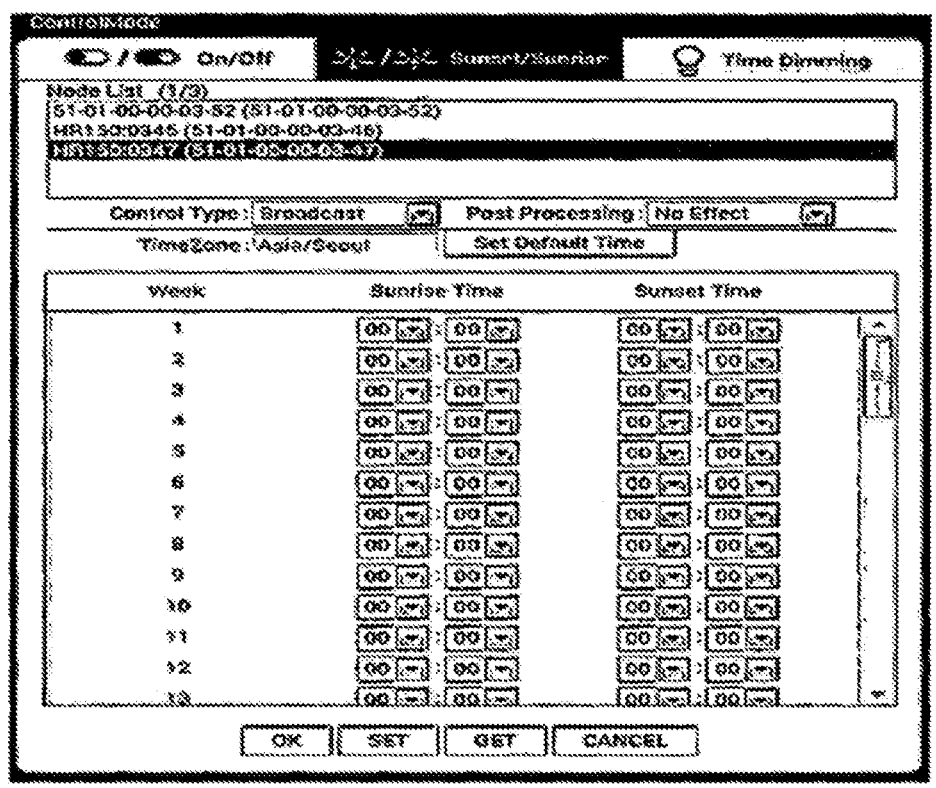
Figure 55:
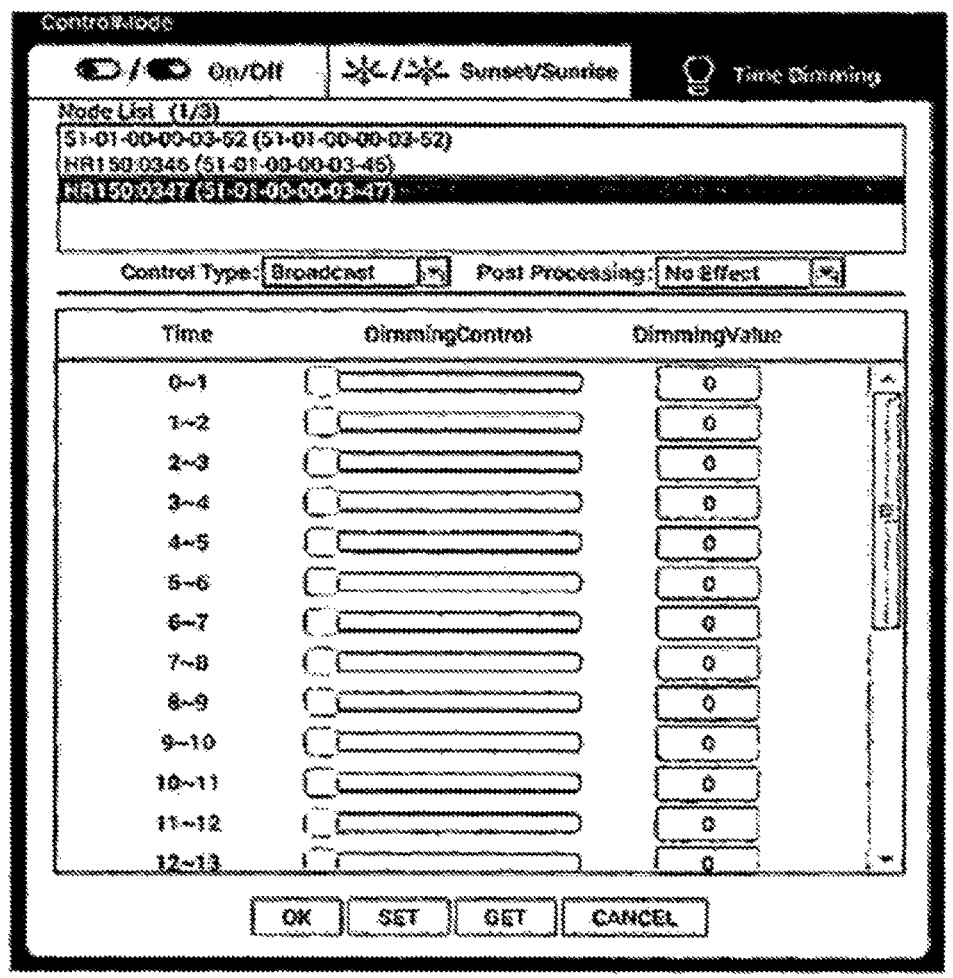

When a Control Mode menu in the node list window in FIG. 50 is selected according to a user operation, the terminal device may display a window for setting a control mode of a node as in FIGS. 53, 54 and 55.

The control mode may be displayed by being divided into a mode of turning on/off a node at a predetermined time (On/Off) as in FIG. 53, a mode of turning on/off a node at each predetermined time zone (Sunset/Sunrise) as in FIG. 54, and a mode of adjusting a dimming value of a node at a predetermined time (Time Dimming).

Referring to FIG. 53, a window of the mode of turning on/off a node at a predetermined time may be displayed while being divided into items shown in the following Table 8.

TABLE 8

| Item | Description |
| --- | --- |
| Control Type | Control type (Broadcast, Request, Grouping) |
| Post Processing | Post processing (No Effect, Request, Grouping) |
| ON Tine | ON Time |
| OFF Time | OFF Time |
| Dimming | Dimming value |

The window of the mode of turning on/off a node at a predetermined time may be a window for setting a control type and post processing after selecting, by the user, desired nodes, and setting a time at which the nodes are turned on, a time at which the nodes are turned off, and dimming of the nodes. Further, according to a user operation, the terminal device may transmit a information setting corresponding to the items in Table 8 and a command for getting information corresponding to the items in Table 8 to a corresponding node.

Referring to FIG. 54, a window of the mode of turning on/off a node at each predetermined time zone may be displayed while being divided into items shown in the following Table 9.

TABLE 9

| Item | Description |
| --- | --- |
| Control Type | Control type (Broadcast, Request, Grouping) |
| Post Processing | Post processing (No Effect, Request, Grouping) |
| TimeZone | Time zone |
| Sunrise Time | Sunrise time |
| Sunset Time | Sunset time |

Further, the window of the mode of turning on/off a node at each predetermined time zone may display a screen for setting a predetermined time zone, for example, a sunrise time and a sunset time as in FIG. 54. Further, according to a user operation, the terminal device may transmit a information setting corresponding to the items in Table 9 and a command for getting information corresponding to the items in Table 9 to a corresponding node.

Referring to FIG. 55, a window of the mode of adjusting a dimming value at a predetermined time may include items shown in the following Table 10.

TABLE 10

| Item | Description |
| --- | --- |
| Control Type | Control type (Broadcast, Request, Grouping) |
| Post Processing | Post processing (No Effect, Request, Grouping) |
| Dimming Value | Dimming value |

Further, the window of the mode of adjusting a dimming value at a predetermined time may display a screen for setting a dimming value of a node for each time. Further, according to a user operation, the terminal device may transmit a information setting corresponding to the items in Table 10 and a command for getting information corresponding to the items in Table 10 to a corresponding node.

Figures 56, 57:
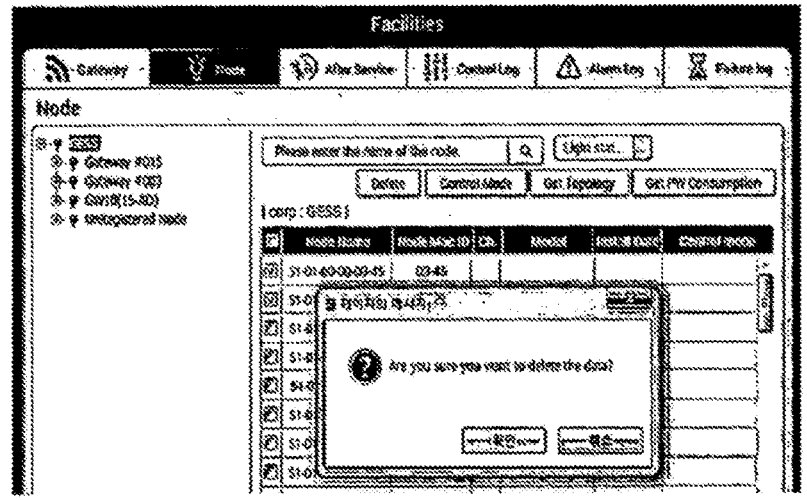
Figure 63:
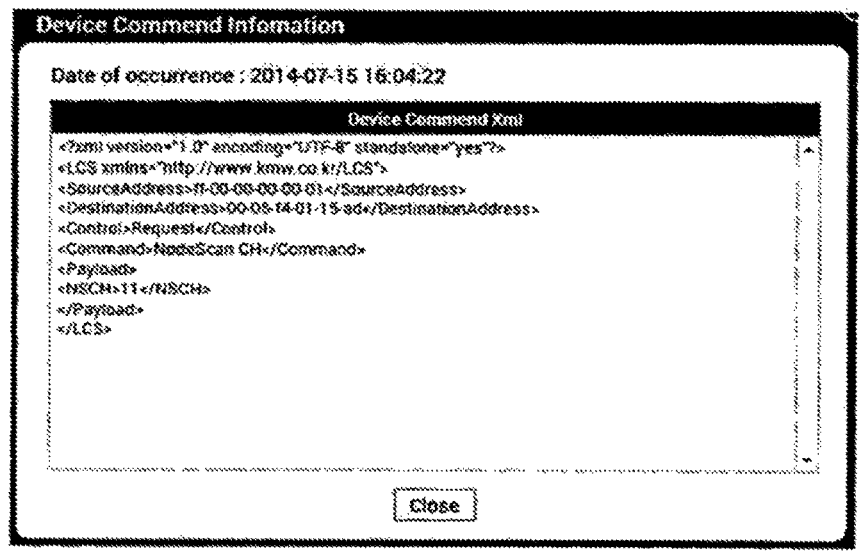

When one of list items is selected in the node list window in FIG. 50, and then the Delete menu is selected according to a user operation, the terminal device may display a message for confirming that the user wants to delete the node as in FIG. 56. When a menu for confirming deletion of the message is selected according to a user operation, the terminal device may delete the corresponding node, that is, a street light, from managed objects.

When the Facilities item 703 is executed according to a user operation, a repair (After Service) window may be displayed as in FIG. 57. The repair window is a window displaying a list of gateway repair or node repair, and may display a node repair list by being divided into items shown in the following Table 11. Further, the repair window may include a Delete menu for deleting a repair list.

TABLE 11

| Item | Description |
| --- | --- |
| Date of failure | Failure occurrence date |
| Equip Name | Failed equipment name |
| A/S Forecast Date | Estimated repair date |
| Date of A/S | Actual repair date |
| Repair man | Repair man |
| Repair Status | Repair status |

Figures 58, 59:
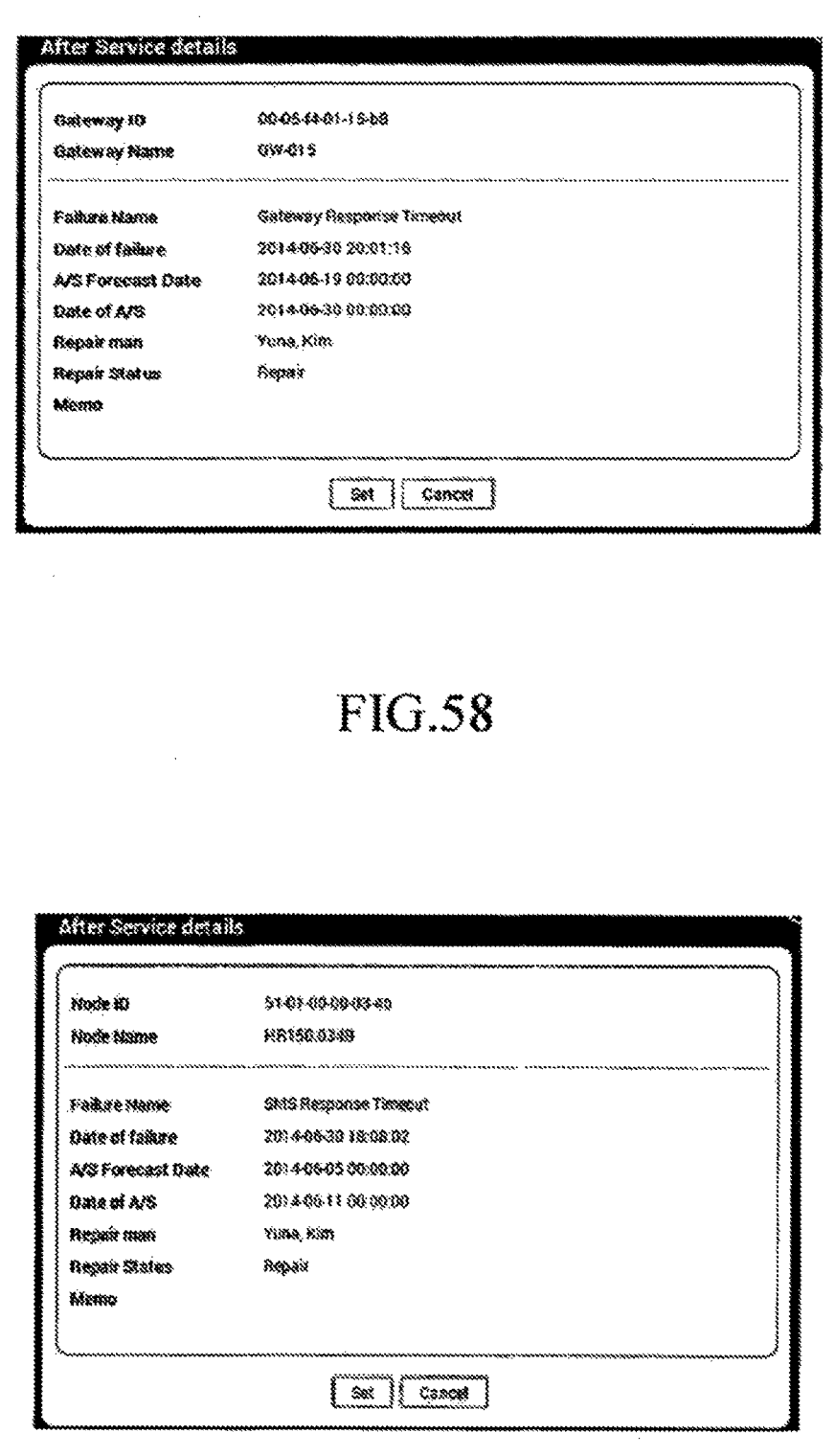

According to the user operation for confirming details of any one list in the repair window, the terminal device may display a window for confirming repair details of the corresponding list as in FIG. 58 or 59. The window for confirming details may display repair details of a corresponding list while being divided into items shown in the following Table 12.

TABLE 12

| Item | Description |
| --- | --- |
| Gateway ID(Node ID) | Failed equipment ID |
| Gateway Name(Node Name) | Failed equipment name |
| Failure Name | Failure name |
| Date of failure | Failure occurrence date |
| A/S Forecast Date | Estimated repair date |
| Date of A/S | Actual repair date |
| Repair man | Repair man |
| Repair Status | Repair status |
| Memo | Repair memo |

Further, the window for confirming repair details may display, for example, when equipment of the corresponding list is a gateway, a gateway ID and a gateway name as in FIG. 58, and when equipment of the corresponding list is a node, a node ID and a node name as in FIG. 59.

Figures 60, 61:
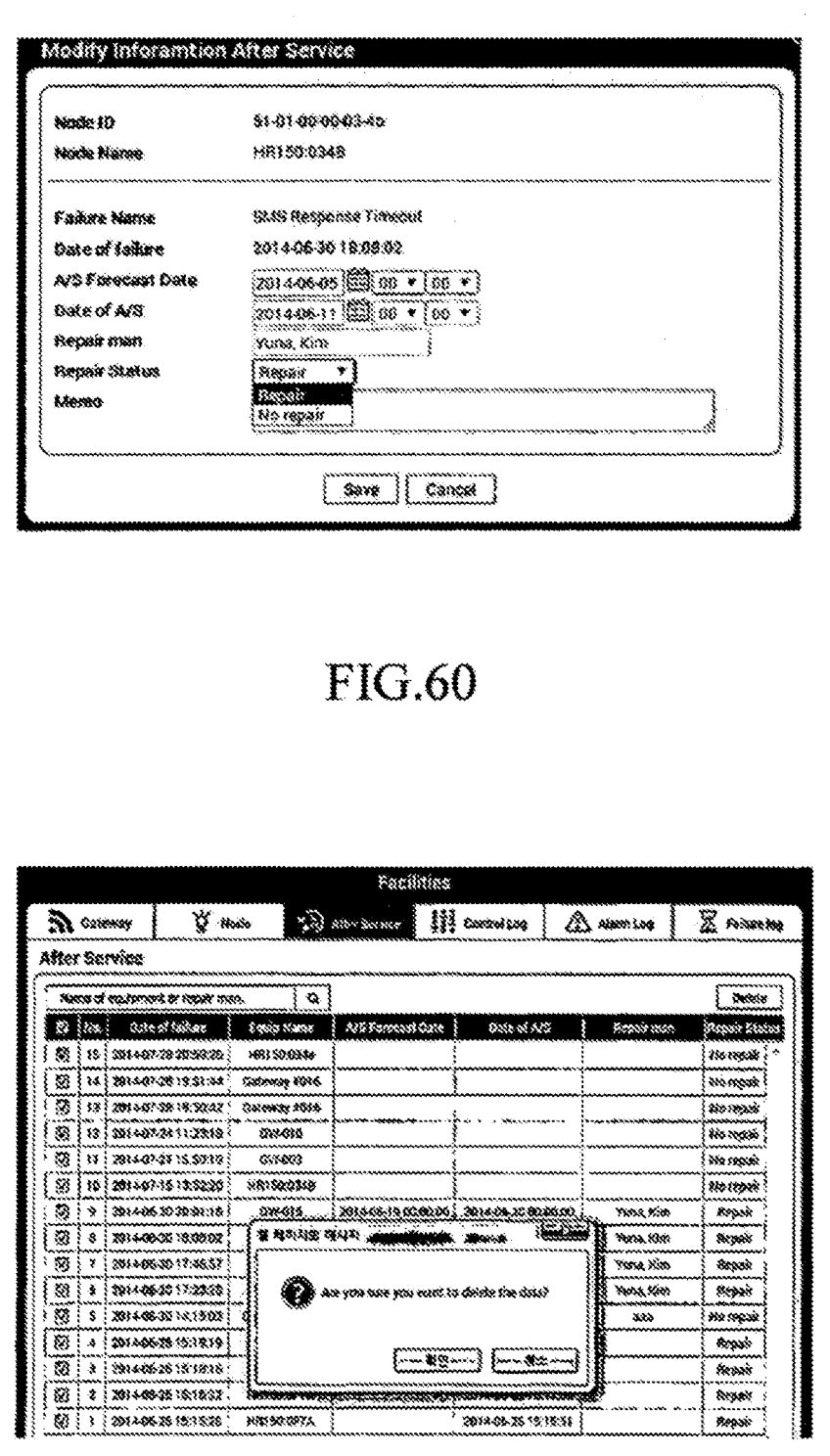

When a Set menu is selected in the window for confirming repair details according to a user operation, the terminal device may display a window for modifying repair information as in FIG. 60. The window for modifying repair information may display an equipment (e.g. node) ID, an equipment dame, a failure name, and a date of failure, as default information which may not be modified. Further, the window for modifying repair information may display an estimated repair date (A/S Forecast Date), an actual repair date (Date of A/S), a repair man (Repair man), a repair status (Repair Status), and a repair memo (Memo) that may be input and modified in the window for modifying repair information.

When one of repair lists is selected in the repair window in FIG. 57, and then the Delete menu is selected according to a user operation, the terminal device may display a message for confirming that the user wants to delete the list as in FIG. 61. When a menu for confirming deletion of the corresponding list is selected according to a user operation, the terminal device may delete the corresponding list.

Figure 62:
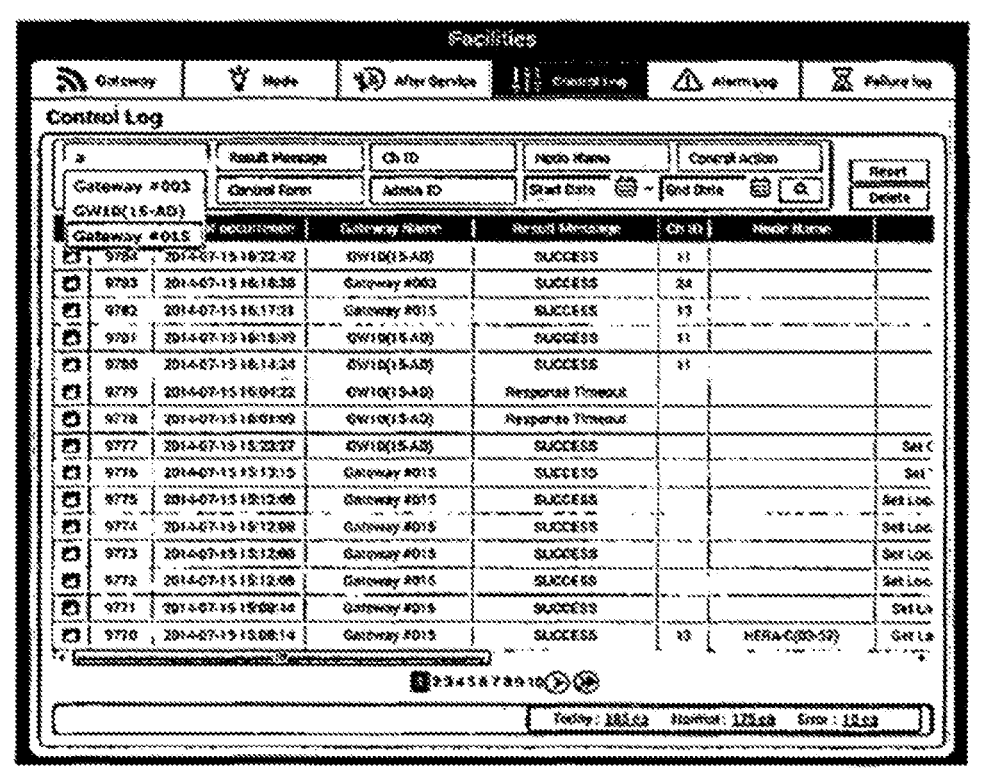

When the Facilities item 703 is executed according to a user operation, a control list window (control log window) may be displayed as in FIG. 62. The control list window is a window for confirming a list controlled by the user. In the control list window, only desired information may be searched by using one of a Gateway Name item, a Result Message item, a Ch ID item (Channel ID), a Node Name item, a Control Action item, a Control Mode item, a Control Form item, and an Admin ID item (Administrator ID), and the above-described items have an auto-completion function such that a corresponding data list may be displayed even when inputting only one character of a search word. Further, the data list may also be searched using a controlled date. Further, when intending to initialize a search column in a search box, it is possible to initialize by clicking a Reset menu at the upper right portion. Further, a Delete menu for deleting the control list may be included. Further, when the Date of occurrence is selected according to a user operation, the terminal device may display a window for displaying corresponding control command information as in FIG. 63. Further, "Today" at a lower end portion of the control list window indicates the total number of controls in a day, "Normal" indicates the number of normal controls, and "Error" indicates the number of control failures. Further, the control list window may be displayed while being divided into items shown in the following Table 13.

TABLE 13

| Item | Description |
| --- | --- |
| Date of occurrence | User control date |
| Gateway Name | Gateway name |
| Result Message | Result message |
| Ch Id | Ch ID |
| Node Name | Node name |
| Control Action | Control command |
| Control mode | Control mode(ON/OFF/DIi) |
| Control Form | Control mode (Request, Broadcast, Grouping) |
| Control Request Date | Control request date |
| Control Result Date | Control response date |
| Admin ID | Controller ID |

Figure 64:
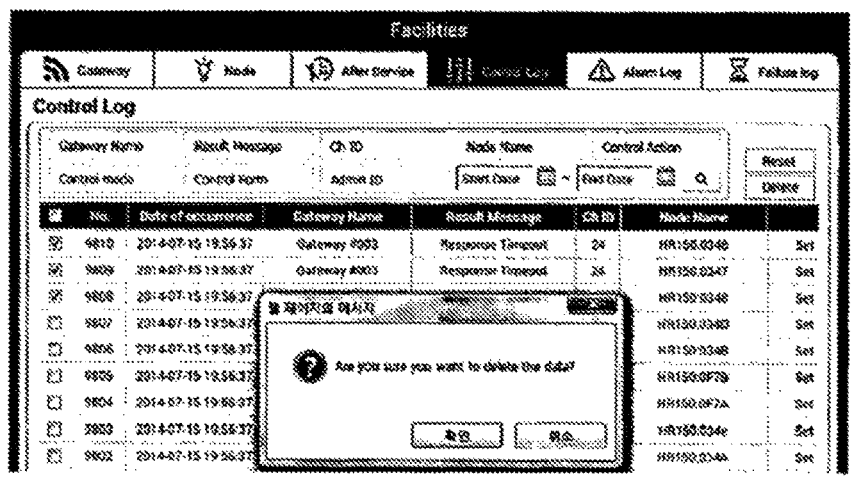

When at least one of control lists is selected in the control list window in FIG. 62 according to a user operation, and then the Delete menu is selected, the terminal device may display a message for confirming that the user wants to delete the corresponding list as in FIG. 64. When a menu for confirming deletion of the corresponding list is selected according to a user operation, the terminal device may delete the corresponding list.

Figure 65:
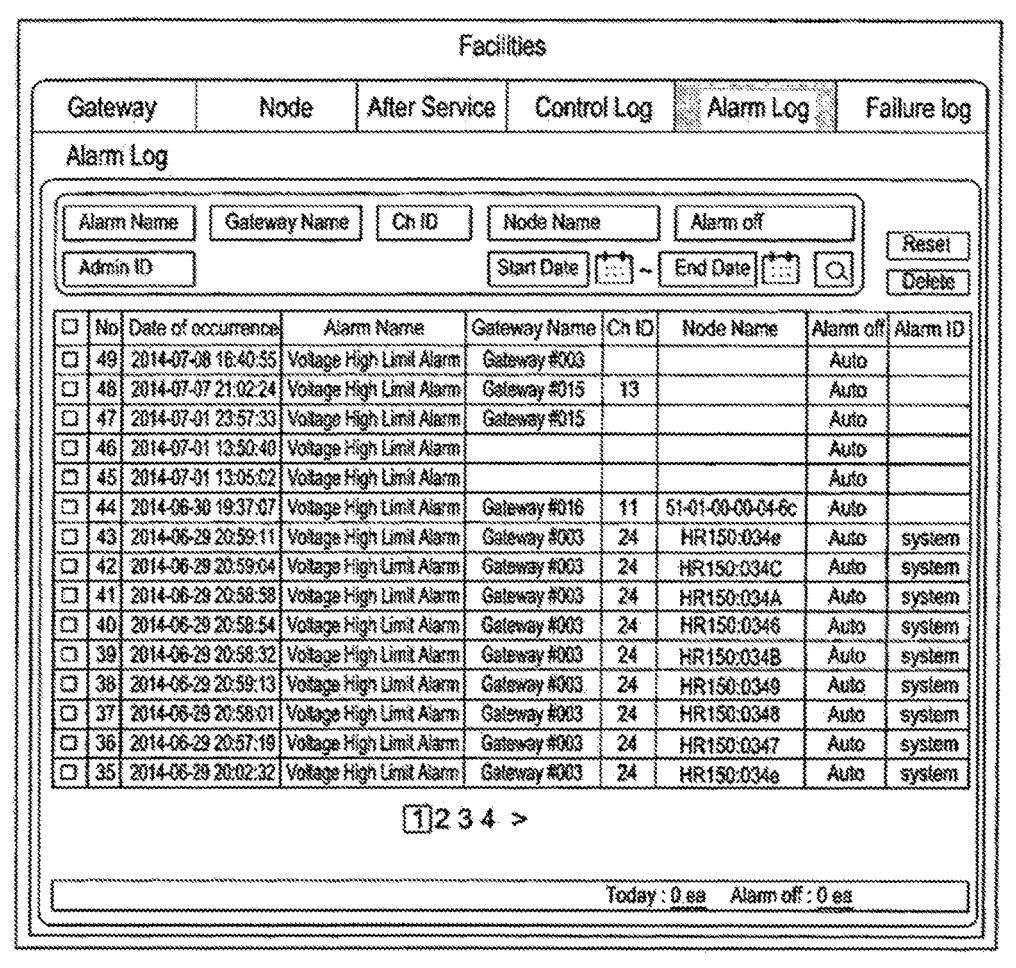

When the Facilities item is executed according to a user operation, an alarm list window (alarm log window) may be displayed as in FIG. 65. The alarm list window is a window for confirming an alarm list and may be displayed while being divided into items shown in the following Table 14.

TABLE 14

| Item | Description |
| --- | --- |
| Date of occurrence | Alarm occurrence date |
| Alarm Name | Alarm name |
| Gateway Name | Gateway name |
| Ch ID | Ch ID |
| Node Name | Node name |
| Alarm off | Classification of handling of alarm (auto/manual) |
| Admin ID | Controller ID |

Further, in the alarm list window, only desired information may be searched by using one of an Alarm Name item, a Gateway Name item, a Ch ID item (Channel ID), a Node Name item, an Alarm off item, and an Admin ID item (Administrator ID), and the above-described items have an auto-completion function such that a corresponding alarm list may be displayed even when inputting only one character of a search word. Further, the alarm list may also be searched using a date when the alarm occurred. Further, when intending to initialize a search column in a search box, it is possible to initialize by clicking a Reset menu at the upper right portion. Further, a Delete menu for deleting the alarm list may be included. Further, "Today" at a lower end portion of the alarm list window indicates the total number of alarms in a day, and "Alarm off" indicates the number of handled alarms.

Figure 66:
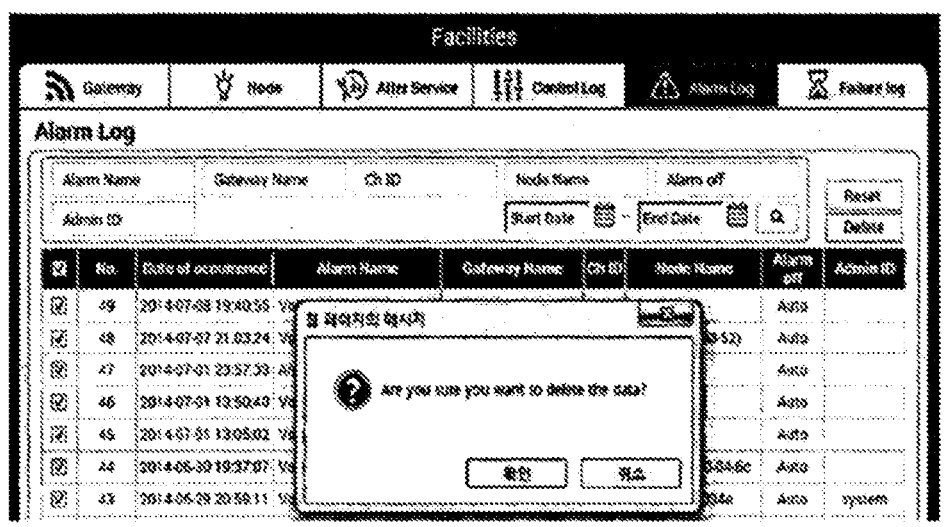

When at least one of alarm lists is selected in the alarm list window in FIG. 65 according to a user operation, and then the Delete menu is selected, the terminal device may display a message for confirming that the user wants to delete the corresponding list as in FIG. 66. When a menu for confirming deletion of the corresponding list is selected according to a user operation, the terminal device may delete the corresponding list.

Figure 67:
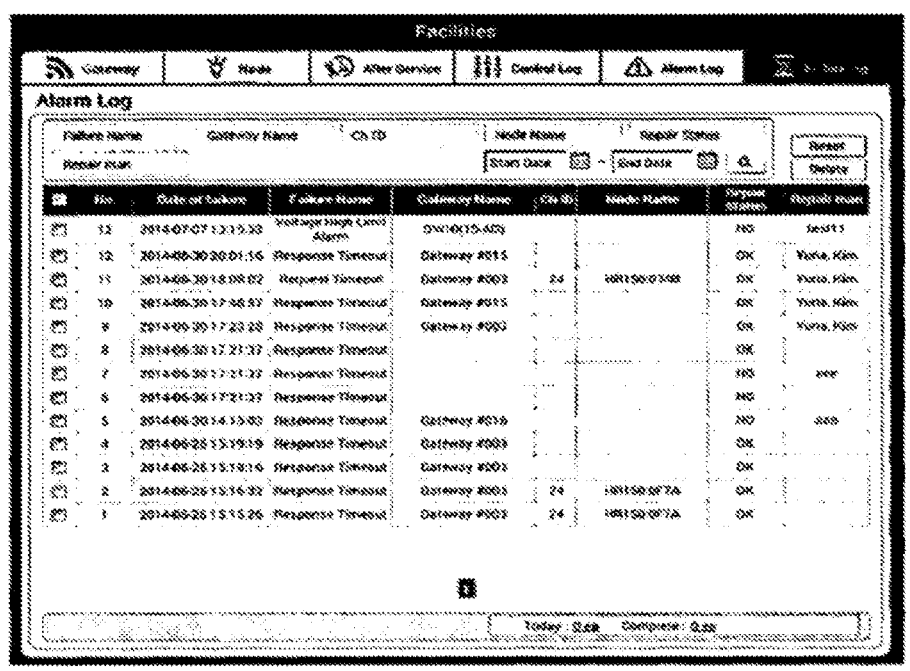

When the Facilities item is executed according to a user operation, a failure list window (failure log window) may be displayed as in FIG. 67. The failure list window is a window for confirming a failure list and may be displayed while being divided into items shown in the following Table 15.

TABLE 15

| Item | Description |
| --- | --- |
| Date of failure | Failure occurrence date |
| Failure Name | Failure name |
| Gateway Name | Gateway name |
| Ch ID | Ch ID |
| Node Name | Node name |
| Repair Status | Repair status |
| Repair man | Repair man |

Further, in the failure list window, only desired information may be searched by using one of a Failure Name item, a Gateway Name item, a Ch ID item (Channel ID), a Node Name item, a Repair Status item, and a Repair man item, and the above-described items have an auto-completion function such that a corresponding alarm list may be displayed even when inputting only one character of a search word. Further, the failure list may also be searched using a date when the failure occurred. Further, when intending to initialize a search column in a search box, it is possible to initialize by clicking a Reset menu at the upper right portion. Further, a Delete menu for deleting the failure list may be included. Further, "Today" at a lower end portion of the failure list window indicates the total number of failures in a day, and "Complete" indicates the number of handled failures.

Figure 68:
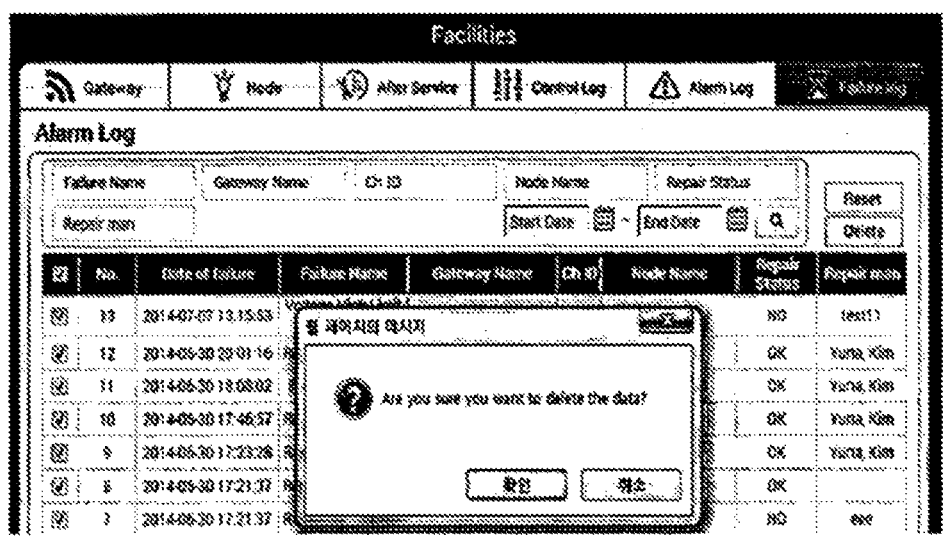

When at least one of failure lists is selected in the failure list window in FIG. 67 according to a user operation, and then the Delete menu is selected, the terminal device may display a message for confirming that the user wants to delete the corresponding list as in FIG. 68. When a menu for confirming deletion of the corresponding list is selected according to a user operation, the terminal device may delete the corresponding list.

FIGS. 69 to 81 are views showing a screen displayed at the time of executing an Operation item 705 in a submenu 505 for management and statistics according to various embodiments of the present disclosure.

Figures 69, 70:
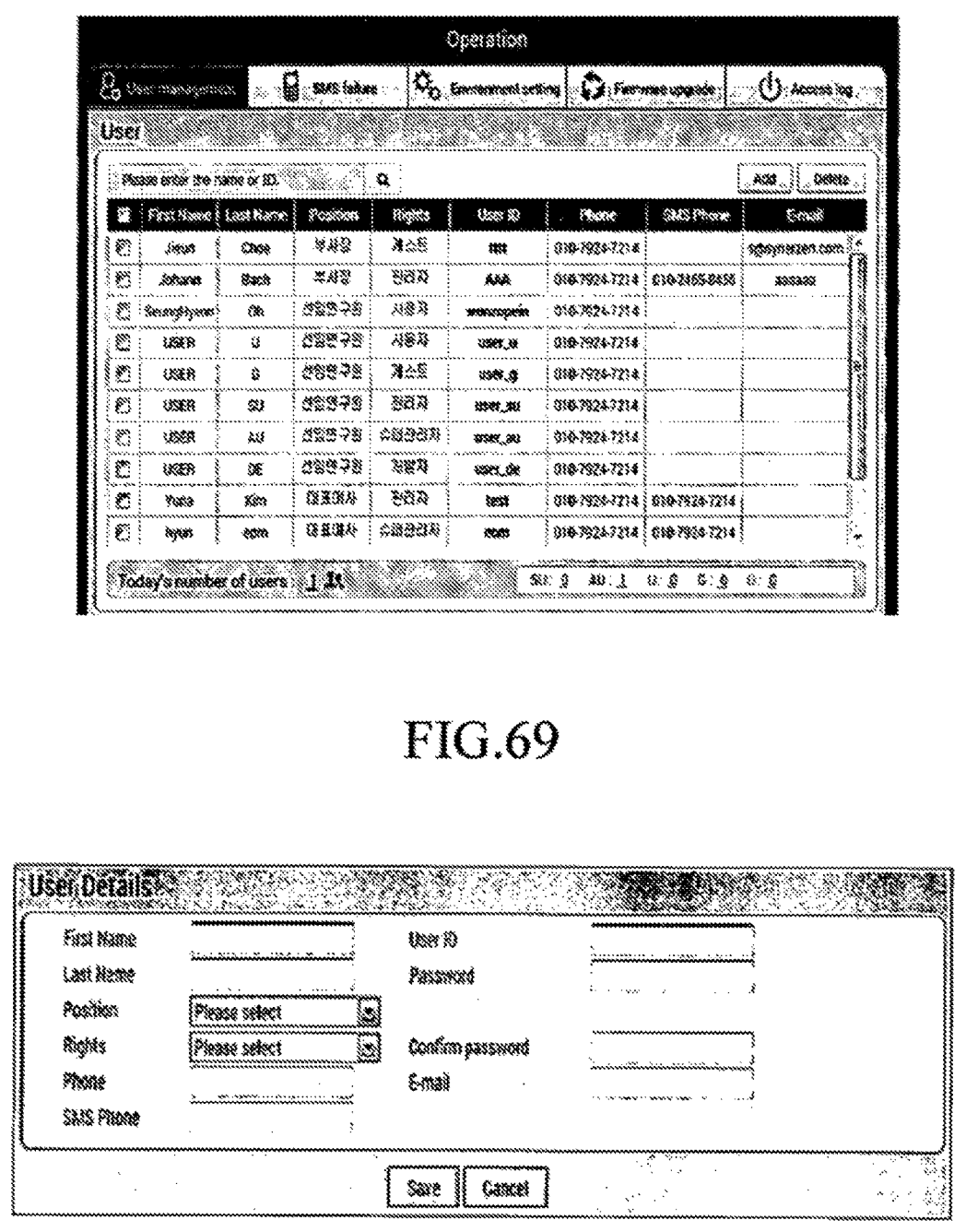

When the Operation item 705 is executed according to a user operation, a user list window displaying a user list may be displayed as in FIG. 69. The user list window may display a user list while being divided into items shown in the following Table 16.

TABLE 16

| Item | Description |
| --- | --- |
| First Name | Given name |
| Last Name | Surname |
| Position | Position |
| Rights | Rights |
| User ID | User ID |
| Phone | General phone number |
| SMSPhone | Mobile phone |
| E-mail | E-mail |

Further, in the user list window, a desired user may be searched by using a user name or a user ID. Further, the user list window includes menus for adding and deleting a user at the upper right portion thereof. Further, when a user ID is selected in the list according to a user operation, the terminal device may display details of the corresponding user at a lower end portion. "Today's number of users" in the user list window indicates the number of users accessed in a day, and the right side thereof indicates rights of the accessed users.

When an Add menu in the user list window in FIG. 69 is selected according to a user operation, the terminal device may display a window for registering a user as in FIG. 70.

Figures 71, 72:
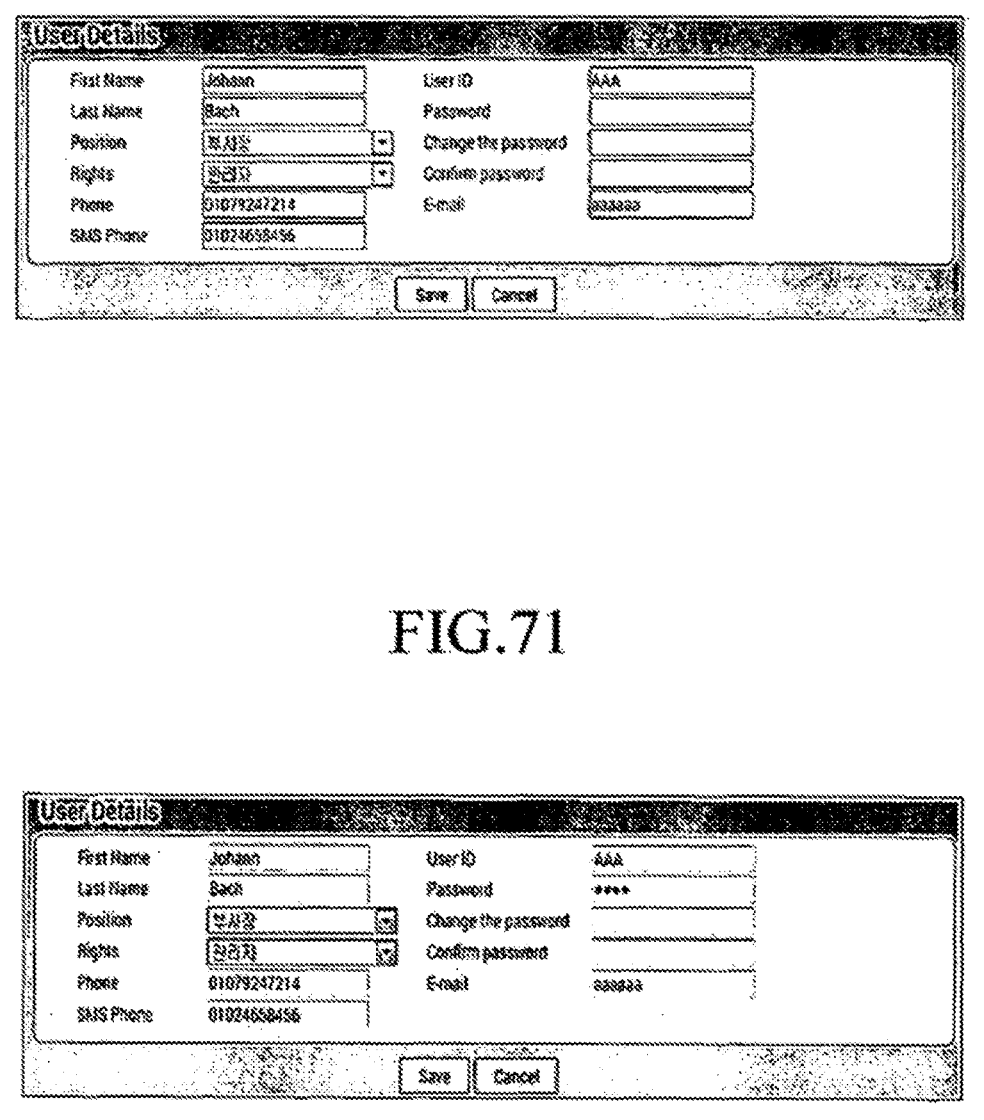

Further, when a user operation of selecting a user in a user list in the user list window in FIG. 69 to execute the window for displaying details of the selected user is input, the terminal device may display a window for confirming details of a user as in FIG. 71.

Further, when the user operation of selecting a user in a user list in the user list window in FIG. 69 to execute the window for displaying details of the selected user is input, the terminal device may display a window for updating details of a user as in FIG. 72.

Figure 73:
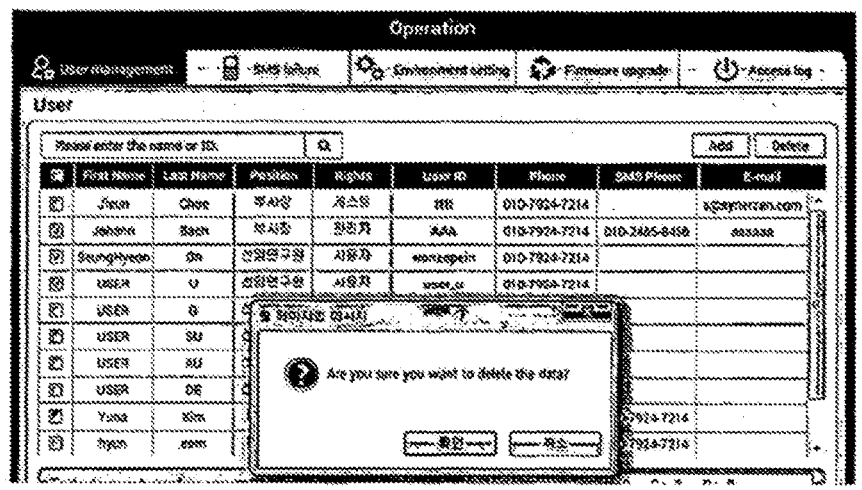

When at least one of user lists is selected in the user list window in FIG. 69 according to a user operation, and then the Delete menu is selected, the terminal device may display a message for confirming that the user wants to delete the corresponding list as in FIG. 73. When a menu for confirming deletion of the corresponding list is selected according to a user operation, the terminal device may delete the corresponding list.

Figure 74:
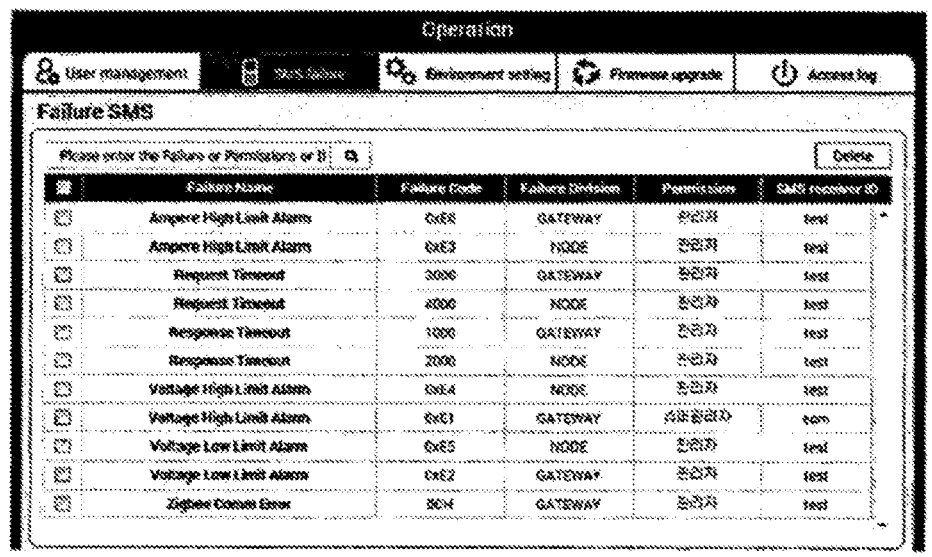
Figure 75:
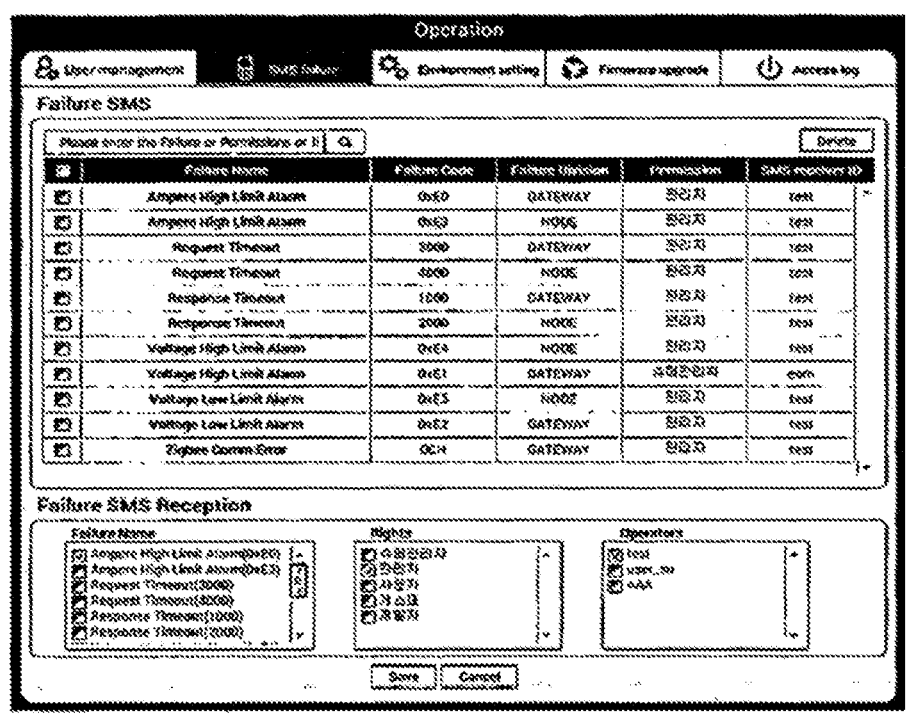

When the Operation item is executed according to a user operation, an SMS failure list window displaying an SMS failure list may be displayed as in FIG. 74 or 75. The SMS failure list window may display an SMS failure list while being divided into items shown in the following Table 17. The SMS failure list window is a window for displaying a list of administrators to which an SMS is to be transmitted.

TABLE 17

| Item | Description |
| --- | --- |
| Failure Name | Failure name |
| Failure Code | Failed code |
| Failure Division | Failure division |
| Permission | Rights of SMS receiving user ID |
| SMS receiver ID | SMS receiving user ID |

The Failure Name item, the Permission item, and the SMS receiver ID item that are items in Table 17 may be used to perform a search for each condition, and a Delete menu for deleting a list of administrators to which an SMS is to be transmitted may be displayed at the right side.

Referring to FIG. 75, when the Failure Name item is selected according to a user operation, SMS receiver setting information for the corresponding failure may be displayed. Further, administrators with a specific right who will receive an SMS may be selected and set for a corresponding failure. Further, information on a setting of an administrator who will receive an SMS may be confirmed in the failure list window.

Figure 76:
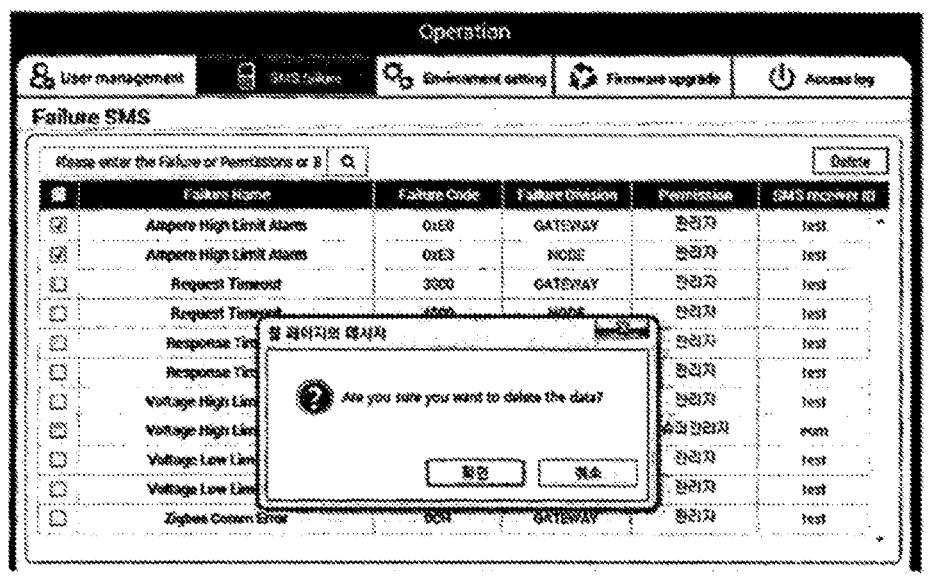

When at least one of lists of administrators to which an SMS is to be transmitted is selected in SMS failure list window in FIG. 74 according to a user operation, and then the Delete menu is selected, the terminal device may display a message for confirming that the user wants to delete the corresponding list of the administrator to which the SMS is to be transmitted as in FIG. 76. When a menu for confirming deletion of the corresponding list is selected according to a user operation, the terminal device may delete only a right and an ID of the administrator to which the SMS is to be transmitted in the selected list of the administrator to which the SMS is to be transmitted as in FIG. 77.

Figures 77, 78:
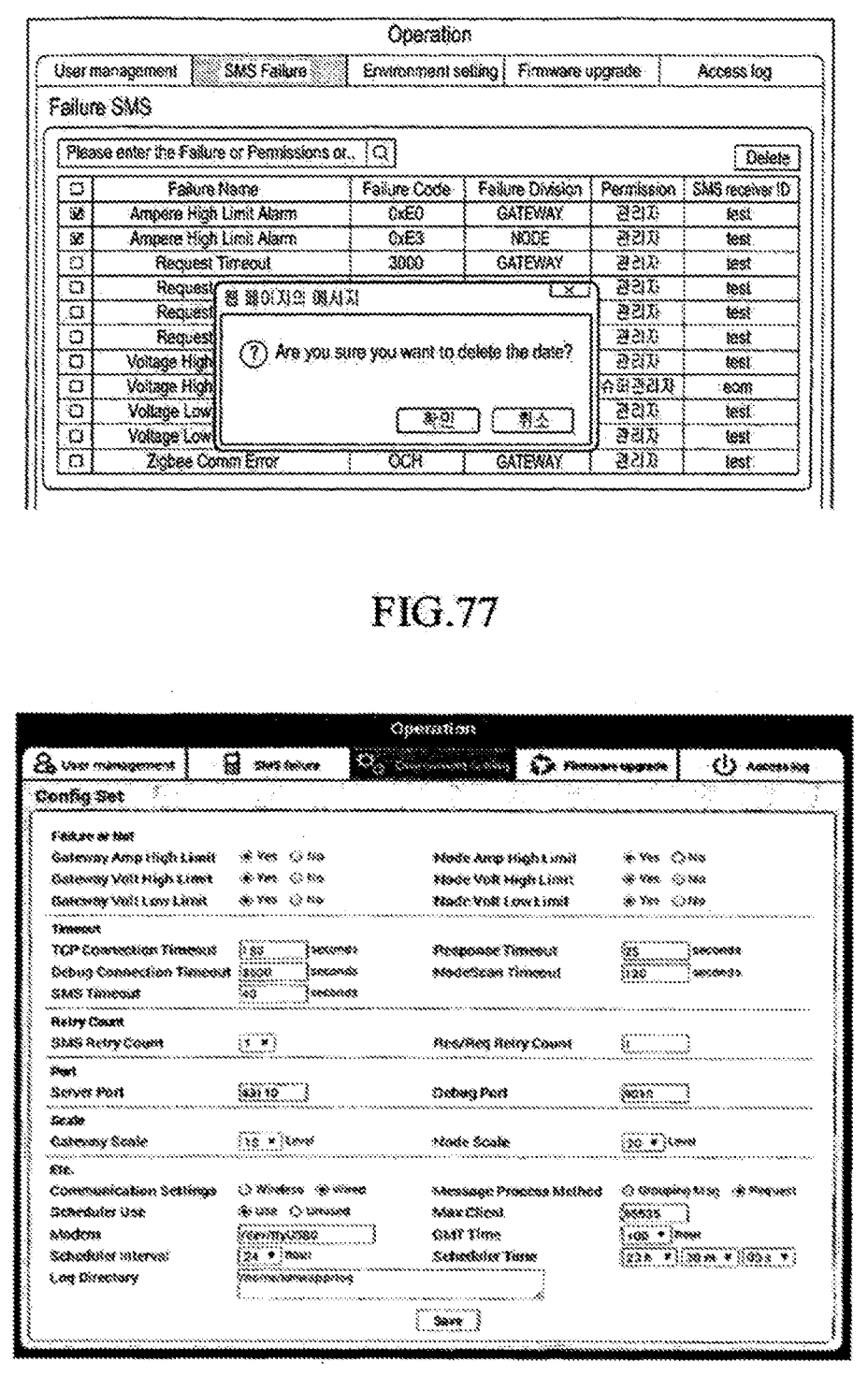

When the Operation item 705 is executed according to a user operation, an environment setting window for environment setting may be displayed as in FIG. 78. The environment setting window may be displayed while being divided into items shown in the following Table 18.

TABLE 18

| Item | Description |
| --- | --- |
| Gateway Amp High Limit | If alarm indicating that SMPS output current upper limit threshold value set in GW is exceeded occurs, it is considered that failure occurred |
| Node Amp High Limit | If alarm indicating that SMPS output current upper limit threshold value set in node is exceeded occurs, it is considered that failure occurred |
| Gateway Volt High Limit | If alarm indicating that SMPS output voltage upper limit threshold value set in GW is exceeded occurs, it is considered that failure occurred |
| Node Volt Low Limit | If alarm indicating that SMPS output voltage upper limit threshold value set in node is exceeded occurs, it is considered that failure occurred |
| Gateway Volt Low Limit | If alarm indicating that SMPS output voltage upper limit threshold value set in GW is not reached occurs, it is considered that failure occurred |
| Node volt Low Limit | If alarm indicating that SMPS output voltage upper limit threshold value set in node is not reached occurs, it is considered that failure occurred |
| TCP Connection Timeout | Server forcibly closes TCP connection after predetermined time elapses from point in time when XML data transmission and reception is not performed after gateway connection |
| Response Timeout | Set standby time when there is no XML data transmission and reception response after user control request |

TABLE 18-continued

| Item | Description |
| --- | --- |
| Debug Connection Timeout | Set timeout time at the time of delay of Telnet debug connection |
| NodeScan Timeout | Set standby time when there is no XML data transmission and reception response after (Q) node scan |
| SMS Timeout | Set standby time when there is no response after gateway SMS transmission |
| SMS Retry Count | Set number of SMS transmission retry when there is no response after gateway SMS transmission |
| Res/Req Retry Count | Set number of response/request retry when there is no transmission and reception response after user control request |
| Server Port | Server port to which gateway will be connected |
| Debug Port | Telnet debug connection port |
| Gateway Scale | Map-Gateway magnification |
| Node Scale | Map-Node magnification |
| Communication Settings | Connection type (wireless/wired) |
| Message Process Method | Message transmission mode (Grouping mode, Request mode) |
| Scheduler Use | Whether to use scheduler |
| Max Client | Maximum number of accessible gateway |
| Modem | Modem |
| GMT Time | GMT time setting value for each country |
| Scheduler Interval | Scheduler execution interval |
| Scheduler Time | Scheduler start time in case in which scheduler execution interval is 12 hours/24 hours |
| Log Directory | Server log directory |

Figure 79:
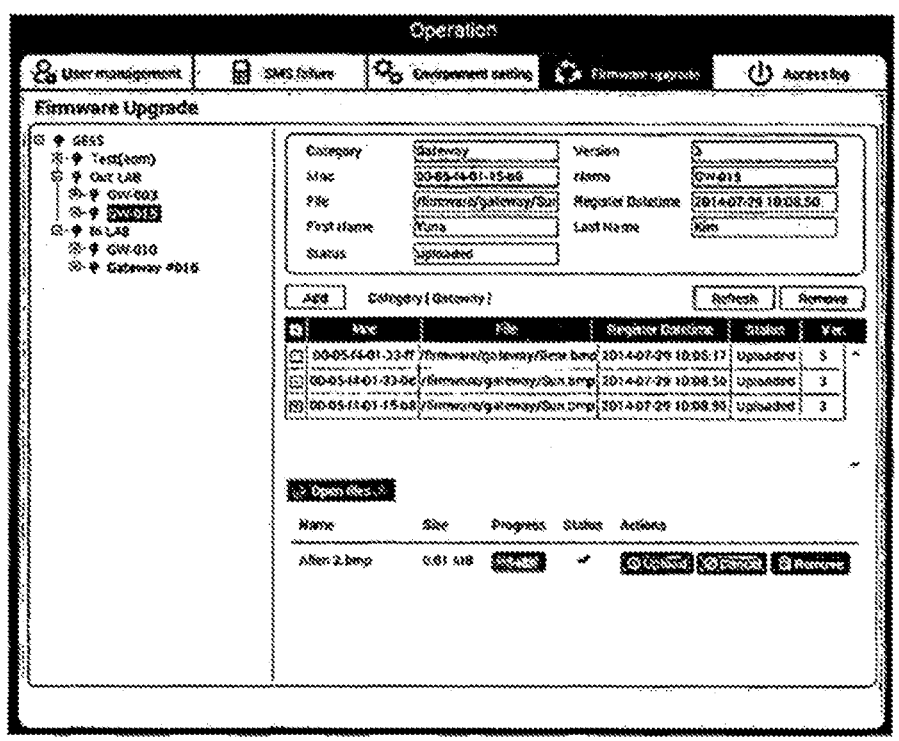

When the Operation item 705 is executed according to a user operation, a firmware upgrade window for firmware upgrade may be displayed as in FIG. 79. The firmware upgrade window may include items in the following Table 19.

TABLE 19

| Item | Description |
| --- | --- |
| Category | Gateway or Node |
| Version | Upgrade version information |
| Mac | Gateway or Node MAC ID |
| Name | Gateway Name or Node Name |
| File | Upgrade file |
| Register DateTime | Upgrade date |
| First Name | First name of upgrade administrator |
| Last Name | Last name of upgrade administrator |
| Status | Upgrade status |

Further, the firmware upgrade window includes a tree structure window at the left side, and when a gateway or a node is selected in the left tree structure window, details such as a firmware upgrade date, a file name, a version, a status, and the like may be displayed at the upper right portion. When an Add menu in the middle portion of the firmware upgrade window is selected, the terminal device may list equipments (node, gateway) to be upgraded while copying the details to a table. At this point, a category of existing equipment and a category of the added equipment need to be the same as each other, and when an Open files menu of a gateway or a node is selected, a firmware file in the terminal device of the user may be selected and upgraded. Further, when the user wants to cancel during upgrade, the upgrade may be canceled by selecting a Cancel menu and a list of a file of which upgrade is completed may be removed by selecting a Remove menu. Further, a Refresh menu in the middle portion is a function for newly confirming a status of equipments listed in the table for upgrade, and when the user does not want to confirm the status, if the Remove menu is selected, electronic devices may be removed from the list.

Figure 80:

When the Operation item 705 is executed according to a user operation, an access list window (Access log window) displaying user access information may be displayed as in FIG. 80. Further, the access list window may be displayed while being divided into items shown in the following Table 20.

TABLE 20

| Item | Description |
| --- | --- |
| Log in | Log in date and time |
| Log out | Log out date and time |
| Admin ID | User ID |
| Rights | User rights |
| Control Count | Number of controls |

In the access list window, information may be searched by using an administrator ID or rights, and a Delete menu for deleting an access list may be displayed. Further, when Control Count in the access list is clicked, it is possible to move to a list controlled by a corresponding user during the corresponding user logs in from a corresponding log in time to a corresponding log out time. "Today's number of connection" at the lower portion indicates the number of access in a day.

Figure 81:
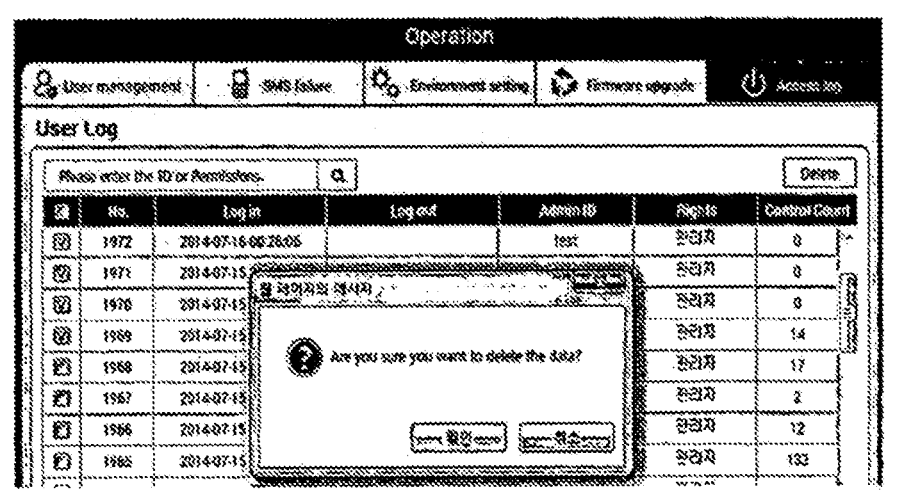

When at least one of access lists is selected in the access list window in FIG. 80 according to a user operation, and then the Delete menu is selected, the terminal device may display a message for confirming that the user wants to delete the corresponding list as in FIG. 81. When a menu for confirming deletion of the corresponding list is selected according to a user operation, the terminal device may delete the corresponding list.

FIGS. 82 to 85 are views showing a screen displayed at the time of executing a Report item 707 in a submenu 505 for management and statistics according to various embodiments of the present disclosure.

Figure 82:
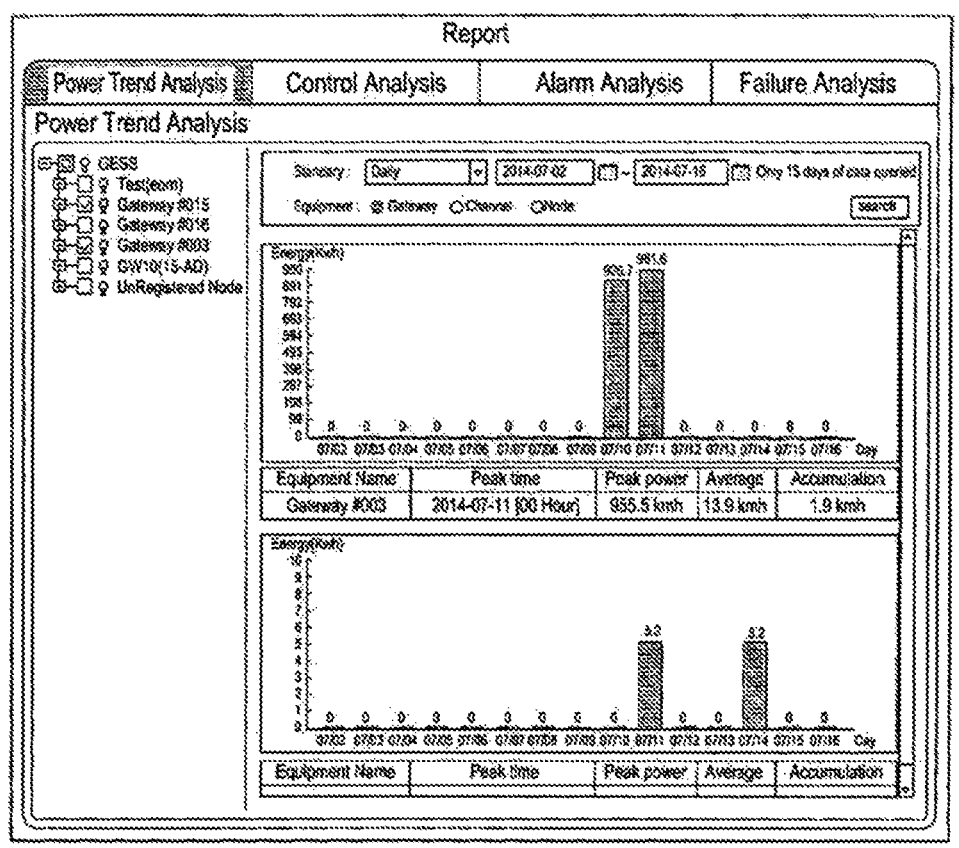
FIGS. 82, 83, 84, and 85 are views showing a screen displayed at the time of executing a Report item in a submenu for management and statistics according to various embodiments of the present disclosure.
Figure 83:
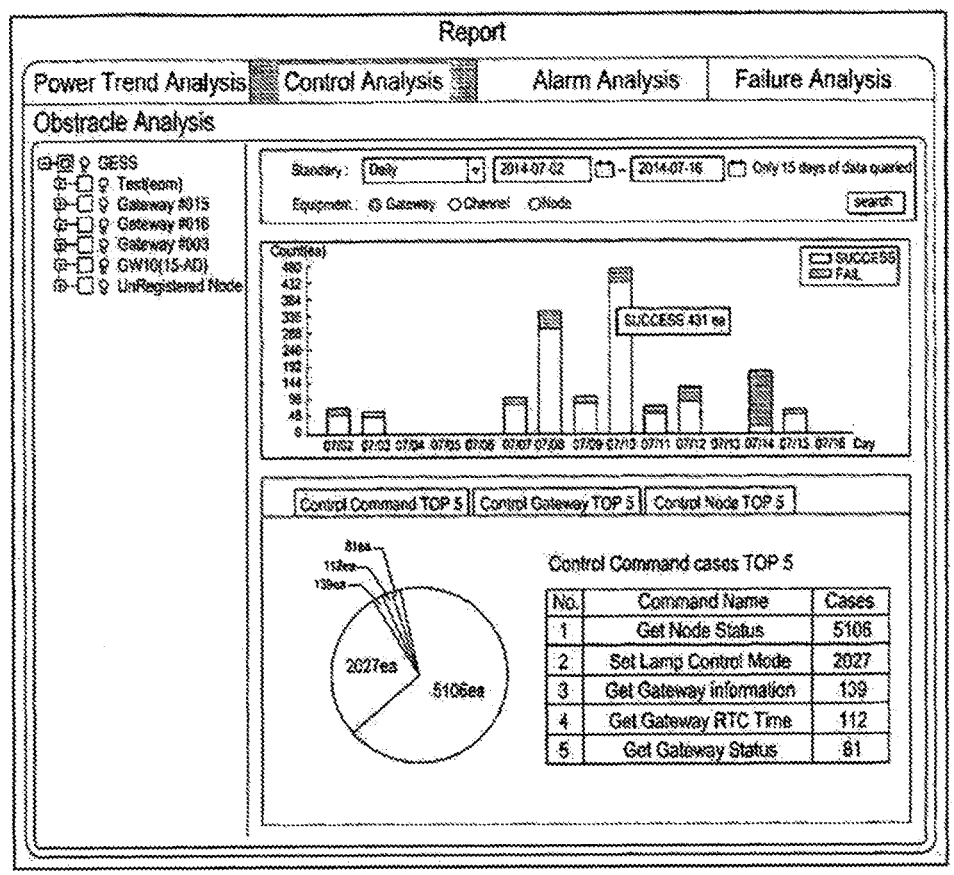
Figure 84:
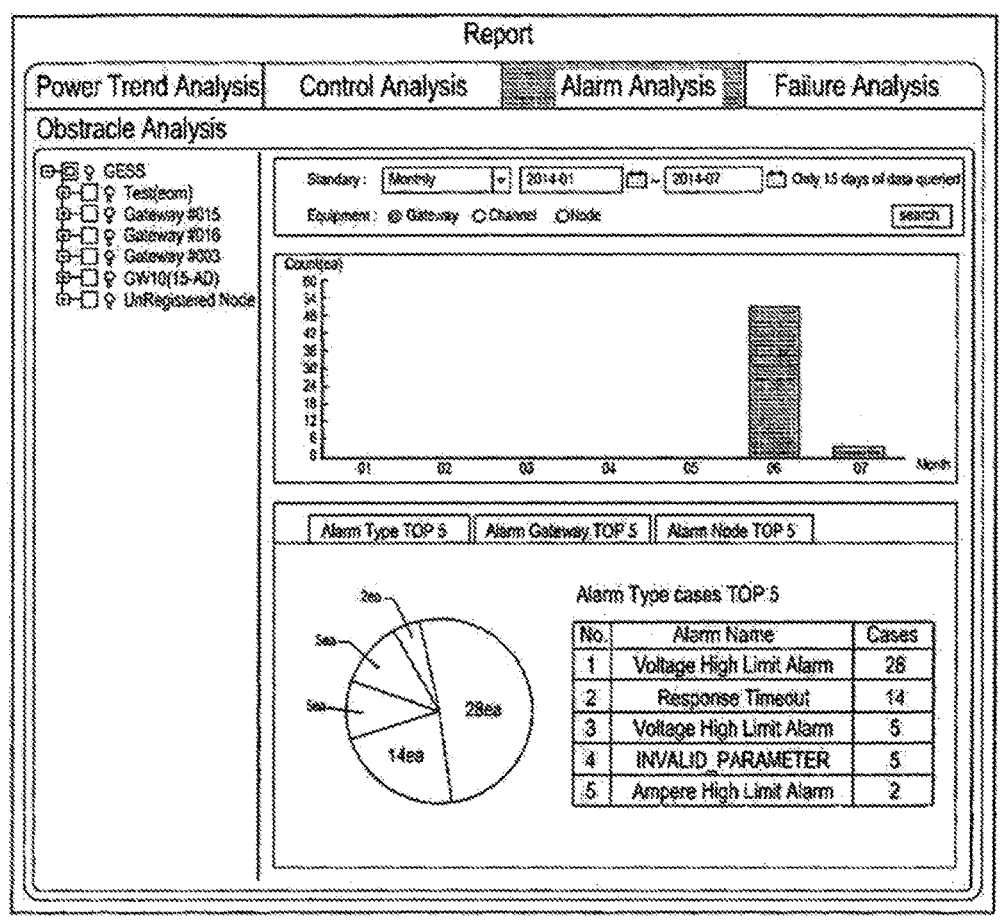
Figure 85:
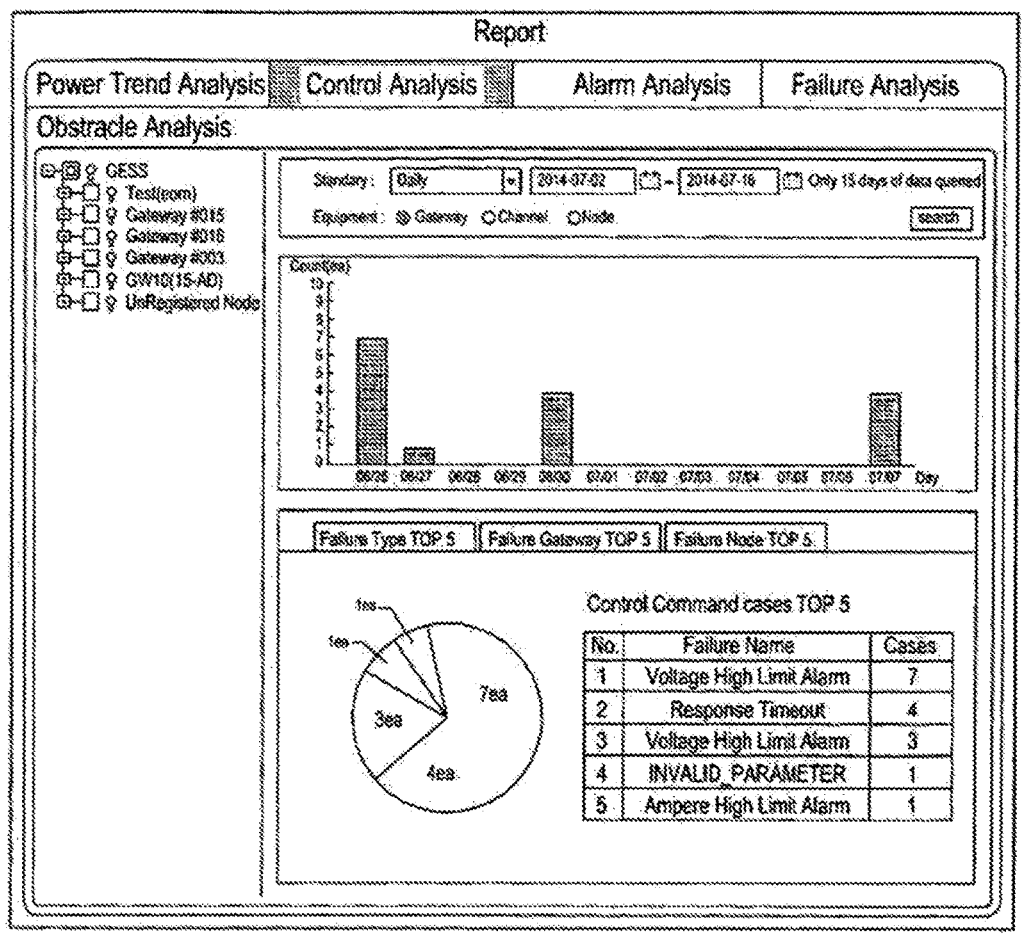

When the Report item 707 is executed according to a user operation, the terminal device may display a window displaying a power trend chart as in FIG. 82. When the Report item 707 is executed according to a user operation, a window displaying control commands as a chart may be displayed as in FIG. 83. Further, when the Report item 707 is executed, a window displaying where an alarm occurs as a chart may be displayed as in FIG. 84. Further, when the Report item 707 is executed, a window displaying where a failure occurs as a chart may be displayed as in FIG. 85.

FIGS. 86 to 89 are views showing a street light management application that may be executed in a mobile terminal device (hereinafter, referred to as a mobile device) such as a smartphone according to an embodiment of the present disclosure.

Figure 86:
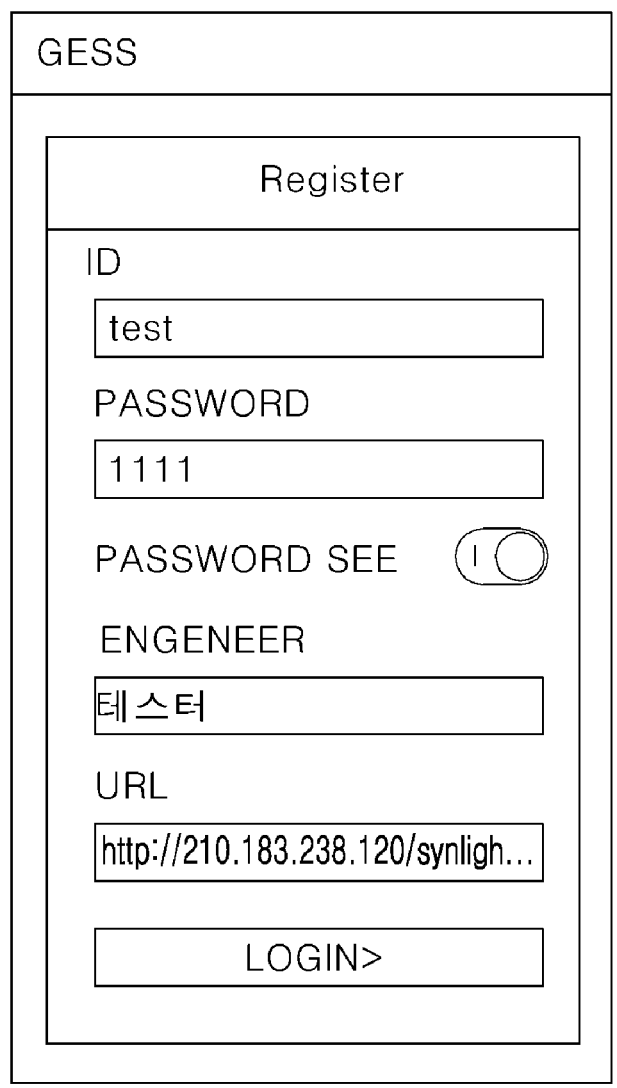
FIGS. 86, 87, 88A, 88B, 88C, and 89 are views showing a street light management application that may be executed in a mobile terminal device such as a smartphone according to an embodiment of the present disclosure.

When the street light management application is executed in the mobile device, a log in screen as in FIG. 86 may be displayed. The mobile device may perform log-in of the user when an ID and a password are input by a user operation, according to an access right registered by a top administrator. Further, the log in screen may be displayed while being divided into items shown in the following Table 21.

TABLE 21

| Item | Description |
| --- | --- |
| ID | User ID (User with rights higher than that of "user") |
| PASSWORD | User password |
| PASSWORD SEE | Show/hide password in input window |

TABLE 21-continued

| Item | Description |
| --- | --- |
| ENGNEER | Real name of person logging in |
| URL | URL (IP or Domain) operated by mobile server e.g.) http://gess.com/synlightm |

Figure 87:
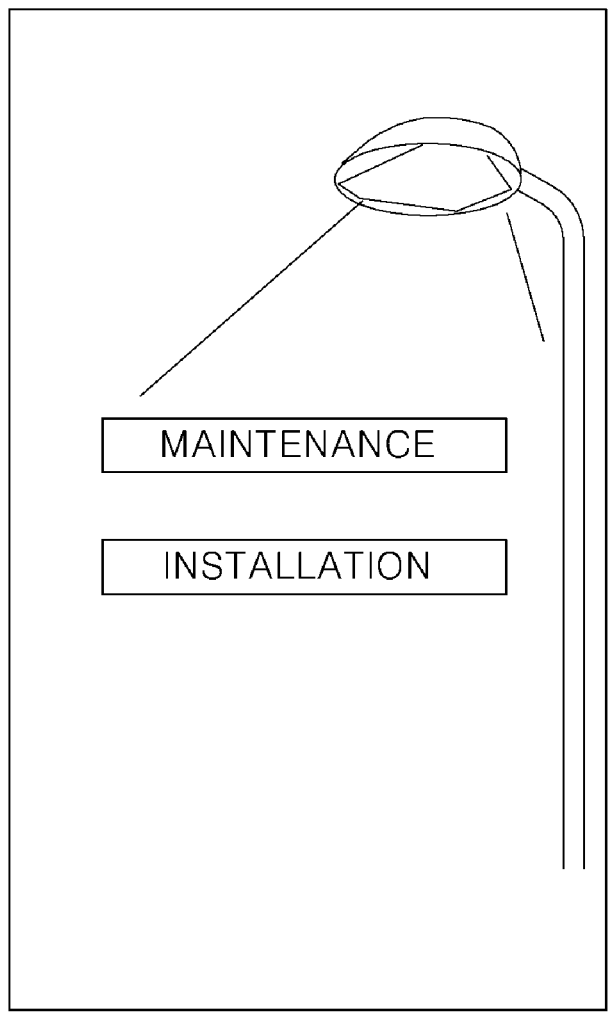

When the user logs in, the mobile device may display a screen for selecting a repair menu and an installation menu as in FIG. 87.

Figure 88C:
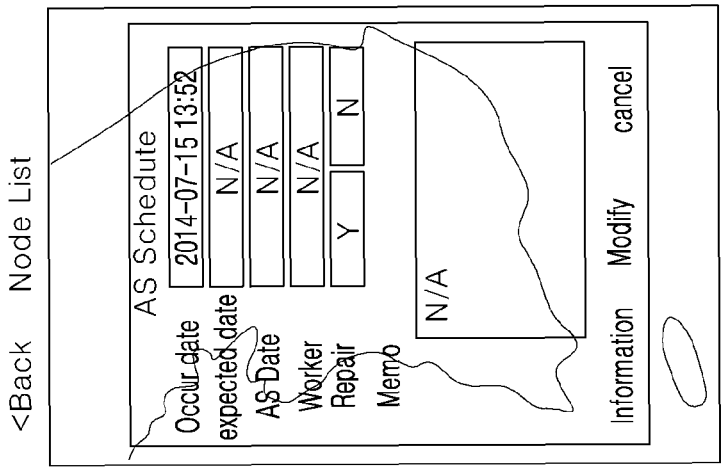
Figure 88B:
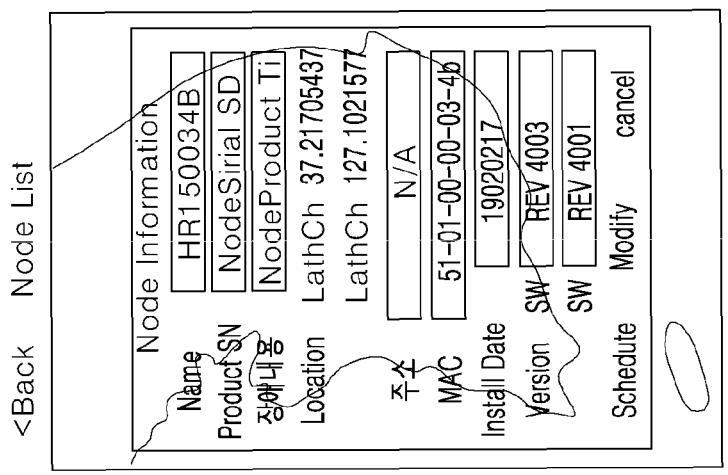
Figure 88A:
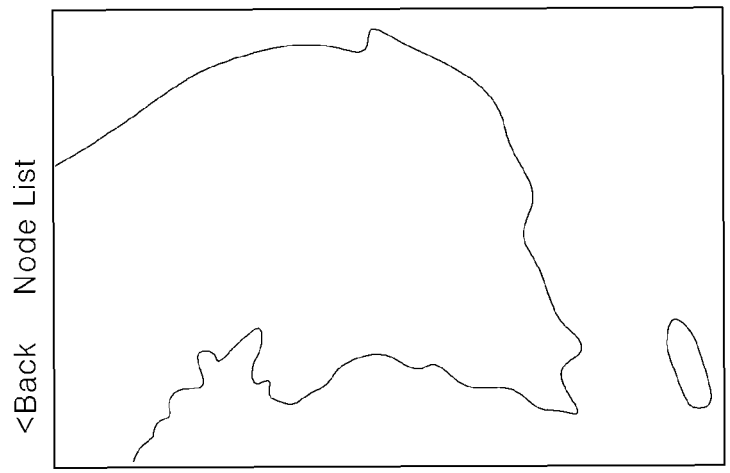

When the repair menu is selected according to a user operation, a digital map as in FIG. 88A is displayed on the screen, and when a specific node that needs to be repaired (A/S) is selected according to a user operation, a screen as in FIG. 88B may be displayed. When again inputting (changing) node information intended to be modified, and then selecting a Modify menu, the corresponding information may be changed and applied. The node information may be displayed while being divided into items shown in the following Table 22.

TABLE 22

| Item | Description |
| --- | --- |
| Name | Node name |
| Product SN | Serial number |
| Failure | Failure name |
| Location | Latitude/Longitude |
| Address | Address |
| MAC | Identification number |
| Install Date | Installation date |
| Version | S/W and H/W version |

When the user selects a Schedule menu for repairing (A/S) the selected node, a screen as in FIG. 88C may be displayed. In the screen divided into items shown in the following Table 23 as in FIG. 88C, when the user inputs information about the items displayed in the screen and selects the Modify button, the corresponding information may be applied.

TABLE 23

| Item | Description |
| --- | --- |
| Occur Date | Failure occurrence date |
| Expected Date | Estimated repair date |
| AS Date | Repair date |
| Worker | Repair man |
| Repair | Repair status |
| Memo | Repair memo |

Figure 89:
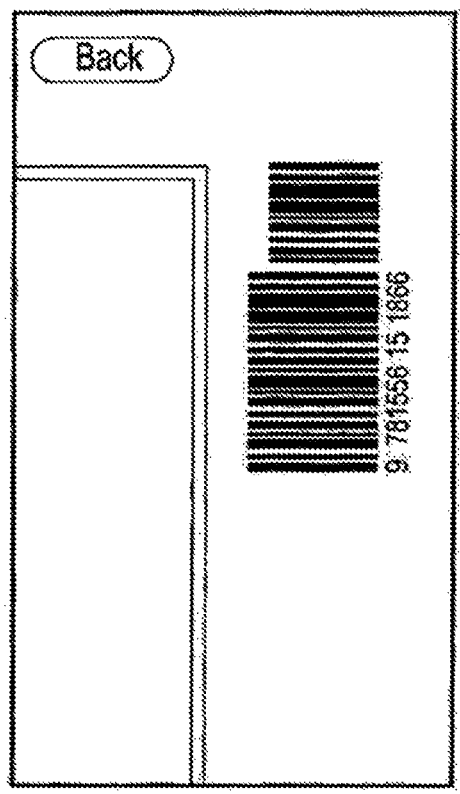

Meanwhile, in the screen for selecting the repair menu and the installation menu as in FIG. 87, when the installation is selected according to a user operation, the user may photographs a barcode of a node as in FIG. 89 such that the mobile device may obtain information described in Table 24 to transmit the obtained information to the server.

TABLE 24

| Item | Description |
| --- | --- |
| Lamp Name | Lamp name |
| Product SN | Serial number |
| MAC | Identification number |
| Watt | Power consumption |
| Color Temp | Color temperature |
| Manuf. Date | Manufacture date |

TABLE 24-continued

| Item | Description |
| --- | --- |
| Type | Lamp type |
| Node Name | Node name |
| Install Date | Installation date |
| H/W Version | Hardware version |
| S/W Version | Software version |
| Latitude | Latitude |
| Longitude | Longitude |
| Pole Height | Installation height |
| Channel | Channel |
| Worker | Person in charge |
| Memo | Memo |

Meanwhile, it may be appreciated that the embodiments of the present disclosure may be implemented in a form of hardware, software, or a combination of hardware and software. Such arbitrary software may be stored in a non-volatile storage medium such as a storage medium like a ROM, etc. regardless of whether or not it is removable or rewritable, a memory such as, for example, a RAM, a memory chip, and a device or integrated circuit, or in an optically or a magnetically writable and machine-readable (e.g. computer-readable) storage medium such as, for example, a CD, a DVD, a magnetic disc, or a magnetic tape. It may be appreciated that a memory that may be included in a mobile terminal is an example of a machine-readable storage medium suitable for storing a program or programs including instructions for implementing the embodiments of the present disclosure. Therefore, the present disclosure includes a program including a code for implementing the apparatus or a method claimed in any claim of the present specification, and a machine-readable storage medium storing the program. Further, such program may be electronically delivered through any medium like a communication signal that is transmitted through wired or wireless connection, and the present disclosure appropriately includes an equivalent thereof.

What is claimed is:

1. A street light management method, comprising:
receiving from a server at predetermined intervals and updating at least one of information about a node that is at least one street light, information about a gateway that communicates with the node and the server, and information about a communication channel between the node and the gateway;
displaying the node at a corresponding position on a digital map displayed on a screen using position information included in the information about the node;
displaying the gateway at a corresponding position on the digital map using position information included in the information about the gateway;
displaying corresponding information in at least one of information display windows on the screen according to the received information or a user operation;
in response to at least one selection, in a predetermined filter window by the user operation, of one or more criteria comprising (i) at least one state of an on state, an off state, and an error state of the street light lamp of the node, (ii) a setting of a dimming value of the street light lamp of the node, and (iii) a selection of at least one of a mode of turning on/off the street light lamp of the node at a predetermined time, a mode of turning on/off the street light lamp of the node at each predetermined time zone, and a mode of adjusting a dimming value of the street light lamp of the node at a predetermined time in control mode setting information of the node, displaying the node only when the node meets the selected one or more criteria at the corresponding location in the digital map;
receiving a user input instructing to change at least one state of the node; and
transmitting a command to the gateway according to the received input, wherein the command instructs the gateway to change at least one state of the node according to the user input,
wherein the method further comprises:
setting whether to display at least one of the node and the gateway in a digital map option window according to a user operation,
wherein at least one of the node and the gateway is displayed on the screen according to the setting of whether to display at least one of the node and the gateway,
wherein the digital map option window includes a tree structure window displaying the gateway, the communication channel, and the node as a tree structure according to a connection relationship in which the communication channel is set as a sub-component of the gateway, and the node is set as a sub-component of the communication channel, and
the street light management method further comprises displaying the gateway at the corresponding position on the digital map when the gateway displayed in the tree structure window is selected according to a user operation, and
displaying the node at the corresponding position on the digital map when the communication channel and the node displayed in the tree structure window are selected according to a user operation.

2. The street light management method of claim 1, wherein the information about the node includes at least one of a name of the node, a Medium Access Control (MAC) address of the node, an on or off state of a street light lamp of the node, and dimming information of a street light lamp of the node.

3. The street light management method of claim 2, further comprising displaying a window including the information about the node displayed on the digital map on the screen according to a user operation.

4. The street light management method of claim 1, wherein the information about the gateway includes at least one of a name of the gateway, a MAC address of the gateway, an IP address of the gateway, average dimming information of street light lamps of all nodes communicating with the gateway, an administrator phone number of the gateway, position information of the gateway, the number of all nodes communicating with the gateway, the number of nodes of which a street light lamp is turned on among the nodes communicating with the gateway, and the number of nodes of which a street light lamp is turned off among the nodes communicating with the gateway.

5. The street light management method of claim 4, further comprising displaying a window including the information about the gateway displayed on the digital map on the screen according to a user operation.

6. The street light management method of claim 1, further comprising selecting a predetermined control button according to a user operation to execute at least one of a dimming control setting of a street light lamp of the node, a blink control setting of the street light lamp of the node, a control mode setting of the node, a reference time setting of the node, and a reference time setting of the gateway, wherein the control mode setting of the node includes executing at least one of on/off of the street light lamp of the node at a predetermined time, on/off of the street light lamp of the node at each predetermined time zone, and adjustment of a dimming value of the street light lamp of the node at a predetermined time.

7. The street light management method of claim 1, wherein when the node displayed at the corresponding position on the digital map is deselected according to a user operation, displaying the node on the digital map is terminated, and the tree structure window indicates that the node is deselected, and when the gateway displayed at the corresponding position on the digital map is deselected, displaying the gateway and the node on the digital map is terminated, and the tree structure window indicate that the gateway and the node are deselected.

8. The street light management method of claim 1, further comprising grouping a plurality of nodes displayed on the digital map according to a user operation; and executing at least one of a dimming setting of street light lamps of the plurality of grouped nodes, a blink control setting of the street light lamps of the nodes, a control mode setting of the nodes, and a reference time setting of the nodes,
wherein the control mode setting of the nodes includes executing at least one of on/off of the street light lamps of the nodes at a predetermined time, on/off of the street light lamps of the nodes at each predetermined time zone, and adjustment of a dimming value of the street light lamps of the nodes at a predetermined time.

9. The street light management method of claim 1, wherein displaying the corresponding information in at least one of information display windows includes when the received information includes alarm information or failure information, displaying the alarm information or the failure information in an alarm and failure list window displayed on the screen.

10. The street light management method of claim 9, wherein the alarm and failure list window includes an alarm list display window displaying a total number of alarms and a failure list display window displaying a total number of failures, and the alarm list display window or the failure list display window is displayed according to a predetermined condition, and
the street light management method further comprises displaying the selected alarm list display window or failure list display window according to a user operation.

11. The street light management method of claim 10, wherein the failure list display window includes a failure handling process button, and
the street light management method further comprises when the failure handling process button is selected according to a user operation, displaying a window for recording handling information of a corresponding failure.

12. The street light management method of claim 9, further comprising setting whether to display at least one of the alarm and failure list window, the power usage window, and the control list window according to a user operation, and displaying at least one of the alarm and failure list window, the power usage window, and the control list window on the screen according to the setting of whether to display.

13. The street light management method of claim 1, wherein the displaying of the corresponding information in at least one of information display windows includes when the received information includes power usage information of the node, displaying the power usage information of the node in a power usage window displayed on the screen.

14. The street light management method of claim 13, wherein the power usage window displays at least one of daily power usage, a chart of daily power usage, a peak hour of power usage, a peak power usage, an average power usage, and a cumulative power usage.

15. The street light management method of claim 1, wherein the displaying of the corresponding information in at least one of information display windows includes when a control request for controlling the node or the gateway is input to execute a corresponding control according to a user operation, displaying information about the control in a control list window displayed on the screen.

16. The street light management method of claim 15, wherein the control list window displays a list of control information according to a predetermined priority.

17. A street light management apparatus, comprising:
a communication module;
a display unit;
an input unit configured to receive a user operation; and
a controller configured to perform control operations to receive from a server through the communication module at predetermined intervals and update at least one of information about a node that is at least one street light, information about a gateway that communicates with the node and the server, and information about a communication channel between the node and the gateway, display the node at a corresponding position on a digital map displayed on the display unit using position information included in the information about the node and display the gateway at a corresponding position on the digital map using position information included in the information about the gateway, display corresponding information in at least one of information display windows of the display unit according to the received information or the user operation input through the input unit, in response to at least one selection, in a predetermined filter window by the user operation, of one or more criteria comprising (i) at least one state of an on state, an off state, and an error state of the street light lamp of the node, (ii) a setting of a dimming value of the street light lamp of the node, and (iii) a selection of at least one of a mode of turning on/off the street light lamp of the node at a predetermined time, a mode of turning on/off the street light lamp of the node at each predetermined time zone, and a mode of adjusting a dimming value of the street light lamp of the node at a predetermined time in control mode setting information of the node, displaying the node only when the node meets the selected one or more criteria at the corresponding location in the digital map; receive a user input instructing to change at least one state of the node; and transmit a command to the gateway according to the received input, wherein the command instructs the gateway to change at least one state of the node according to the user input,
the controller is further configured to set whether to display at least one of the node and the gateway in a digital map option window according to a user operation,
wherein at least one of the node and the gateway is displayed on the screen according to the setting of whether to display at least one of the node and the gateway,
wherein the digital map option window includes a tree structure window displaying the gateway, the communication channel, and the node as a tree structure according to a connection relationship in which the communication channel is set as a sub-component of the gateway, and the node is set as a sub-component of the communication channel, and the controller is further configured to display the gateway at the corresponding position on the digital map when the gateway displayed in the tree structure window is selected according to a user operation, and display the node at the corresponding position on the digital map when the communication channel and the node displayed in the tree structure window are selected according to a user operation.

18. The street light management apparatus of claim 17, wherein the controller is configured to select a predetermined control button displayed in the display unit according to a user operation input through the input unit to control execution of at least one of a dimming control setting of a street light lamp of the node, a blink control setting of the street light lamp of the node, a control mode setting of the node, a reference time setting of the node, and a reference time setting of the gateway, and the control mode setting of the node includes executing at least one of on/off of the street light lamp of the node at a predetermined time, on/off of the street light lamp of the node at each predetermined time zone, and adjustment of a dimming value of the street light lamp of the node at a predetermined time.

19. The street light management apparatus of claim 17, wherein the controller is configured to control a setting of whether to display at least one of the node and the gateway in a digital map option window displayed on the display unit according to a user operation input through the input unit, and at least one of the node and the gateway is displayed on the display unit according to the setting of whether to display at least one of the node and the gateway.

20. The street light management apparatus of claim 17, wherein the controller is configured to group a plurality of nodes displayed on the digital map according to a user operation input through the input unit and controls execution of at least one of a dimming setting of street light lamps of the plurality of grouped nodes, a blink control setting of the street light lamps of the nodes, a control mode setting of the nodes, and a reference time setting of the nodes, and the control mode setting of the node includes executing at least one of on/off of the street light lamps of the nodes at a predetermined time, on/off of the street light lamps of the nodes at each predetermined time zone, and adjustment of a dimming value of the street light lamps of the nodes at a predetermined time.

21. The street light management apparatus of claim 17, wherein the controller is configured to, when the received information includes alarm information or failure information, display the alarm information or the failure information in an alarm and failure list window displayed on the display unit.

22. The street light management apparatus of claim 17, wherein the controller is configured to, when the received information includes power usage information of the node, display the power usage information of the node in a power usage window displayed on the display unit.

23. The street light management apparatus of claim 17, wherein the controller is configured to, when a control request for controlling the node or the gateway is input to execute a corresponding control according to a user operation input through the input unit, display information about the control in a control list window displayed on the display unit.

24. A method for managing street lights, comprising:

receiving, from a server, a status message for a plurality of street lights controlled by a gateway, the status message comprising position information on at least some of the plurality of street lights;

displaying a plurality of identifiers, each of the plurality of identifiers corresponding to the plurality of street lights, respectively, in a digital map electronically produced on a user terminal based on the position information;

receiving a first input into the user terminal, the first input specifying certain conditions for the street lights;

in response to the first input, displaying only some of the plurality of identifiers corresponding to the street lights, among the plurality of street lights, satisfying the specified certain conditions for the street lights;

receiving a second input in the user terminal, the second input instructing to change at least one status of the street lights to a desired status;

transmitting, to the server, an instruction message according to the received second input, wherein the instruction message instructs the gateway to change the some of the plurality of street lights controlled by the gateway to the desired status, wherein the method further comprises:

setting whether to display at least one of the node and the gateway in a digital map option window according to a user operation, wherein at least one of the node and the gateway is displayed on the screen according to the setting of whether to display at least one of the node and the gateway, wherein the digital map option window includes a tree structure window displaying the gateway, the communication channel, and the node as a tree structure according to a connection relationship in which the communication channel is set as a sub-component of the gateway, and the node is set as a sub-component of the communication channel, and the street light management method further comprises displaying the gateway at the corresponding position on the digital map when the gateway displayed in the tree structure window is selected according to a user operation, and displaying the node at the corresponding position on the digital map when the communication channel and the node displayed in the tree structure window are selected according to a user operation.

25. The method of claim 24, further comprising:

displaying another identifier corresponding to the gateway in the digital map; and visually distinguishing the plurality of identifiers corresponding to the plurality of street lights controlled by the gateway from at least one another identifier corresponding to another street light not controlled by the gateway.

* * * * *